United States Patent [19]
Sekine et al.

[11] Patent Number: 6,138,071
[45] Date of Patent: Oct. 24, 2000

[54] CRUISING CONTROL APPARATUS

[75] Inventors: Takaaki Sekine; Yoshiyuki Ando, both of Yokohama; Akira Itoh; Naoto Sen, both of Wako, all of Japan

[73] Assignee: Honda Giken Kogyo Kabushiki Kaisha, Tokyo, Japan

[21] Appl. No.: 09/154,021

[22] Filed: Sep. 16, 1998

[30] Foreign Application Priority Data

| Sep. 16, 1997 | [JP] | Japan | 9-250648 |
| Sep. 16, 1997 | [JP] | Japan | 9-250667 |
| Sep. 16, 1997 | [JP] | Japan | 9-250687 |
| Sep. 16, 1997 | [JP] | Japan | 9-250694 |
| Sep. 16, 1997 | [JP] | Japan | 9-250720 |
| Sep. 16, 1997 | [JP] | Japan | 9-250760 |
| Sep. 16, 1997 | [JP] | Japan | 9-250794 |
| Sep. 16, 1997 | [JP] | Japan | 9-250837 |
| Oct. 13, 1997 | [JP] | Japan | 9-279108 |

[51] Int. Cl.[7] ............ B60K 31/00; F02D 29/02
[52] U.S. Cl. ............................. 701/93; 180/170
[58] Field of Search ............... 701/93, 94, 96; 180/170, 179; 123/349, 350

[56] References Cited

U.S. PATENT DOCUMENTS 5,177,682  1/1993  Oo et al. .................... 701/93
6,009,367  12/1999  Hori et al. .................. 701/93

*Primary Examiner*—Tan Nguyen
*Attorney, Agent, or Firm*—Sughrue, Mion, Zinn, Macpeak & Seas, PLLC

[57] ABSTRACT

A cruising control apparatus to be mounted in the motor vehicle for automatically controlling vehicle speed at desired constant speed, which is provided with a speed sensor, an actuator, a set-coast switch for generating a coast command signal or a tap-down command signal in response to the operation duration the cruising control, a resume-acceleration switch for generating a resume-command signal or a tap-up command signal in response to the operation during the cruising control, a memory means, a calculation means, a speed increase means, a speed decrease means, an acceleration control means for deciding a signal generated from the resume-acceleration switch to be the tap-up command signal or the acceleration command signal and a deceleration control means for deciding a signal generated from the set-coast switch to be the tap-down command signal or the coast command signal by comparing the vehicle speed at the time of generation and disappearance of the signal.

23 Claims, 26 Drawing Sheets

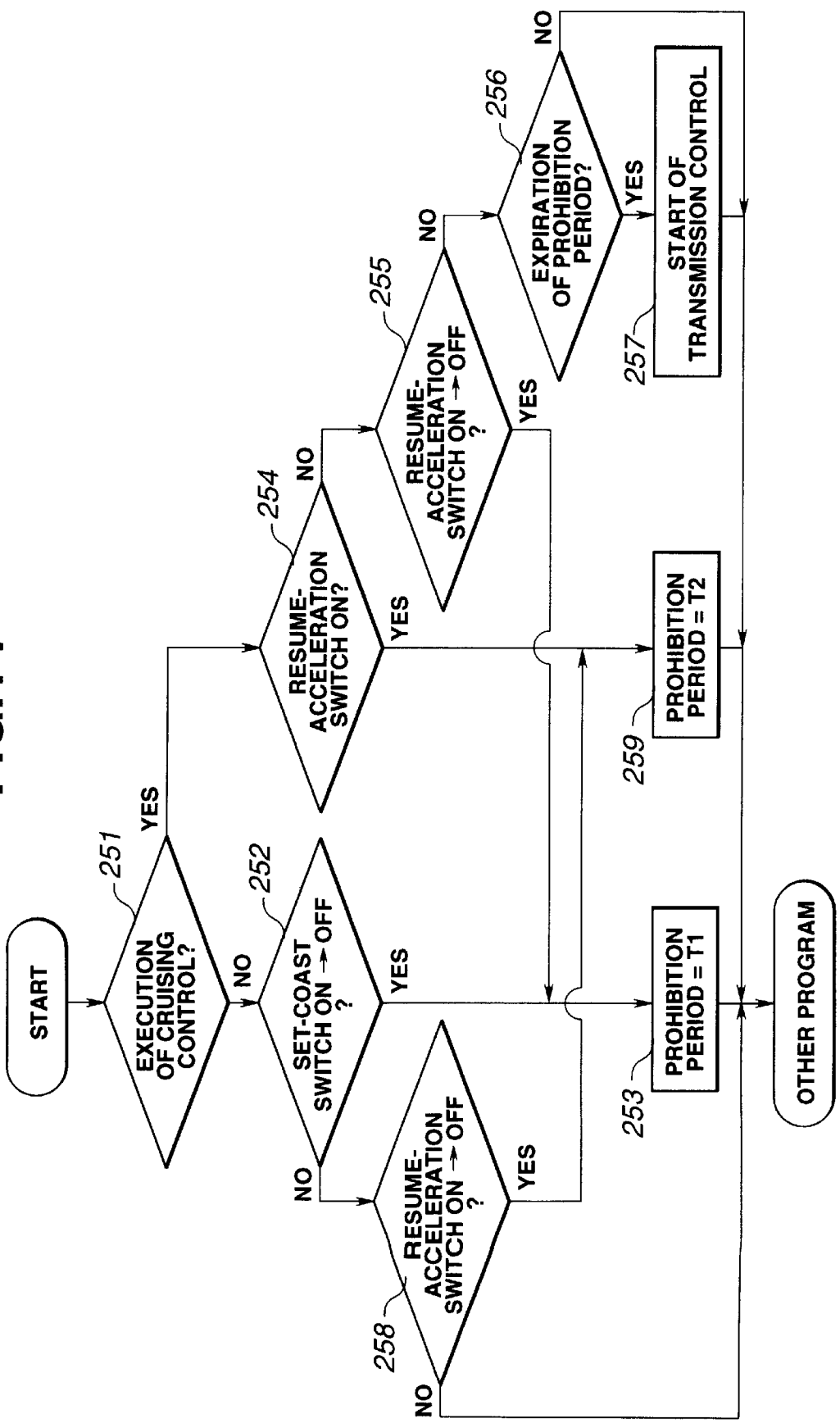

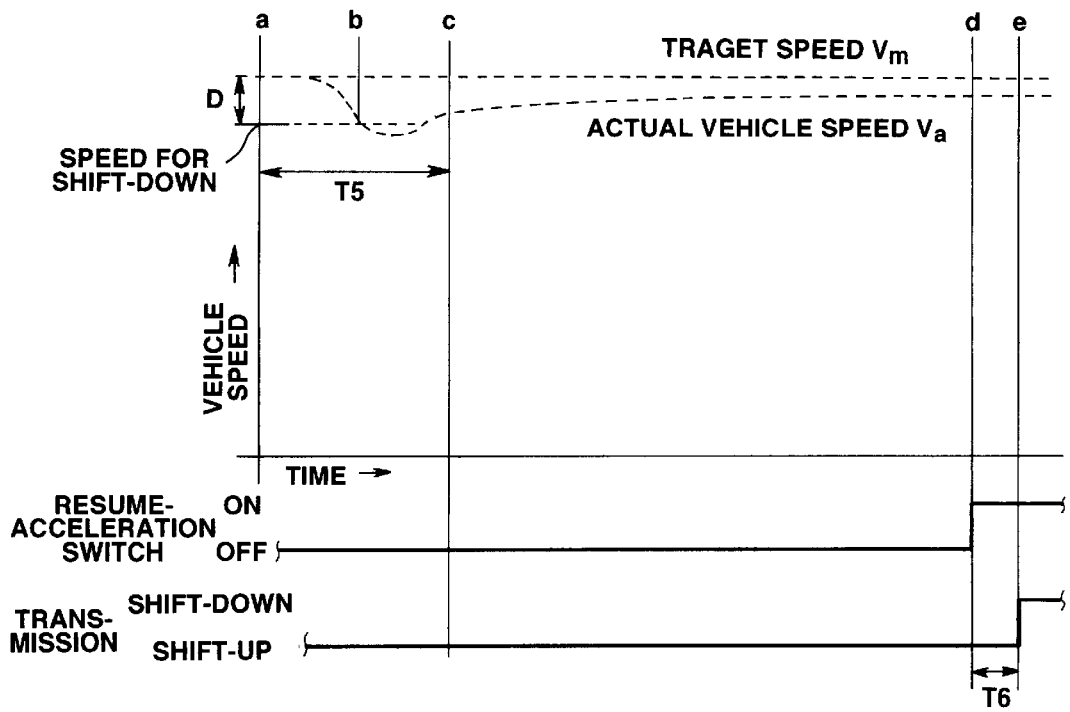
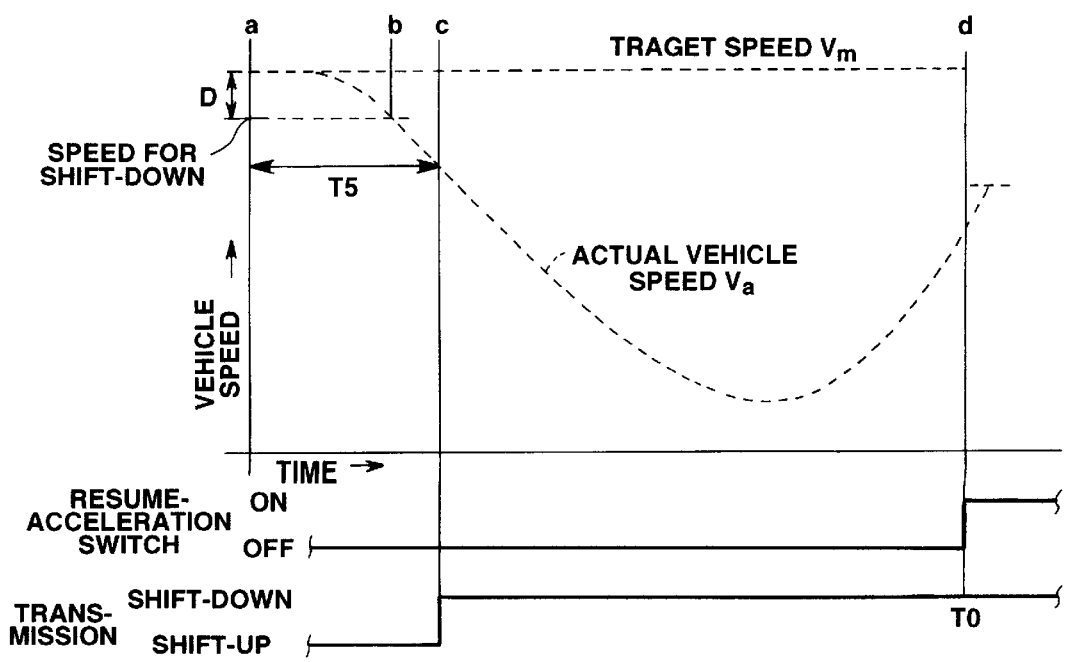

CRUISING CONTROL APPARATUS

BACKGROUND OF THE INVENTION

1. Field of the Invention

This invention relates to a cruising control apparatus which is used for running an automotive vehicle at an arbitrarily preselected speed and possible to automatically control running speed of the vehicle at the desirably selected cruising speed without operating the accelerator pedal of the vehicle.

2. Description of the Prior Art

For example, an apparatus provided with following functions has been known as a cruising control apparatus for automatically control running speed of the vehicle at the desirable target speed.

In the conventional cruising control apparatus, a set switch disposed in a switch panel of the apparatus is operated by a driver when the running speed of the vehicle attains desired speed suitable for the automatic constant speed cruising while the vehicle is travelling, thereby storing a vehicle speed signal detected by a speed sensor at the time of off-operation of the set switch in a memory housed in a controller as a target cruising speed. Whereby, constant speed cruising control is started, the controller in the apparatus always compares the actual vehicle speed signal generated from the speed sensor with the speed signal stored in the memory as the target cruising speed, executes control calculation according to the difference therebetween and controls the vehicle speed so as to harmonize the actual vehicle speed signal with the stored speed signal by driving the throttle valve of the vehicle in the opening or closing direction through an actuator. Accordingly, the vehicle cruise automatically at the objective constant speed.

When the brake pedal is operated during the aforementioned cruising control, the cruising control is cancelled without clearing the speed signal stored in the memory according to the off-operation of the set switch, and the automatic cruising is switched over to the ordinary running according to the accelerator pedal operation by the driver.

After this, when a resume switch disposed in the switch panel is operated, control is done so as to return the vehicle speed to the target cruising speed previously stored in the memory of the controller, whereby the cruising control at the constant speed is restarted similarly to the control before the brake operation after the vehicle speed returns to the target cruising speed.

When an acceleration switch is operated during the cruising control, the vehicle speed begins to increase. If the switch is switched off when the vehicle speed increases up to the desirable speed, the vehicle speed signal generated from the speed sensor at the time of off-operation of the acceleration switch is stored in the memory as a new target cruising speed and the cruising control is started directing the newly stored vehicle speed at the time of off-operation.

Contrary to the above, when a coast switch in the switch panel is operated during the cruising control, the vehicle speed begins to decrease. If the coast switch is switched off when the vehicle speed decreases down to the desirable speed, the vehicle speed signal generated from the speed sensor at the time of off-operation of the coast switch is stored in the memory as a new target cruising speed, whereby the cruising control is started directing the newly stored vehicle speed at the time of off operation.

Furthermore, when a tap-up switch is operated during the cruising control, a speed signal obtained by adding a predetermined signal corresponding to a tap-up speed to the speed signal stored in the memory or the actual vehicle speed signal generated form the speed sensor at the time of operating the switch is stored in the memory in the controller, and the cruising control is started at a speed higher than the target speed or the actual vehicle speed at the time of operating the tap-up switch by the predetermined tap-up speed (for example, 1.6 km/h).

When a tap-down switch in the switch panel is operated during the cruising control, a speed signal obtained by subtracting a predetermined signal corresponding to a tap-down speed from the speed signal stored in the memory or the actual vehicle speed signal generated form the speed sensor at the time of operating the switch is stored in the memory in the controller, and the cruising control is started at a speed lower than the target speed or the actual vehicle speed at the time of operating the tap-down switch by the predetermined tap-down speed (for example, 1.6 km/h).

There has also been a cruising control apparatus provided with an acceleration switch and an coast switch which serve also as the tap-up switch and the tap-down switch, respectively.

In such the apparatus, when the acceleration switch is operated during the cruising control, the vehicle speed data at the time of switching on the acceleration switch is subtracted from the vehicle speed data at the time of switching off the acceleration switch and obtained fluctuation in the vehicle speed is compared with a predetermined constant value. The signal generated from the acceleration switch is decided to be a tap-up command in a case the fluctuation in the vehicle speed is less than the predetermined constant, and is decided to be an acceleration command in a case the fluctuation is not less than the predetermined constant.

When the coast switch is operated during the cruising control, the vehicle speed data at the time of switching off the coast switch is subtracted from the vehicle speed data at the time of switching on the coast switch and obtained fluctuation in the vehicle speed is compared with a predetermined constant value. When the fluctuation of the vehicle speed is less than the predetermined constant, the signal generated from the coast switch is decided to be a tap-down command, and if the fluctuation of the vehicle speed is not less than the predetermined constant, the signal is decided to be a coast command.

Furthermore, a cruising control apparatus has been also known, which is further provided with a shift-down demand signal generator for generating a shift-down demand signal to the transmission controller of the vehicle at the time when the actual vehicle speed falls below the target cruising speed stored in the memory of the controller and a difference between the actual vehicle speed and the target speed exceeds the predetermined value on an uphill road, for example. The transmission controller is so designed as to slow down the automatic transmission of the vehicle in response to the shift-down demand signal after recognizing the vehicle speed, the position of the select lever, the opening degree of the throttle valve and so on.

However, in the cruising control apparatus with the acceleration switch and the coast switch used also as the tap-up switch and the tap-down switch in common, there is a problem in that acceleration control is started unexpectedly without executing tap-up control in a case where the acceleration switch is operated repeatingly in a short time and the second operation is done similarly to the first operation of the acceleration switch during the cruising control, and coast control is started unexpectedly without executing tap-down control in a case where the coat switch is operated repeatingly in a short time and the second operation of the switch is done similarly to the first operation of the coast switch during the cruising control.

In the cruising control apparatus with the function to shift down the automatic transmission at the time when the actual vehicle speed falls below the target cruising speed more than the predetermined difference in the speed by generating the shift-down demand signal, it is so designed that generation of the shift-down demand signal may be delayed for a certain fixed amount of time in each of cases where the set switch is operated while the cruising control is not performed, the resume switch is operated while the cruising control is cancelled, and the acceleration switch is operated during the cruising control, accordingly there is a problem in that the shift-down of the transmission is not always carried out even in a case of necessity, and the driver and passengers sometimes feel a sense of incompatibility in a case where the shift-down of the transmission is performed after the certain amount of time.

Also in the cruising control apparatus of the above-mentioned type, the controller is also designed so as to interrupt the decision of the output of the shift-down demand signal for a certain amount of time similtaneously to on-operation of the acceleration switch if the acceleration switch is operated on at the time when the actual vehicle speed begins to increase in a case where the vehicle is cruising automatically under the cruising control in a state that the transmission controller shifts down the automatic transmission of the vehicle in response to the shift down demand signal. Therefore, the generation of the shift-down demand signal is interrupted for the certain amount of time, and there is another problem in that the automatic transmission may be shifted up automatically during the interruption of the signal.

Furthermore, generally in the cruising control apparatus, when the tap-up command or the tap-down command signal, the controller of the apparatus is so designed as to drive the actuator in the acceleration or deceleration direction of the vehicle by outputting a tap-up initialize signal or a tap-down initialize signal every time of generation of the command signals in response to the respective command signals.

The tap-up initialize signal is calculated by the controller in accordance with the cruising speed at the time of generation of the tap-up command signal and outputted in an amount suitable for increasing the vehicle sped as much as the predetermined tap-up speed (for example, 1.6 km/h) against the cruising speed at the time of constant speed cruising under the cruising control, and the tap-down initialize signal is similarly calculated by the controller in accordance with the cruising speed at the time of generation of the tap-down command signal and outputted in an amount suitable for decreasing the vehicle speed as much as the predetermined tap-down speed (for example, 1.6 km/h) for the cruising speed at the time of constant speed cruising under the cruising control. Therefore, if the tap-up command signal is generated successively by operating the switch repeatedly, the tap-up initialize signal, which is calculated by the controller on condition that the vehicle speed is increased in the constant cruising state, is outputted continuously in response to the second and successive operation of the switch in the state where the vehicle speed begins to increase according to the operation in the first time, consequently there is a problem in that the vehicle is accelerated over the target cruising speed renewed in response to the tap-up command signal. There is also the similar problem in that the vehicle is decelerated under the target cruising speed renewed in response to the tap-down command signal owing to the continuation of the output of the tap-down initialize signal when the tap-down command signal is generated successively by the continuous operation of the switch.

In addition to the above, the actuator in the apparatus is so designed as to be fixed in a short period of time after the generation of the tap-up initialize signal or the tap-down initialize signal, so that the output of the tap-up or the tap-down initialize signal is merely output and the feed-back control against the target cruising speed is not executed substantially in a case where the tap-up command signal or the tap-down command signal is repeatedly generated in a certain interval. Accordingly, there is another problem in that the difference between actual vehicle speed and the target cruising speed becomes larger more and more, and it becomes impossible to speedily conform the actual vehicle speed with the target cruising speed at a time when the tap-up or the tap-down command signal is repeated in special timing.

Furthermore, when the tap-up command signal is generated many times successively, the tap-up speed (for example, 1.6 km/h) is added one after the other to the target speed stored in the memory of the controller for each generation of the signal and the target cruising speed increases continuously. Consequently, the difference between the actual vehicle speed and the target cruising speed becomes larger and sometimes exceeds the predetermined difference range (for example, 5 km/h). The vehicle speed control by the controller is so designed as to be switched over from constant speed control (feed-back control aiming the target speed stored in the memory) to constant acceleration control in order to speedily conform the actual vehicle speed with the target speed by maintaining the acceleration of the vehicle constant at the time when the actual vehicle speed falls below the speed lower than the target speed stored in the memory of the controller by the predetermined difference range.

If the tap-up command signal is generated even after the vehicle speed control is shifted to the constant acceleration control, the tap-up initialize signal is output in response to the command signal in addition to the actuator driving signal according to the constant acceleration control, therefore there is a problem in that pleasant driving feeling may be obstructed by abrupt acceleration of the vehicle at every switching operation.

Also in the conventional cruising control apparatus in a type of renewing the target speed stored in the memory with the vehicle speed obtained by subtracting the predetermined tap-down speed form the actual vehicle speed in response to the tap-down command signal, if the tap-down command signal generated at the time when the actual vehicle speed falls below the speed lower than the target speed stored in the memory by the predetermined range (for example, 5 km/h) and the constant acceleration control is performed as described above, the speed signal corresponding to the vehicle speed lower than the present vehicle speed by the predetermined tap-down speed (for example, 1.6 km/h) is stored in the memory of the controller as a new target cruising speed and the constant speed cruising at the speed lower than the present vehicle speed is started after discontinuing the constant acceleration control to conform the actual vehicle speed with the target cruising speed higher than the present vehicle speed.

Namely, the vehicle speed control is suddenly changed into the constant speed cruising control aiming the speed lower than the present vehicle speed at the time of generation of the tap-down command signal from the constant acceleration control aiming the speed higher than the present vehicle speed by at least 5 km/h, for example. Therefore, there is a problem in that overshooting of the vehicle speed occurs after the switching operation and comfortable driving feelings bay be spoiled.

Further, in the conventional cruising control apparatus, the controller is designed so as to drive the actuator in the acceleration direction of the vehicle by outputting a set initialize signal calculated by using a data map, which is preset for starting the cruising control in response to the cruise command signal, as a coast initialize signal in a case where the coast command signal disappears and the vehicle speed control is shifted from deceleration state according to the coast control into the constant speed cruising in the vehicle speed at the time of disappearance of the coast command signal. Accordingly, there is a problem in that the coast initialize signal is sometimes output excessively according to difference of the duration time of the coast command signal and it becomes impossible to speedily conform the actual vehicle speed with the newly stored target cruising speed in response to the coast command signal.

SUMMARY OF THE INVENTION

This invention is made in view of aforementioned problems of the prior art. It is an object to provide a cruising control apparatus which is possible to prevent the maleworking against the intention of driver, possible to prevent the sense of incompatibility and the unpleasant feeling of the driver and passengers at the time of driving, and possible to speedily conform the actual vehicle speed with the target cruising speed even if the tap-up or the tap-down command signal is generated successively according to repetition of the switching operation.

The construction of the cruising control apparatus according to this invention for attaining the aforementioned object is characterized by comprising a speed sensor for generating a vehicle speed signal proportional to an actual running speed of the vehicle; an actuator for driving a throttle valve of the vehicle in an acceleration and a deceleration direction of the vehicle; a set switch operable for generating a cruise command signal; a coast switch operable for generating a coast command signal or a tap-down command signal; a resume switch operable for generating a resume command signal; an acceleration switch operable for generating an acceleration command signal or a tap-up command signal; a memory means for storing the vehicle speed signal generated from the speed sensor as a target cruising speed in response to the cruise command signal generated from the set switch; a calculation means for comparing the vehicle speed signal generated from the speed sensor with the speed signal stored in the memory means and generating an actuator driving signal corresponding to a difference between the stored speed signal and the actual vehicle speed signal; a speed increase means for driving the actuator in the acceleration direction of the vehicle according to the actuator driving signal; a speed decrease means for driving the actuator in the deceleration direction of the vehicle according to the actuator driving signal; an acceleration control means for deciding a signal generated from the acceleration switch to be the tap-up command signal in a case where a difference between the vehicle speed signal generated at the time of switching on the acceleration switch and the vehicle speed signal generated at the time of switching off the acceleration switch does not exceed a predetermined first value and for deciding the signal generated from the acceleration switch to be the acceleration command signal and storing the vehicle speed signal generated at the time of switching off the acceleration switch in the memory means as a new target cruising speed in a case where the difference between the vehicle speed signal generated at the time of switching on the acceleration switch and the vehicle speed signal generated at the time of switching off the acceleration switch exceeds the first value when the acceleration switch is operated in the first time, and for deciding the signal generated from the acceleration switch to be the tap-up command signal in a case where a difference between the vehicle speed signal generated at the time of switching on the acceleration switch and the vehicle speed signal generated at the time of switching off the acceleration switch does not exceed a predetermined second value and for deciding the signal generated from the acceleration switch to be the acceleration command signal and storing the vehicle speed signal generated at the time of switching off the acceleration switch in the memory means as a new target cruising speed in a case where the difference between the vehicle speed signal generated at the time of switching on the acceleration switch and the vehicle speed signal generated at the time of switching off the acceleration switch exceeds the second value if the acceleration switch is operated after the first time; and an deceleration control means for deciding a signal generated from the coast switch to be the tap-down command signal in a case where a difference between the vehicle speed signal generated at the time of switching on the coast switch and the vehicle speed signal generated at the time of switching off the coast switch does not exceed a predetermined third value and for deciding the signal generated from the coast switch to be the coast command signal and storing the vehicle speed signal generated at the time of switching off the coast switch in the memory means as a new target cruising speed in a case where the difference between the vehicle speed signal generated at the time of switching on the coast switch and the vehicle speed signal generated at the time of switching off the coast switch exceeds the third value when the coast switch is operated in the first time, and for deciding the signal generated from the coast switch to be the tap-down command signal in a case where a difference between the vehicle speed signal generated at the time of switching on the coast switch and the vehicle speed signal generated at the time of switching off the coast switch does not exceed a predetermined fourth value and for deciding the signal generated from the coast switch to be the coast command signal and storing the vehicle speed signal generated at the time of switching off the coast switch in the memory means as a new target cruising speed in a case where the difference between the vehicle speed signal generated at the time of switching on the coast switch and the vehicle speed signal generated at the time of switching off the coast switch exceeds the fourth value if the coast switch is operated after the first time.

In the cruising control apparatus according to this invention, the acceleration control means and the deceleration control means have a pair of reference values, the acceleration control means decides the signal generated from the acceleration switch to be the tap-up command signal or the acceleration command signal by selectively using the first value and the second value different from each other depending whether the acceleration switch is operated in the first time or not, and the deceleration control means similarly decides the signal generated form the coast switch to be the tap-down command signal or the coast command signal by selectively using the third value or the fourth value different from each other depending whether the coast switch is operated in the first time or not. Accordingly, the acceleration control or the coast control is never started unexpectedly even when the acceleration switch or the coast switch is operated repeatedly in a short time and, the second and successive operation is done similarly to the first operation of the acceleration switch or the coast switch.

In the cruising control apparatus according to a preferred embodiment of this invention, the apparatus is further provided with a shift-down demand signal generating means for supplying a shift-down signal to the transmission controller of the vehicle when the actual vehicle speed falls below the speed lower than the target cruising speed by the predetermined value, and a prohibition time control means for prohibiting generation of the shift-down demand signal for predetermined periods of time response to the cruise command signal, the resume command signal, the acceleration command signal and the tap-up command signal. Further, in the cruising control apparatus according to another embodiment of this invention, the prohibition time control means is so designed as to maintain the shift-down demand signal in response to the operation of the acceleration switch when the automatic transmission of the vehicle is shifted down, and prohibits generation of the shift-down demand signal for predetermined periods of time when the cruise control is started and the acceleration command signal is not generated or when the acceleration switch is operated. Therefore, excessive shift change of the transmission in the vehicle is prevented in the transition period of the vehicle sped control, and comfortable driving feeling may be obtained without feeling a sense of incompatibility.

The cruising control apparatus according to the other embodiment of this invention is provided with a tap-up control means and a tap-down control means for renewing the target cruising speed stored in the memory means with a speed higher or lower than target speed by predetermined tap-up or tap-down speed (for example, 1.6 km/h) and for driving the actuator in the acceleration or the deceleration direction of the vehicle by outputting the tap-up initialize signal or the tap-down initialize signal in response to the tap-up command signal or the tap-down command signal, respectively. However, the tap-up control means and the tap-down control means interrupts the initialize signal so as not to drive the actuator in a case where the actual vehicle speed exceeds over or falls below the speed range predetermined against the renewed target cruising speed. Therefore, the actual vehicle speed does not deviate from the target speed range by a large margin even if the tap-up command signal or the tap-down signal is generated successively by the continuous operation of the acceleration switch or coast switch.

In the cruising control apparatus according to the other preferred embodiment of this invention, the apparatus is provided with a tap-up initialize calculation means for calculating output of a tap-up initialize signal in response to the tap-up command signal, a tap-down initialize calculation means for calculating output of a tap-down initialize signal in response to the tap-down command signal, a tap-up control means and a tap-down control means. The tap-up control means and the tap-down control means generated the initialize signal of the output power obtained by multiplying the original output of the initialize signal calculated by the tap-up and the tap-down initialize calculation means with a coefficient less than 1 in a case where the tap-up or the tap-down command signal is generated again before the actual vehicle speed arrives in a renewed target speed range. Accordingly, the difference between the actual vehicle speed and the target cruising speed stored in the memory means does not become larger even if the tap-up command signal or the tap-down command signal is generated repeatedly according to the continuous operation of the acceleration switch or the coast switch.

The cruising control apparatus according to the further embodiment of this invention is further provided with a timer means for counting duration time of the tap-up command signal and the tap-down command signal, in addition to the aforementioned tap-up initialize calculation means, the tap-down initialize calculation means, the tap-up control means and the tap-down control means. The tap-up control means writes a speed signal obtained by adding a signal corresponding to the tap-up speed to the vehicle speed signal generated at the time of the generation of the tap-up command signal in the memory means as a new target cruising speed and drives the actuator in the acceleration direction by outputting the tap-up initialize signal calculated by the tap-up initialize calculation means in response to the tap-up command signal, and generates an actuator driving signal according to constant speed control until the tap-up command signal disappears in a case the tap-up command signal is maintained even after the output of the tap-up initialize signal or until the duration time of the tap-up command signal counted by the timer means attains a predetermined period of time in a case the tap-up command signal is further maintained. Furthermore the tap-down control means writes a speed signal obtained by subtracting a signal corresponding to the tap-sown speed from the vehicle speed signal generated at the time of the generation of the tap-down command signal in the memory means as a new target cruising speed and drives the actuator in the deceleration direction by outputting the tap-down initialize signal calculated by the tap-down initialize calculation means in response to the tap-down command signal, and generates an actuator driving signal according to the constant speed control until the tap-down command signal disappears in a case where the tap-down command signal is maintained even after the output of he tap-down initialize signal or until the duration time of the tap-down command signal counted by the timer means attains a predetermined period of time in a case where the tap-down command signal is further maintained. Namely, in the cruising control apparatus according to this embodiment, the output to the actuator is never fixed after the output of the tap-up command signal or the tap-down command signal until the generation of the successive tap-up command signal or the tap-down command signal and the constant speed control (feed-back control) is started aiming the target cruising speed renewed in response to the tap-up command signal or the tap-down command signal before the tap-up command signal or the tap-down command signal disappears, therefore the difference between the actual vehicle speed and the stored target cruising speed is never enlarged and the actual vehicle speed is speedily conformed with the renewed target cruising speed even when the acceleration switch or the coast switch is operated repeatedly thereby generating the tap-up command signal or the tap-down command signal successively.

In the cruising control apparatus according to the other preferred embodiment of this invention, the apparatus is provided with a tap-up initialize calculation means and the tap-up control means The tap-up control means renews the target cruising speed by adding the predetermined tap-up speed (for example, 1.6 km/h) to the target speed stored in the memory means at the time of generation of the tap-up command signal in response to the tap-up command signal, and drives the actuator in the acceleration direction by outputting the tap-up initialize signal calculated by the tap-up calculation means in a case where the actual vehicle speed is within a difference range predetermined against the renewed target cruising speed stored in the memory means. On the other side, the tap-up control means prohibits the output of the tap-up initialize signal in a case where the actual vehicle speed falls below the difference range predetermined against the renewed target cruising speed and the constant acceleration control is performed in order to speedily conform the actual vehicle speed with the target cruising speed. Accordingly, the actuator is driven only by the actuator driving signal according to the constant acceleration control, thereby opening or closing the throttle valve in the case where the constant acceleration control is carried out, and a shock or a sense of incompatibility caused by abrupt acceleration is disolved even when the difference between the actual vehicle speed and the target cruising speed becomes larger remarkably by the continuous switch operation.

Further in the cruising control apparatus according to the other preferable embodiment of this invention, the apparatus is further provided with an acceleration-off calculation means for calculating output of an acceleration-off signal on basis of the vehicle speed signal generated at the time of generation of the acceleration command signal and an acceleration control means in addition to the tap-down initialize calculation means and the tap-down control means. The tap-down control means stores a speed signal obtained by subtracting a signal corresponding to a tap-down speed from the vehicle speed signal at the time of generation of the tap-down command signal in the memory means as a new target cruising speed in response to the tap-down command signal, and drives the actuator in the deceleration direction by outputting the signal obtained by adding the tap-down initialize signal calculated in the tap-down initialize calculation means and the acceleration-off signal calculated in the acceleration-off calculation means in a case where the tap-down command signal is generated according the switch operation at the time when the actual vehicle speed falls below the difference range predetermined against the target cruising speed and the constant acceleration control is executed. Accordingly, the shortage of the acceleration-off signal caused by the drastic alteration of the target speed is disolved by addition of the tap-down initialize signal, the over-shooting of the vehicle speed is speedily solved and the actual vehicle speed is conformed speedily with the renewed target cruising speed even if the tap-down operation is done during the constant acceleration control.

The cruising control apparatus according to the other embodiment of this invention is provided with a set initialize calculation means for calculating output of a set initialize signal, a timer means for counting duration time of the coast command signal, a regulative initialize calculation means for calculating output of a regulative initialize signal increasing in proportional to a period obtained by subtracting a predetermined period from the duration time of the coast command signal counted by the timer means and a coast control means. The coast control means drives the actuator in the deceleration direction by outputting an actuator driving signal in response to the coast command signal, and stores the vehicle speed signal generated from the speed sensor at the time of disappearance of the coast command signal in the memory means as a new target cruising speed. The coast control means compares the output of the regulative initialize signal calculated by the regulative initialize calculation means with the output of the set initialize signal calculated by the set initialize calculation means on basis of the vehicle speed signal at the time of the disappearance of the coast command signal when the coast command signal is continued for a long time more than a predetermined period of time, outputs the regulative initialize signal as a coast initialize signal in a case where the output of the regulative initialize signal is less than the output of the set initialize signal and outputs the set initialize signal as the coast initialize signal in a case where the output of the regulative initialize signal is not less than the output of the set initialize signal, thereby driving the actuator in the acceleration direction. Furthermore, the coast control means interrupts the output of the coast initialize signal when the duration time of the coast command signal obtained by the timer means is not longer than the predetermined period of time.

It is required for a little amount of time to start the throttle valve in the closing direction after the actuator begins to move in the deceleration direction in response to the coast command signal, and required a further amount of time to decrease the opening degree of the valve and close the throttle valve completely. Therefore, the coast initialize signal is outputted before the throttle valve is closed completely in a case where the duration time of the coast command signal is relatively short. In a case where the coast command signal is generated, whereby the throttle valve begins to move in the closing direction through the actuator after the predetermined period of time elapses without discontinuation of the command signal, and then the coast command signal disappears before the throttle valve arrives at the full-closing position, the regulative initialize signal does not grow into so large output power since the duration time is not so long. Therefore, the regulative initialize signal is output as a coast initialize signal in response to the disappearance of the coast command signal, thereby driving the actuator in the acceleration direction of the vehicle. In this time, the output of the relative initialize signal increases along with the increase of the duration time of the coast command signal, that is the decrease of the opening degree of the throttle valve, accordingly the regulative initialize signal is output as the coast initialize signal in an amount balanced with the opening degree of the throttle valve at the time of disappearance of the coast command signal.

When the duration time of the coast command signal becomes longer, the throttle valve gets near the full-closing position and the output of the regulative initialize signal increases gradually, and the set initialize signal is output as the coast initialize signal in place of the regulative initialize signal if the output of the regulative initialize signal exceeds the output of the set initialize signal obtained on basis of the vehicle speed at the time of disappearance of the coast command signal.

The output of the set initialize signal is equivalent to the momentum of actuator required for giving the opening degree corresponding to the target speed of the vehicle to the throttle valve, so that it is possible to obtain the opening degree of the throttle valve in agreement with the vehicle speed at the time of disappearance of the coast command signal only when the throttle valve is actuated in the opening direction from the full-closing position as much as the amount corresponding to the output of the set initialize signal. Accordingly, the coast initialize signal output from the coast control means as the coast initialize signal becomes proper in quantities by selecting a coefficient in the calculation formula of the regulative initialize signal so that the duration time of the coast command signal at the time when the output of the regulative initialize signal exceeds the output of the set initialize signal may coincide with the time required for the throttle valve to arrive at the full-closing position from the position at the time of generation of the coast command signal. Consequently, the actual vehicle speed coincides speedily with the renewed target cruising speed regardless of the duration time of the coast command switch, in other words regardless of an amount of speed reduction of the target cruising speed according to the coast operation.

BRIEF DESCRIPTION OF THE DRAWINGS

FIG. 14 is a flow chart illustrating the control shown in FIG. 12 and FIG. 13;

FIGS. 15 and 16 are time charts illustrating the control by the prohibition time control means in the fourth embodiment of the cruising control apparatus according to this invention;

DESCRIPTION OF THE PREFERRED EMBODIMENT

Embodiments of the cruising control apparatus according to th i s invention will be described below.

[Embodiment 1]

An explanation will be given about a cruising control apparatus according to the first embodiment of this invention with reference to FIG. 1 to FIG. 7.

Figure 1:
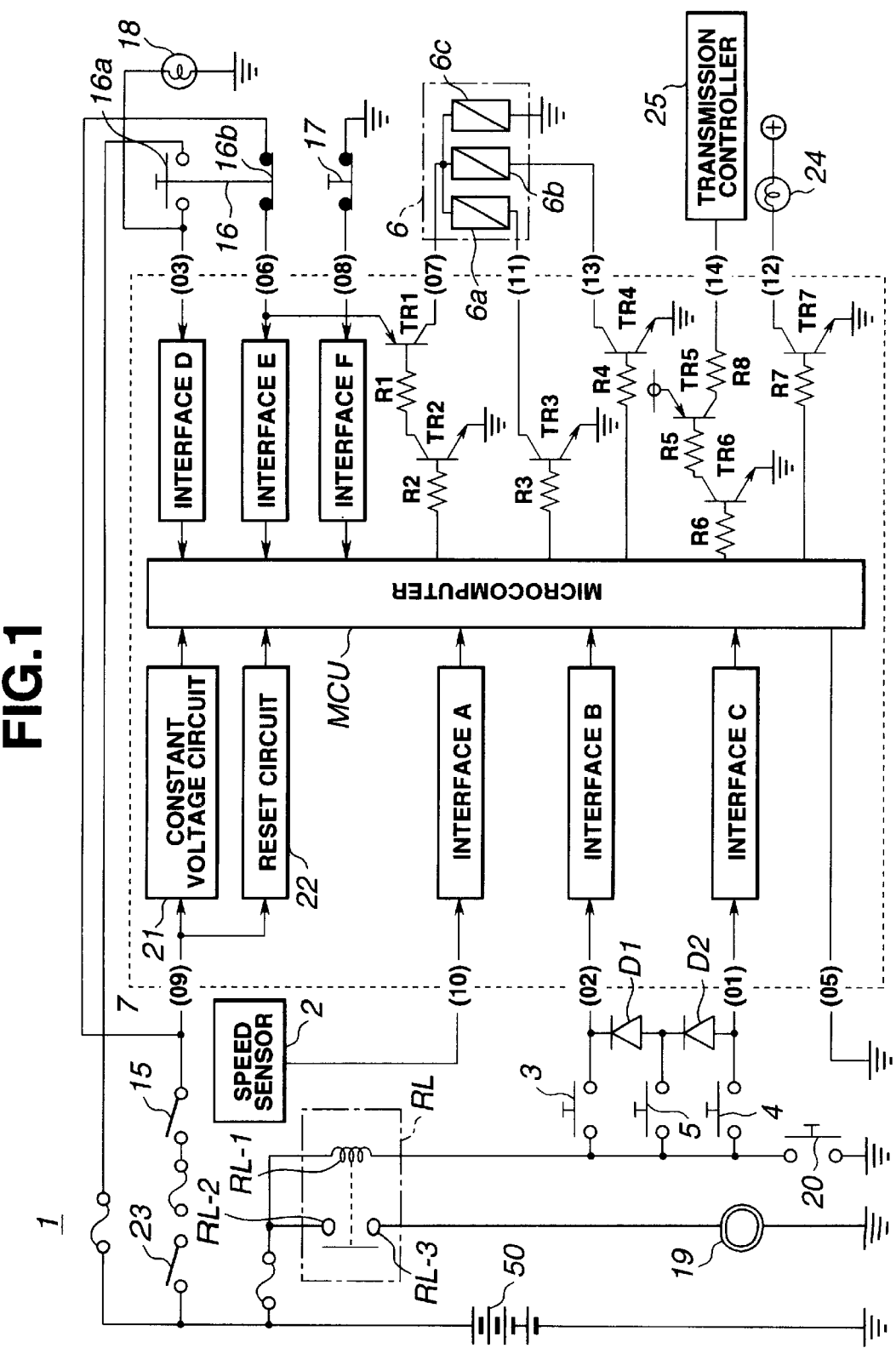
FIG. 1 is a circuit diagram in an embodiment of the cruising control apparatus according to this invention.

The cruising control apparatus 1 shown in FIG. 1 is composed mainly o a speed sensor 2, a set-coast switch 3, a resume-acceleration switch 4, a cancel switch 5, an actuator 6, a controller 7, and the controller 7 is provided with a memory means 8, a calculation means 9, a speed increase means 10, a speed decrease means 11, a counter 12, an acceleration control means 13 and a deceleration control means 14 in a microcomputer MCU.

The speed sensor 2 is housed in the speedometer of the vehicle, and generate a vehicle speed signal (vehicle speed data) proportional to an actual vehicle speed as pulse signals at the time when the vehicle is running. The vehicle speed data generated from the speed sensor 2 is taken into the controller 7 through a terminal No. 10 of the controller 7, converted by an interface A of the controller 7 and inputted to the microcomputer MCU.

The set-coast switch 3 is an auto-returnable switch disposed in the steering wheel of the vehicle and serves a double purpose of a set switch and a coast switch. The set-coast switch 3 is connected to a power source 50 through a relay coil RL-1 of a horn relay RL at an end, and connected to the cathode of a first diode D1 and a terminal No. 2 of the controller 7 at another end thereof.

The set-coast switch 3 has a triple function.

Namely, the first function of the set-coast switch 3 is to generate a cruise command signal according to setting operation, that is the off-operation after the on-operation of the set-coast switch 3 at the time when an ignition switch 23 and a main switch 15 of the cruising control apparatus 1 are switched on, and the vehicle is running in a state where the cruising control is cancelled.

The second function of the set-coast switch 3 is to generate a coast command signal according to the off-operation after the on-operation during the cruising control in order to decrease the actual vehicle speed in an amount corresponding to the on-operation time of the set-coast switch 3 and to renew a target cruising speed stored in the memory means 8 of the controller 7.

The third function of the set-coast switch 3 is to generate a tap-down command signal according to tap-down operation, that is the off-operation immediately after the on-operation during the cruising control in order to renew the target cruising speed by subtracting a predetermined tap-down speed (for example, 1.6 km/h) from the present vehicle speed or the target cruising speed presently stored in the memory means 8 of the controller 7.

The cruise command signal, the coast command signal and the tap-down command signal are taken into the controller 7 through the terminal No. 2, converted by an interface B of the controller 7 and inputted to the microcomputer MCU.

The resume-acceleration switch 4 is a switch of the auto-returnable type similarly to the set-coast switch 3, which is disposed in the steering wheel of the vehicle and serves a double purpose of a resume switch and an acceleration switch. The resume-acceleration switch 4 is connected to the power source 50 through the relay coil RL-1 of the horn relay RL at an end thereof, and another end of the resume-acceleration switch 4 is connected to the cathode of the second diode D2 and a terminal No. 1 of the controller 7.

The resume-acceleration switch 4 has also a triple function similarly to the set-coast switch 3.

The first function of the resume-acceleration switch 4 is to generate a resume command signal according to resume operation, that is the off-operation after the on-operation of the resume-acceleration switch 4 in a state where the cruising control has been cancelled in order to resume the cruising control at a speed stored in the memory means 8 as the target cruising speed before cancelling the cruising control.

The second function of the resume-acceleration switch 4 is to generate an acceleration command signal according to accelerating operation, that is the off-operation after the on-operation of the switch 4 during the cruising control in order to increase the actual vehicle speed as much as an amount corresponding to the on-operation time of the resume-acceleration switch 4 and to renew the target cruising speed with the present vehicle speed increased according to the accelerating operation.

The third function of the resume acceleration switch 4 is to generate a tap-up command signal according to tap-up operation, that is the off-operation immediately after the on-operation of the switch 4 during the cruising control in order to renew the target cruising speed by adding a predetermined tap-up speed (for example, 1.6 km/h) to the present vehicle speed or the target cruising speed presently stored in the memory means 8 of the controller 7.

The resume command signal, the acceleration command signal and the tap-up command signal are taken into the controller 7 through the terminal No. 1, and converted by an interface C of the controller 7 to be inputted to the microcomputer MCU.

The horn relay RL is connected to the power source 50 at a first normal-opened contact RL-2, and grounded through a horn 19 at a second normal-opened contact RL-3 thereof. The relay coil RL-1 of the horn relay RL is grounded through a horn switch 20.

The cancel switch 5 is a switch of the auto-returnable type disposed in the steering wheel of the vehicle similarly to the aforementioned set-coast switch 3 and the resume-acceleration switch 4. The cancel switch 5 is connected to the power source 50 through the relay coil RL-1 of the horn relay RL at an end thereof, and another end of the cancel switch 5 is connected to the anode of the first diode D1 and the anode of the second diode D2.

The cancel switch 5 generates a cancel command signal according to the on-operation during the cruise control. The cancel command signal generated from the cancel switch 5 is taken into the controller 7 through the terminals No. 1 and No. 2 and inputted to the microcomputer MCU through the interfaces B and C provided in the controller 7. The cancel command signal is also generated at the time when a brake switch 16 is actuated and a normal-closed switch 16b of the brake switch 16 is switched off by operating a blake pedal (not shown), and when a mission switch 17 is switched off by switching over the automatic transmission (not shown) into the parking range from the neutral range or by operating the clutch pedal of the manual transmission (not shown) of the vehicle. A brake lump 18 is lit when a normal-opened switch 16a of the brake switch 16 is switched on by the braking operation. Furthermore, current supply to the actuator 6 is interrupted according to the switching off of the normal-closed switch 16b of the brake switch 16.

The brake switch 16 is provided with the normal-opened switch 16a and the normal-closed switch 16b as mentioned above. In the brake switch 16, the normal-opened switch 16a is switched on and the normal-closed switch 16b is switched off by operating the brake pedal. Accordingly, the electric potential is applied on the microcomputer MCU from the power source 50 through a terminal No. 3 and an interface D of the controller 7 when the normal-opened switch 16a is switched on by operating the brake pedal, and the electric potential applied from the power source 50 to the microcomputer MCU through a terminal No. 6 and an interface E is interrupted if the normal-closed switch 16b is switched off by operating the brake pedal. When the automatic transmission (not shown) of the vehicle is shifted from the neutral range into the parking range, or the clutch pedal of the manual transmission (not shown) of the vehicle is operated, the mission switch 17 is switched off, thereby interrupting the grounding circuit connected to the microcomputer MCU through a terminal No. 8 and an interface F.

The actuator 6 is provided with a sealed negative pressure chamber formed in an actuator case (not shown) and an output member energized by a return spring and connected to the throttle valve of the vehicle movably according to a negative pressure level in the negative pressure chamber, and further provided with a vacuum valve 6a, a bent valve 6b and a safety valve 6c which communicate with the negative pressure chamber at the respective ends on one side thereof.

The output member of the actuator 6 moves so as to reduce the volume of the negative pressure chamber when the negative pressure level (vacuum level) in the chamber becomes higher, thereby driving the throttle valve in the opening direction against elasticity of the return spring. Contrary to above, if the negative pressure level in the chamber becomes lower, the output member of the actuator 6 returns so as to increase the volume of the negative pressure chamber according to the elasticity of the return spring, whereby the throttle valve is forced to be driven in the closing direction.

The vacuum valve 6b of the actuator 6, which is a normal-closed electromagnetic valve, is connected to the collector of a first switching transistor TR1 (pnp-type) through a terminal No. 7 of the controller 7 at the upper stream side of its valve coil, and connected to the collector of a third switching transistor TR3 (npn-type) through a terminal No. 11 of the controller 7 at the lower stream side of the valve coil thereof. The first switching transistor TR1 is connected to the brake switch 16 through the terminal No. 6 of the controller 7 at the emitter, and the base of the transistor TR1 is connected to the collector of a second switching transistor TR2 (npn-type) through a resistor R1. The second switching transistor TR2 is grounded at the emitter, and the base of the transistor TR2 is connected to the microcomputer MCU through a resistor R2. The third switching transistor TR3 is grounded at the emitter and connected to the microcomputer MCU through a resistor R3 at the base thereof.

The vacuum valve 6a of the actuator 6 communicates with the intake manifold (negative pressure source) of the engine on the other side thereof. Therefore, the vacuum valve 6a has a function to introduce the negative pressure generated by the engine into the negative pressure chamber from the intake manifold for a time as long as the opening period of the valve 6a when the valve coil is excited by turning on the second switching transistor TR2, the first switching transistor TR1 and the third switching transistor TR3 successively and the valve 6a is opened during the working of engine. On the other hand, the vacuum valve 6a has a function to isolate the negative pressure chamber from the negative pressure in the intake manifold when the valve 6a is closed by interrupting the conductive path to the valve coil. In a case where the vacuum valve 6a is replaced with a negative pressure generating motor, the motor communicates with the negative pressure chamber and the negative pressure is introduced into the negative pressure chamber of the actuator 6 only when the motor works.

The vent valve 6b of the actuator 6, which is a normal-openend electromagnetic valve, is connected to the collector of the first switching transistor TR1 through the terminal No. 7 of the controller 7 at the upper stream side of its valve coil, and connected to the collector of a fourth switching transistor TR4 through a terminal No. 13 of the controller 7 at the lower stream side of the valve coil thereof. The fourth switching transistor TR4 is grounded at the emitter and connected to the microcomputer MCU through a resistor R4 at the base thereof.

The vent valve 6b are opened to the atmosphere on the other side thereof, therefore isolates the negative pressure chamber of the actuator 6 from the atmosphere when the valve 6b is closed according to the excitation of the valve coil by turning on the second switching transistor TR2, the first switching transistor TR1 and the fourth switching transistor TR4. On the other hand, the vent valve 6b drives the output member of the actuator 6 in the returning direction (closing direction of the throttle valve) by opening the negative pressure chamber into the atmosphere when the valve 6b is opened by interrupting the conductive path to the valve coil thereof.

The safety valve 6c of the actuator 6, which is a normal-opened electromagnetic valve, is connected to the collector of the first switching transistor TR1 through the terminal No. 7 of the controller at the upper stream side of its valve coil, and grounded at the lower stream side of the valve coil.

The safety valve 6c is also opened to the atmosphere on the other side thereof, therefore isolates the negative pressure chamber of the actuator 6 from the atmosphere when the valve 6c is closed according to the excitation of the valve coil by turning on the second switching transistor TR2 and the first switching transistor TR1, and drives the output member of the actuator 6 so as to return the output member in the initial state before the cruising control is started.

As described above, the actuator 6 is so structured as to drive the throttle valve in the opening direction through the output member when the negative pressure level in the negative pressure chamber becomes higher by exciting the valve coil of the vacuum valve 6a at the same time of exciting the valve coils of the vent valve 6b and the safety valve 6c, and drive the throttle valve in the closing direction through the output member if the negative pressure level in the chamber becomes lower by cutting off the current supply to the valve coil of the vacuum valve 6a at the same time of cutting off the current supply to the valve coil of the safety valve 6c or the vent valve 6b in the contrary.

On the other side, the controller 7 is also provided with a constant voltage circuit 21 and a reset circuit 22 in addition to the above-mentioned interfaces A,B,C,D,E and F.

The constant voltage circuit 21 is connected to the main switch 15 of the cruising control apparatus 1 through a terminal No. 9 of the controller 7 at an end thereof, and connected to the microcomputer MCU at another end thereof. The constant voltage circuit 21 supplies electric power with predetermined potential to the microcomputer MCU when the main switch 15 is switched on by the driver, for example.

The reset circuit 22 is connected to the main switch 15 through the terminal No. 9 of the controller 7 at an end, and another end of the reset circuit 22 is connected to the microcomputer MCU. The reset circuit 22 restore the microcomputer MCU in the initial state by switching on the main switch 15 of the cruising control apparatus 1.

The microcomputer MCU in the controller 7 is provided with the memory means 8, the calculation means 9, the speed increase means 10, the speed decrease means 11, the counter 12, the acceleration control means 13 and the deceleration control means 14 as mentioned above.

The memory means 8 stores the vehicle speed signal generated from the speed sensor 2 in the predetermined memory area as a target cruising speed if the cruise command signal is generated by switching off the set-coast switch 3 after the on-operation in the case where the ignition switch 23 and the main switch 15 are switched on and the vehicle is running in the state of cancelling the automatic cruising control.

The calculation means 9 compares the vehicle speed signal generated from the speed sensor 2 with the speed signal stored in the memory means 8 as the target cruising speed in response to the cruise command signal and executes calculation using a predetermined formula according to the obtained difference between the both signals and acceleration obtained from a change rate of the vehicle speed signal within a defined period of time.

In the calculation means 9, if the calculation result is negative value, the vehicle speed is decided to be lowered by the microcomputer MCU and the speed increase means 10 is actuated for a period corresponding to the calculation result. Contrary to above, when the calculation result is positive value, the vehicle speed is decided to be increased by the microcomputer MCU and the speed decrease means 11 is actuated for a period corresponding to the calculation result.

The speed increase means 10 works at the time when the calculation result by the calculation means 9 is negative value, and generates a vent valve closing signal, a safety valve closing signal and a vacuum valve opening signal. Namely, the first switching transistor TR1 is turned on by supplying a base current to the second switching transistor TR2 at the time of starting the cruising control, therefore the safety valve 6c of the actuator 6 is closed, the vent valve 6b is closed by supplying a base current to the fourth switching transistor TR4, and the vacuum valve 6a is opened by supplying a base current to the third switching transistor TR3. Consequently, the negative pressure level becomes higher in the negative pressure chamber of the actuator 6 and the throttle valve is driven in the opening side, whereby the cruising control is performed so as to conform the vehicle speed signal generated from the speed sensor 2 with the speed signal stored in the memory means 8 as the target cruising speed.

The speed decrease means 11 works at the time when the calculation result by the calculation means 9 is positive value, and generates a vent valve opening signal, a safety valve closing signal and a vacuum valve closing signal. In this time, the second and the first switching transistor TR2 and TR1 are turned on as mentioned above, therefore the safety valve 6c of the actuator 6 is closed, the vent valve 6b is opened by cutting off the base current to the fourth switching transistor TR4 and the vacuum valve 6a is closed by cutting off the base current to the third switching transistor TR3. Accordingly, the negative pressure level in the negative pressure chamber of the actuator 6 becomes lower and throttle valve is driven in the closing side, whereby the cruising control is performed so as to conform the vehicle speed signal generated from the speed sensor 2 with the speed signal stored in the memory means 8 as the target cruising speed.

The counter 12 counts the number of on-off operation of the set-coast switch 3 during the cruising control. An increment of the count number in the counter 12 is carried out in a case where the set-coast switch 3 is operated during the cruising control and a difference obtained by subtracting the vehicle speed signal generated at the time of switching off the set-coast switch 3 from the vehicle speed signal generated at the time of switching on the set-coast switch 3 does not exceed a third reference value C or a fourth reference value D which is stored in the deceleration control means 14 as described later. On the other side, the counter 12 is reset and the count number is cleared in a case where the aforementioned difference between the vehicle speed signals exceeds the third reference value C or the fourth reference value D. The count number in the counter 12 is used for decision as to whether the set-coast switch 3 is operated in the first time or not.

The counter 12 also counts the number of on-off operation of the resume-acceleration switch 4 during the cruising control. The increment of the count number in the counter 12 is carried out in a case where the resume-acceleration switch 4 is operated during the cruise control and a difference obtained by subtracting the vehicle speed signal generated at the time of switching on the resume-acceleration switch 4 from the vehicle speed signal generated at the time of switching off the resume-acceleration switch 4 does not exceed a first reference value A or a second reference value B which is stored in the acceleration control means 13 as described later. On the other side, the counter 12 is reset and the count number is cleared in a case where the aforementioned difference between the vehicle speed signals exceeds the first reference value A or the second reference value B. The count number in the counter 12 is used for decision as to whether the resume-acceleration switch 4 is operated in the first time or not.

The acceleration control means 13 stores the predetermined first reference value A and the second reference value B, respectively. The numerical value of 1.6 km/h is selected as the first reference value A, and the numerical value of 3 km/h which is larger than the first reference value A is selected as the second reference value B in this example. The first and second reference values A and B may be selected adequately according to performance of the vehicle to be mounted with the cruising control apparatus 1, and the first reference value A is preferable to be smaller than the second reference value B.

The acceleration control means 13 recognizes the difference obtained by subtracting the vehicle speed signal generated at the time of switching on the resume-acceleration switch 4 from the vehicle speed signal generated at the time of switching off the resume-acceleration switch 4, and decides whether the tap-up control should be done or the acceleration should be done by comparing the aforementioned difference with the first reference value A in a case where the resume-acceleration switch 4 is determined to be operated in the first time by the counter 12. Furthermore, the acceleration control means 13 decides whether the tap-up control should be done or the acceleration control should be done by comparing the aforementioned difference with the second reference value B in a case where the operation of the resume-acceleration switch 4 is determined not to be the first time by the counter 12.

Namely, when the operation of the resume-acceleration switch 4 is determined to be the first operation according to the count number of the counter 12, the acceleration control means 13 decides a signal generated from the resume-acceleration switch 4 to be the tap-up command signal and increases the count number of the counter 12 as much as "1" in the case where the difference obtained by subtracting the vehicle speed signal generated at the time of switching on the resume-acceleration switch 4 from the vehicle speed signal generated at the time of switching off the resume-acceleration switch 4 does not exceed the predetermined first reference value A (1.6 km/h in this example). Contrary to this, the acceleration control means 13 decides the signal generated form the resume-acceleration switch 4 to be the acceleration command signal, clears the count number of the counter 12 and stores the vehicle speed signal generated at the time of switching off the resume-acceleration switch 4 in the memory means 8 as new target cruising speed in the case where the difference between the vehicle speed signals exceeds the first reference value A.

Furthermore, if the operation of the resume-acceleration switch 4 determined to be the operation after the first operation according to the count number of the counter 12, the acceleration control means 13 decides the signal generated from the resume-acceleration switch 4 to be the tap-up command signal and increases the count number of the counter 12 as much as "1" in the case where the difference obtained by subtracting the vehicle speed signal generated at the time of switching on the resume-acceleration switch 4 from the vehicle speed signal generated at the time of switching off the resume-acceleration switch 4 does not exceed the predetermined second reference value B (3 km/h in this example). On the other hand, the acceleration control means 13 decides the signal generated from the resume-acceleration switch 4 to be the acceleration command signal, clears the count number of the counter 12 and stores the vehicle speed signal generated at the time of switching off the resume-acceleration switch 4 in the memory means 8 as the new target cruising speed in the case where the difference between the vehicle speed signals exceeds the second reference value B.

In the deceleration control means 14, the predetermined third reference value C and the fourth reference value D are respectively stored. The numerical value of 1.6 km/h is selected as the third reference value C, and the numerical value of 3 km/h, which is larger than the third reference value C, is selected as the fourth reference value D in this example. Although the third and fourth reference values C and D may be modified suitably according to the performance of the vehicle to be mounted with the cruising control apparatus 1, the third reference value C is desirable to be smaller than the fourth reference value D. The third and fourth reference values C and D are identical to the first and second reference values A and B, respectively, therefore, they were used in common in the control program.

The deceleration control means 14 recognizes the difference obtained by subtracting the vehicle speed signal generated at the time of switching on the set-coast switch 3 from the vehicle speed signal generated at the time of switching off the set-coast switch 3 and decides whether the tap-down control should be done or the coast control should be done by comparing the aforementioned difference with the third reference value C (first reference value A is used in common in this example) in a case where the set-coast switch 3 is determined to be operated in the first time by the counter 12. Furthermore, the deceleration control means 14 decides whether the tap-down control should be done or the coast control should be done by comparing the aforementioned difference with the fourth reference value D (second reference value B is used in common in this example) in a case where the operation of the set-coast switch 3 is determined not to be the first time by the counter 12.

Namely, when the operation of the set-coast switch 3 is determined to be the first operation according to the count number of the counter 12, the deceleration control means 14 decides a signal generated from the set-coast switch 3 to be the tap-down command signal and increases the count number of the counter 12 as much as "1" in the case where the difference obtained by subtracting the vehicle speed signal generated at the time of switching off the set-coast switch 3 from the vehicle speed signal generated at the time of switching on the set-coast switch 3 does not exceed the predetermined third reference value C (1.6 km/h in this example). Contrary to this, the deceleration control means 14 decides the signal generated from the set-coast switch 3 to be the coast command signal, clears the count number in the counter 12 and stores the vehicle speed signal generated at the time of switching off the set-coast switch 3 in the memory means 8 as the new target cruising speed in the case where the difference between the vehicle speed signals exceeds the third reference value C (reference value A).

Furthermore, if the operation of the set-coast switch 3 is determined to be the operation after the first time according to the count number of the counter 12, the deceleration control means 14 decides the signal generated from the set-coast switch 3 to be the tap-down command signal and increases the count number of the counter 12 as much as "1" in the case where the difference obtained by subtracting the vehicle speed signal generated at the time of switching off the set-coast switch 3 from the vehicle speed signal generated at the time of switching on the set-coast switch 3 does not exceed the predetermined fourth reference value D (3 km/h in this invention). On the other hand, the deceleration control means 14 decides the signal generated from the set-coast switch 3 to be the coast command signal, clears the count number of the counter 12 and stores the vehicle speed signal generated at the time of switching off the set-coast switch 3 in the memory means 8 as the new target cruising speed in the case where the difference between the vehicle speed signals exceeds the fourth reference value D (reference value B).

When the main switch 15 is switched on by, for example, the driver while the vehicle is running and the set-coast switch 3 is switched off after the on-operation in the state of cancelling the cruising control, the cruise command signal is generated, thereby turning on the second switching transistor TR2 in the controller 7. The output of a set initialize signal is calculated by the calculation means 9 in response to the cruise command signal, whereby the speed increase means 10 works and the actuator driving signal consisting of the vent valve closing signal, safety valve closing signal and the vacuum valve opening signal are given to the actuator 6.

The vent valve 6b and the safety valve 6c of the actuator 6 are closed and the vacuum valve 6a is opened through the speed increase means 10 according to the set initialize signal of the cruising control, whereby the negative pressure level in the negative pressure chamber of the actuator 6 becomes higher and the output member is driven in the opening direction as much as an amount corresponding to the output of the set-initialize signal so as to coincide the output member of the actuator 6 with the throttle valve. The cruising control is started so as to conform the vehicle speed signal generated from the speed sensor 2 with the speed signal stored in the memory means 8 as the target cruising speed.

According to the start of the cruising control, a seventh switching transistor TR7 (npn-type) is supplied with a base current from the microcomputer MCU through a resistor R7, thereby turning on the transistor TR7 and lightening a cruise lamp 24 connected with a terminal No. 12.

The controller 7 compares the vehicle speed signal generated by the speed sensor 2 and the speed signal stored in the memory means 8 at the time of the generation of the cruise command signal, and performs calculation according to the predetermined computing equation by using the obtained difference between the both speed signals and acceleration obtained from the change rate of the vehicle speed signal within the defined period of time. The cruising control is carried out so as to conform the vehicle speed signal generated by the speed sensor 2 with the speed signal stored in the memory means 8 as the target cruising speed by actuating the speed increase means 10 for a period corresponding to the result of the calculation in a case the negative value is obtained as the calculation result, and conversely by actuating the speed decrease means 11 for a period corresponding to the result of the calculation in a case the positive value is obtained as the calculation result.

Figure 2:
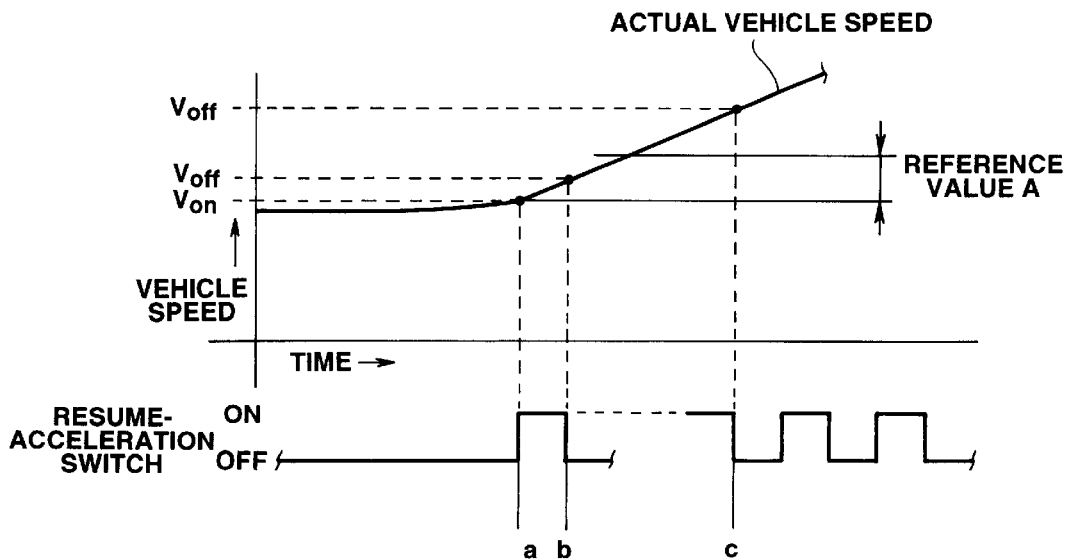
FIGS. 2 and 3 are time charts illustrating the speed increase control in the cruising control apparatus shown in FIG. 1.
Figure 3:
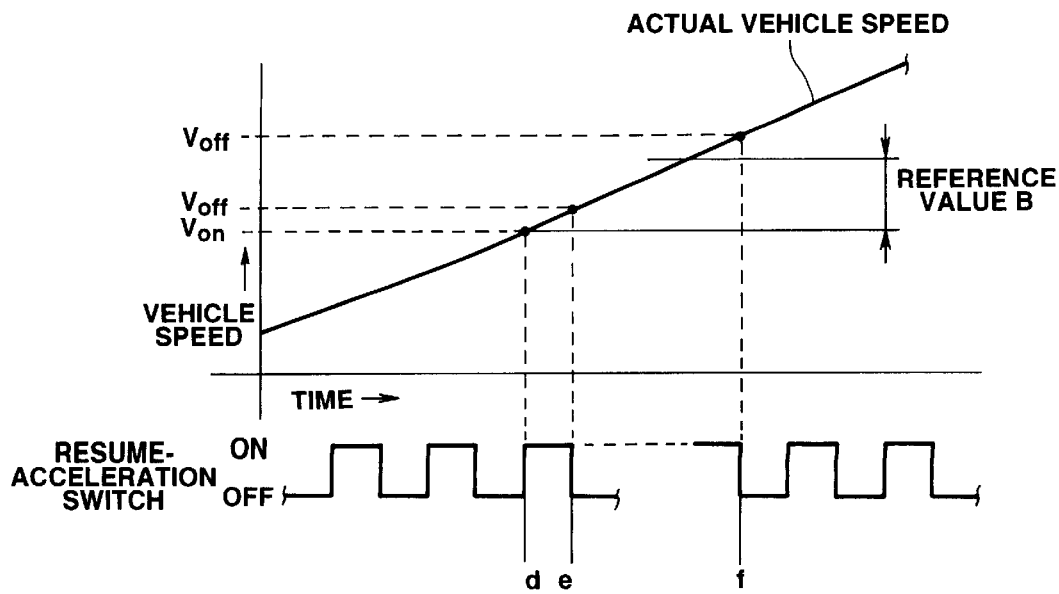
Figure 5:
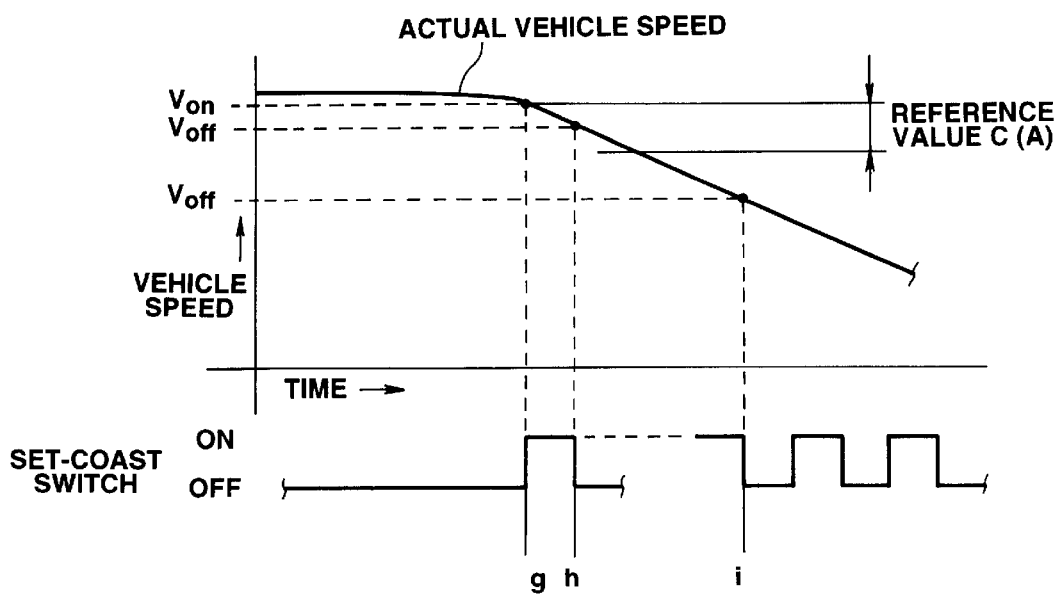
FIGS. 5 and 6 are time charts illustrating the speed decrease control in the cruising control apparatus shown in FIG. 1.
Figure 6:
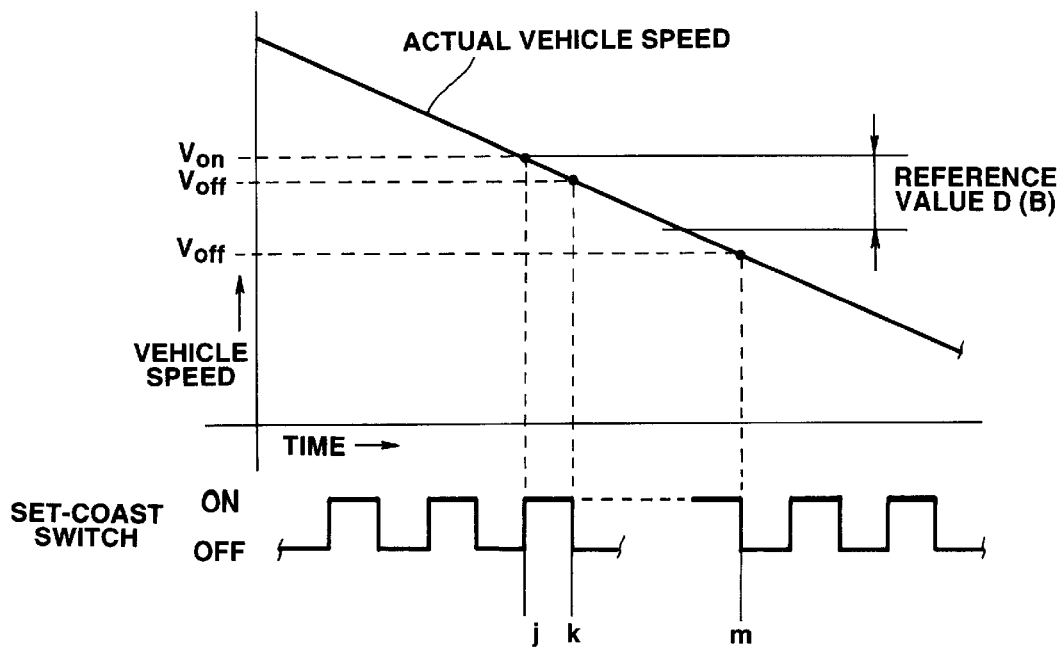

An explanation will be given below about the decision of the signals generated from the resume-acceleration switch 4 and the set-coast switch 3 on the assumption that the resume-acceleration switch 4 is operated as shown in FIGS. 2 and 3, and the set-coast switch 3 is operated as shown in FIGS. 5 and 6 during the cruising control.

In a case where the resume-acceleration switch 4 is switched on at time a and switched off at time b after the time a as shown in FIG. 2, the resume-acceleration switch 4 is determined to be operated in the first time according to the counter 12 since the count number of the counter 12 is zero. Accordingly, the comparison between the first reference value A (1.6 km/h) and the difference obtained by subtracting the vehicle speed signal generated at the time a when the resume-accelerate switch 4 is switched on from the vehicle speed signal generated at the time b when the resume-acceleration switch 4 is switched off is done by the acceleration control means 13.

The difference between the vehicle speed signal at the time b and the vehicle speed signal at the time a does not exceed the first reference value A as shown in FIG. 2, so that the signal generated form the resume-acceleration switch 4 is decided to be the tap-up command signal and the count number of the counter 12 is increased as much as "1".

Furthermore, in a case where the resume-acceleration switch 4 is switched on at the time a, and switched off at time c without being switched off at the time b as shown in FIG. 2, the resume-acceleration switch 4 is determined to be operated in first time since the count number of the count 12 is zero. Accordingly, the comparison between the first reference value A and the difference obtained by subtracting the vehicle speed signal generated at the time a when the resume-acceleration switch 4 is switched on from the vehicle speed signal generated at the time c when the resume-acceleration switch 4 is switched off is done by the acceleration control means 13.

The difference between the vehicle speed signal at the time c and the vehicle speed signal at the time a exceeds the first reference value A as shown in FIG. 2, therefore the signal generated from the resume-acceleration switch 4 is decided to be the acceleration command signal, the count number in the counter 12 is cleared and the vehicle speed signal generated at the time c when the resume-acceleration switch 4 is switched off is stored in the memory means 8 as the new target cruising speed.

Further in a case where the resume-acceleration switch 4 is switched on at time d and switched off at time e after repeating the on-off operation during the cruising control as shown in FIG. 3, the operation of the resume-acceleration switch 4 determined to be the operation after the first time according to the counter 12 since the count number in the counter 12 is not zero. Accordingly, the comparison between the second reference value B (3 km/h) and the difference obtained by subtracting the vehicle speed signal generated at the time d when the resume-acceleration switch 4 is switched on from the vehicle speed signal generated at the time e when the resume-acceleration switch 4 is switched off is done by the acceleration control means 13.

The difference between the vehicle signal at the time e and the vehicle signal at the time d does not exceed the second reference value B as shown in FIG. 3, so that the signal generated form the resume-acceleration switch 4 is decided to be the tap-up command signal and the count number of the counter 12 is increased as much as "1".

In a case where the resume-acceleration switch 4 is switched on at the time d and switched off at time f without being switched off at the time e after repeating the on-off operation during the cruising control as shown in FIG. 3, the operation of the resume-acceleration switch 4 is determined to be the operation after the first time since the count number in the counter 12 is not zero. Therefore, the comparison between the second reference value B and the difference obtained by subtracting the vehicle speed signal generated at the time d when the resume-acceleration switch 4 is switched on from the vehicle speed signal generated at the time f when the resume-acceleration switch 4 is switched off is done by the acceleration control means 13.

The difference between the vehicle signal at the time f and the vehicle signal at the time d exceeds the second reference value B as shown in FIG. 3, so that the signal generated from the resume-acceleration switch 4 is decided to be the acceleration command signal, the count number in the counter 12 is cleared and the vehicle speed signal generated at the time f when the resume-acceleration switch 4 is switched off is stored in the memory means 8 as the new target cruising speed.

On the other side, in a case where the set-coast switch 3 is switched on at time g, and switched off at time h after the time g during the cruising control as shown in FIG. 5, the set-coast switch 3 is determined to be operated in the first time since the count number of the counter 12 is zero. Accordingly, the comparison between the third reference value c (first reference value A) and the difference obtained by subtracting the vehicle speed signal generated at the time h when the set-coast switch 3 is switched off from the vehicle speed signal generated at the time f when the set-coast switch 3 is switched on is done by the deceleration control means 14.

The difference between the vehicle speed signal at the time g and the vehicle speed signal at the time h does not exceed the third reference value C as shown in FIG. 5, therefore the signal generated from the set-coast switch 3 is decided to be the tap-down command signal and the count number of the counter 12 is increased as much as "1".

Further, in a case where the set-coast switch 3 is switched on at the time g, and switched off at time i without being switched off at the time h as shown in FIG. 5, the set-coast switch 3 is determined similarly to be operated in the first time according to the count number of the counter 12. Accordingly, the comparison between the third reference value C and the difference obtained by subtracting the vehicle speed signal generated at the time i when the set-coast switch 3 is switched off from the vehicle speed signal generated at the time g when the set-coast switch 3 switched on is done by the deceleration control means 14.

The difference between the vehicle speed signal at the time g and the vehicle speed signal at the time i exceeds the third reference value C as shown in FIG. 5, so that the signal generated from the set-coast switch 3 is decided to be the coast command signal, the count number in the counter 12 is cleared and the vehicle speed signal generated at the time i when the set-coast witch 3 is switched off is stored in the memory means 8 as the new target cruising speed.

In a case where the set-coast switch 3 is switched on at time j and switched off at time k after repeating the on-off operation during the cruising control as shown in FIG. 6, the operation of the set-coast switch 3 is determined to be the operation after the first time according to the counter 12 since the count number in the counter 12 is not zero. Therefore, the comparison between the fourth reference value D (second reference value B) and the difference obtained by subtracting the vehicle speed signal generated at the time k when the set-coast switch 3 is switched off from the vehicle speed signal generated at the time j when the set-coast switch is switched on is done by the deceleration control means 14.

The difference between the vehicle speed signal at the time j and the vehicle speed signal at the time k does not exceed the fourth reference value D as shown in FIG. 6, so that the signal generated from the set-coast switch 3 is decided to be the tap-down command signal and the count number of the counter 12 is increased as much as "1".

Furthermore, in a case where the set-coast switch 3 is switched on at the time j and switched off at time m without being switched off at the time k after repeating the on-off operation during the cruising control as shown in FIG. 6, the operation of the set-coast switch 3 is similarly determined to be the operation after the first time according the count number of the counter 12. Accordingly, the comparison between the fourth reference value D and the difference obtained by subtracting the vehicle speed signal generated at the time m when the set-coast switch 3 is switched off from the vehicle speed signal generated at the time j when the set-coast switch 3 is switched on is done by the deceleration control means 14.

The difference between the vehicle speed signal at the time j and the vehicle speed signal at the time m exceeds the fourth reference value D as shown in FIG. 6, so that the signal generated from the set-coast switch 3 is decided to be the coast command signal, the count number in the counter 12 is cleared and the vehicle speed signal generated at the time m when the set-coast switch 3 is switched off is stored in the memory means 8 as the new target cruising speed.

Figure 4:
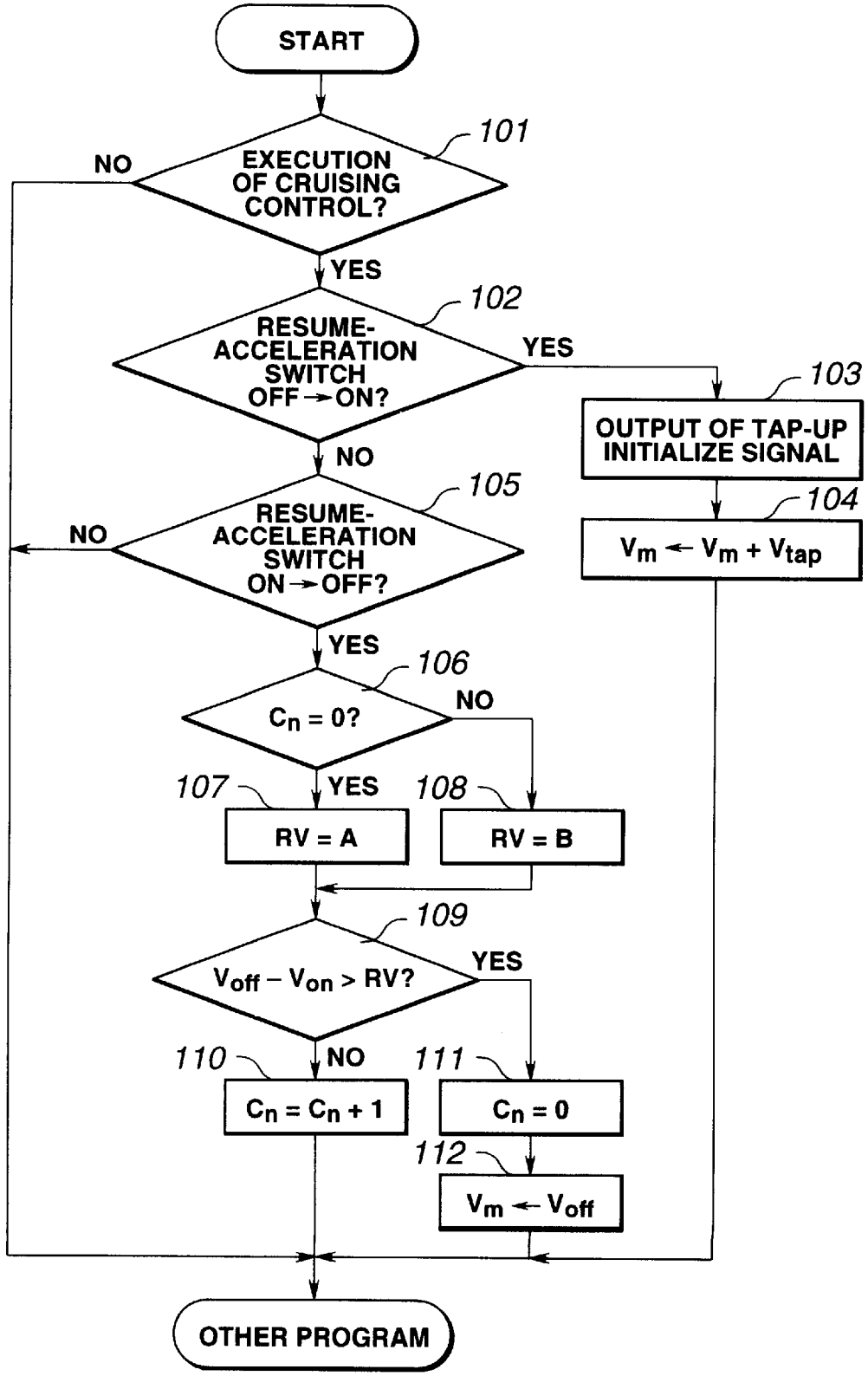
FIG. 4 is a flow chart illustrating the control shown in FIG. 2 and FIG. 3.
Figure 7:
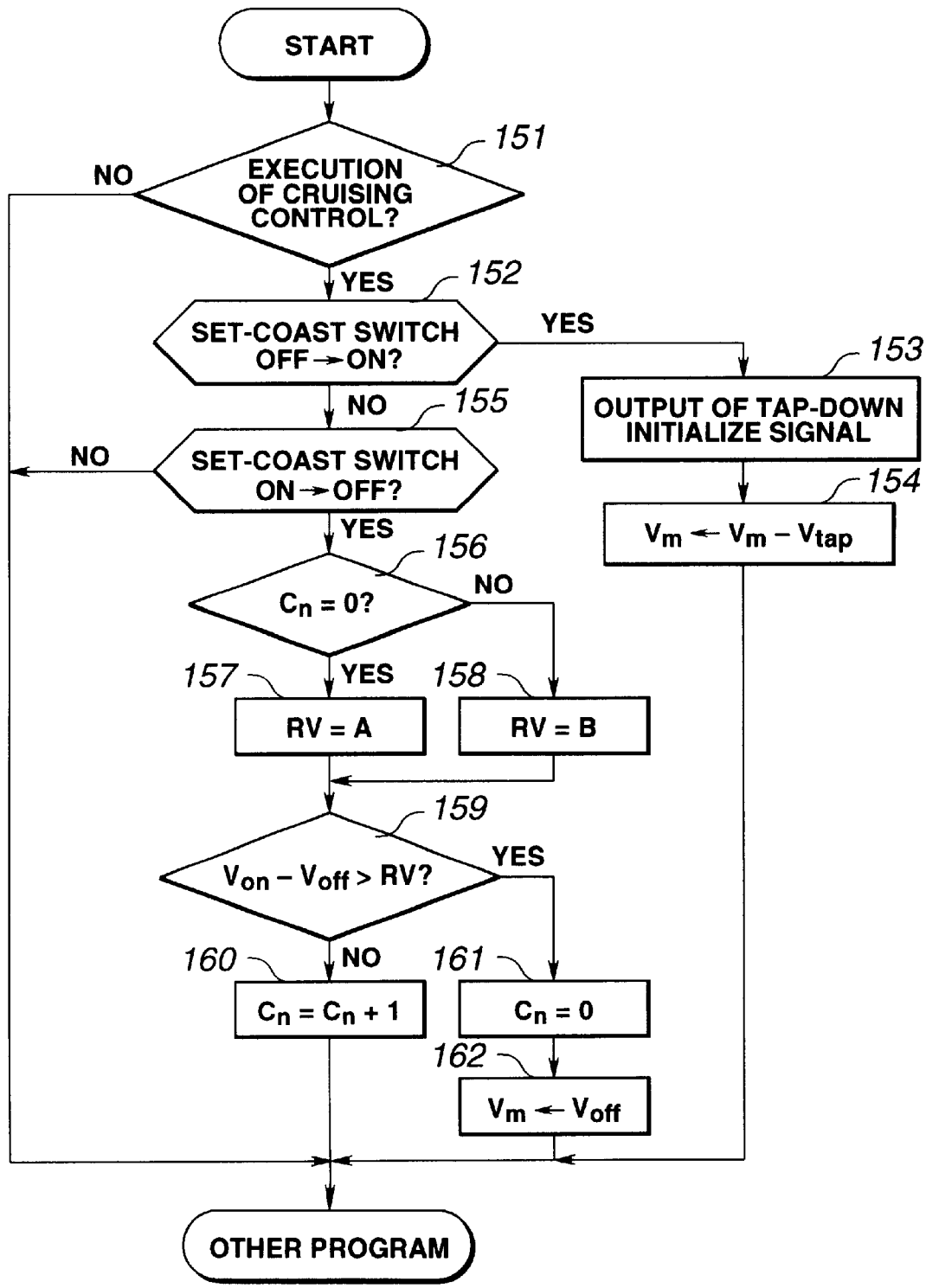
FIG. 7 is a flow chart illustrating the control shown in FIG. 5 and FIG. 6.

The aforementioned decision process of the signals is carried out according to the flow charts shown in FIG. 4 and FIG. 7.

When the resume-acceleration switch 4 is switched on at the time a shown in FIG. 2 under the cruising control, control proceeds to step 103 after decision at step 101 (YES) and step 102 (YES) as shown in FIG. 4. Control proceeds to step 104 after outputting the tap-up initialize signal at the step 103, the target cruising speed is renewed by newly storing the vehicle speed obtained by adding the predetermined tap-up speed $V_{tap}$ to the presently stored speed $V_m$ in the memory means 8 at the step 104, and then control returns to the step 101. In the renewal of the target cruising speed, the tap-up speed $V_{tap}$ may be added to the actual vehicle speed $V_{on}$ at the time a when the resume-acceleration switch 4 is switched on.

Consecutively, when the resume-acceleration switch 4, which was switched on at the time a, is switched off at the time b shown in FIG. 2, control proceeds to step 106 through the decision at the step 101 (YES), the step 102 (NO) and step 105 (YES) as shown in FIG. 4. In the step 106, decision is done to be "YES" because the count number Cn of the counter 12 remains in zero and control proceeds to step 109 after storing the first reference value A (1.6 km/h) into a memory area RV in the microcomputer MCU at the step 107.

The comparison is done at the step 109 between the first reference value A and the difference obtained by subtracting the vehicle speed $V_{on}$ at the time a when the resume-acceleration switch 4 is switched on from the vehicle speed $V_{off}$ at the time b when the resume-acceleration switch 4 is switched off, control proceeds to step 110 because the aforementioned difference is not exceed the first reference value A as shown in FIG. 2 and the increment of the count number Cn of the counter 12 is performed at the step 110. Then control returns to the step 101. Namely, in the case where the resume-acceleration switch 4 is switched on at the time a and successively switched off at the time b, the acceleration control means 13 decides the signal generated from the resume-acceleration switch 4 to be the tap-up command signal because the difference between the vehicle speed $V_{off}$ at the time b and the vehicle speed $V_{on}$ at the time a does not exceed the first reference value A. Therefore, the actuator 6 is driven in the acceleration direction by the tap-up initialize signal and actual vehicle speed is increased.

On the other hand, when the resume-acceleration switch 4 is switched on at the time a, and switched off at the time c without being switched off at the time b as shown in FIG. 2, control returns to the step 101 after outputting the tap-up initialize signal at the step 103 and renewing the target cruising speed by adding the tap-up speed $V_{tap}$ to the presently stored speed $V_m$ at the step 104, similarly to above, and control proceeds to the step 106 after the decision at step 101 (YES), the step 102 (NO) and the step 105 (YES) as shown in FIG. 4. The decision is done to be "YES" at the step 106 because the count number Cn of the counter 12 is similarly zero, control proceeds to the step 107 and the first reference value A is stored in the memory area RV at the step 107. Control further proceeds to the step 109 and the comparison is done in the step 109 between the first reference value A and the difference obtained by subtracting the vehicle speed $V_{on}$ at the time a when the resume-acceleration switch 4 is switched on from the vehicle speed $V_{off}$ at the time c when the resume-acceleration switch 4 is switched off. In this time, the aforementioned difference exceeds the first reference value A as shown in FIG. 2, therefore control proceeds to step 111 from the step 109 and further proceeds to step 112 after clearing the count number Cn in the counter 12 at the step 111. At the step 112, the target cruising speed is renewed by newly storing the actual vehicle speed $V_{off}$ at the time c when the resume-acceleration switch 4 is switched off in the memory means 8, and control returns to the step 101. Namely, in the case where the resume-acceleration switch 4 is switched on at the time a and switched off at the time c after the time b, the acceleration control means 13 decides the signal generated from the resume-acceleration switch 4 to be the acceleration command signal because the difference between the vehicle speed $V_{off}$ at the time c and the vehicle speed $V_{on}$ at the time a exceeds the first reference value A, and stores the vehicle speed signal at the time of switching off the resume-acceleration switch 4 in the memory means 8 as the target cruising speed. Whereby, the actuator 6 is driven in the acceleration direction and the actual vehicle speed is increased.

When the resume-acceleration switch 4 is switched on at the time d after repeating the on-off operation of the switch 4 as shown in FIG. 3 under the cruising control, control proceeds to the step 103 after the similar decision at the step 101 (YES) and the step 102 (YES) as shown in FIG. 4. Control proceeds to the step 104 after outputting the tap-up initialize signal at the step 103, the target cruising speed is renewed by newly storing the vehicle speed obtained by adding the predetermined tap-up speed $V_{tap}$ to the presently stored speed $V_m$ in the memory means 8 at the step 104, and control returns to the step 101. Also in this renewal of the target cruising speed, the tap-up speed $V_{tap}$ may be added to the actual vehicle speed $V_{on}$ at the time d when the resume-acceleration switch 4 is switched on.

When the resume-acceleration switch 4, which was switched on at the time d, is successively switched off at the time e shown in FIG. 3, control proceeds to the step 106 though the similar decision at the step 101 (YES), the step 102 (NO) and the step 105 (YES) as shown in FIG. 4. The decision is done to be "NO" at the step 106 because the count number Cn in the counter 12 is increased by the on-off operation carried out in advance to the on-operation of the resume-acceleration switch 4 at the time d, control proceeds to step 108 and the second reference value B (3 km/h) is stored into the memory area RV at the step 108.

Control proceeds to the step 109 from the step 108 and the comparison is done at the step 109 between the second reference value B and the difference obtained by subtracting the vehicle speed $V_{on}$ at the time d when the resume-acceleration switch 4 is switched on from the vehicle speed $V_{off}$ at the time e when the resume-acceleration switch 4 is switched off, control proceeds to the step 110 because the aforementioned difference does not exceed the second reference value B as shown in FIG. 3, and the increment of the count number Cn of the counter 12 is performed at the step 110. Then control return to the step 101. In this manner, in the case where the resume-acceleration switch 4 is switched on at the time d after the repetition of the on-off operation and successively switched off at the time e, the acceleration control means 13 decides the signal generated from the resume-acceleration switch 4 to be the tap-up command signal because the difference between the vehicle speed $V_{off}$ at the time e and the vehicle speed $V_{on}$ at the time d does not exceed the second reference value B. Therefore, the actuator 6 is driven in the acceleration direction by the tap-up initialize signal and the actual vehicle speed is increased.

On the other hand, when the resume-acceleration switch 4, which is switched on at the time d after repeating the on-off operation, is switched off at the time f without being switched off at the time e as shown in FIG. 3, control proceeds in the first place to the steps 103 and 104 through the decision at the step 101 (YES) and the step 102 (YES), the tap-up initialize signal is output at the step 103, the target cruising speed is renewed at the step 104 by adding the tap-up speed $V_{tap}$ to the presently stored speed $V_m$, and then control proceeds to the step 106 through the decision at the step 101 (YES), the step 102 (NO) and the step 105 (YES) after returning at the step 101 shown in FIG. 4. The decision is done to be "NO" at the step 106 according to the count number Cn of the counter 12 increased by the on-off operation before the time d, therefore control proceeds to the step 108 and the second reference value B is stored in the memory area RV at the step 108.

Control proceeds to the step 109 after processing of the step 108, the comparison is done at the step 109 between the second reference value B and the difference obtained by subtracting the vehicle speed $V_{on}$ at the time d when the resume-acceleration switch 4 is switched on from the vehicle speed $V_{off}$ at the time f when the resume-acceleration switch 4 is switched off. The aforementioned difference exceeds the second reference value B as shown in FIG. 3, therefore control proceeds to the step 111 from the step 109 and further proceeds to the step 112 after clearing the count number Cn in the counter 12 at the step 111. The target cruising speed is renewed by newly storing the actual vehicle speed $V_{off}$ at the time f when the resume-acceleration switch 4 switched off in the memory means 8 at the step 112, and control returns to the step 101. Namely, in the case where the resume-acceleration switch 4 is switched on at the time d after the repetition of the on-off operation, and switched off at the time f, the acceleration control means 13 in the controller 7 decides the signal generated form the resume-acceleration switch 4 to be the acceleration command signal because the difference between the vehicle speed $V_{off}$ at the time f and the vehicle speed $V_{on}$ at the time d exceeds the second reference value B, and stores the vehicle speed signal at the time of switching off the resume-acceleration switch 4 in the memory means 8 as the target cruising speed. Consequently, the actuator 6 is driven in the acceleration direction and the actual speed of the vehicle is increased.

When the set-coast switch 3 is switched on at the time g under the cruising control as shown in FIG. 5, control proceeds to step 153 after decision at step 151 (YES) and step 152 (YES) as shown in FIG. 7. The tap-down initialize signal is output at the step 153, and control returns to the step 151 after renewing the target cruising speed at step 154. The vehicle speed obtained by subtracting the predetermined tap-down speed $V_{tap}$ from the presently stored speed $V_m$ is stored in the memory means 8 as the new target cruising speed in the step 153. In this time, the tap-down speed $V_{tap}$ may be also subtracted from the actual vehicle speed $V_{on}$ at the time g when the set-coast switch 3 is switched on.

Successively, when the set-coast switch 3, which was switched on at the time g, is switched off at the time h shown in FIG. 5, control proceeds to step 156 through the decision at the step 151 (YES), the step 152 (NO) and step 155 (YES) as shown in FIG. 7. At the step 156, decision is done to be "YES" because the count number Cn of the counter 12 remains in zero, control proceeds to step 157 and the third reference value A (which is equivalent to value C and used in common as the third reference value in this program) is stored into the memory area RV at the step 157. Then control proceeds to step 159.

At the step 159, the comparison is done between the third reference value A and the difference obtained by subtracting the vehicle speed $V_{off}$ at the time h when the set-coast switch 3 is switched off from the vehicle speed $V_{on}$ at the time g when the set-coast switch 3 is switched on, control proceeds to step 160 because the aforementioned difference is not exceed the third reference value A as shown in FIG. 5 and control returns to the step 151 after the increment of the count number Cn of the counter 12 at the step 160. In such the manner, in the case where the set-coast switch 3 is switched on at the time g and successively switched off at the time h, the deceleration control means 14 in the controller 7 decides the signal generated from the set-coast switch 3 to be the tap-down command signal because the difference between the vehicle speed $V_{on}$ at the time g and the vehicle speed $V_{off}$ at the time h does not exceed the third reference value A. Therefore, the actuator 6 is driven in the deceleration direction by the tap-down initialize signal and actual vehicle speed is decreased.

On the other side, when the set-coast switch 3 is switched on at the time g during the cruising control, and switched off at the time i without being switched off at the time h as shown in FIG. 5, control proceeds to the steps 153 and 154 through the decision at the step 151 (YES) and the step 152 (YES) in the first place, the tap-down initialize signal is output at the step 153, the target cruising speed is renewed by subtracting the tap-down speed $V_{tap}$ from the presently stored speed $V_m$ at the step 154, then control returns to the step 151 and further proceeds to the step 156 through the decision at the step 151 (YES), the step 152 (NO) and the step 155 (YES) as shown in FIG. 7. At the step 156, the decision is done to be "YES" because the count number Cn of the counter 12 is similarly zero, control proceeds to the step 157 and the third reference value A is stored in the memory area RV at the step 157.

Control further proceeds to the step 159 and the comparison is done at the step 159 between the third reference value A and the difference obtained by subtracting the vehicle speed $V_{off}$ at the time i when the set-coast switch 3 is switched off from the vehicle speed $V_{on}$ at the time g when the set-coast switch 3 is switched on. In the aforementioned difference exceeds the third reference value A as shown in FIG. 5, accordingly control proceeds to step 161 from the step 159 and further proceeds to step 162 after clearing the count number Cn in the counter 12 at the step 161. At the step 162, the target cruising speed is renewed by newly storing the actual vehicle speed $V_{off}$ at the time i when the set-coast switch 3 is switched off in the memory means 8, and control returns to the step 151. Namely, in the case where the set-coast switch 3 is switched on at the time g and switched off at the time i after the time h, the deceleration control means 14 in the controller 7 decides the signal generated from the set-coast switch 3 to be the coast command signal because the difference between the vehicle speed $V_{on}$ at the time g and the vehicle speed $V_{off}$ at the time i exceeds the third reference value A, and stores the vehicle speed signal at the time of switching off the set-coast switch 3 in the memory means 8 as the target cruising speed. Consequently, the actuator 6 is driven in the deceleration direction and the actual vehicle speed is decreased.

When the set-coast switch 3 is switched on at the time j after repeating the on-off operation of the switch 3 under the cruising control as shown in FIG. 6, control proceeds to the step 153 after the similar decision at the step 151 (YES) and the step 152 (YES) as shown in FIG. 7. Control proceeds to the step 154 after outputting the tap-down initialize signal at the step 153, the target cruising speed is renewed by strong the vehicle speed obtained by subtracting the tap-down speed $V_{tap}$ from the presently stored speed $V_m$ in the memory means 8 at the step 154 and control returns to the step 151. In the renewal of the target cruising speed, the tap-down speed $V_{tap}$ may be also subtracted from the actual vehicle speed $V_{on}$ at the time j when the set-coast switch 3 is switched on.

When the set-coast switch 3, which was switched on at the time j, is switched off at the time k immediately after the time j as shown in FIG. 6, control proceeds to the step 156 through the similar decision at the step 151 (YES), the step 152 (NO) and the step 105 (YES) as shown in FIG. 7. At the step 156, the decision is done to be "NO" because the count number Cn in the counter 12 is increased by the on-off operation carried out in advance to the on-operation of the set-coast switch 3 at the time j, control proceeds to step 158 and the fourth reference value B (which is equivalent to value D and used in common as the fourth reference value in this program) is stored in the memory area RV at the step 158.

Control proceeds to the step 159 from the step 158 and the comparison is done at the step 159 between the fourth reference value B and the difference obtained by subtracting the vehicle speed $V_{off}$ at the time k when the set-coast switch 3 is switched off from the vehicle speed $V_{on}$ at the time j when the set-coast switch 3 is switched on. Control further proceeds to the step 160 because the aforementioned difference does not exceed the fourth reference value B as shown in FIG. 6, the increment of the count number Cn of the counter 12 is performed at the step 160, and then control returns to the step 151. Namely, in the case where the set-coast switch 3 is switched on at the time j after the repetition of the on-off operation of the switch 3 and successively switched off at the time k, the deceleration control means 14 of the controller 7 decides the signal generated form the set-coast switch 3 to be the tap-down command signal because the difference between the vehicle speed $V_{on}$ at the time j and the vehicle speed $V_{off}$ at the time k does not exceed the fourth reference value B. Accordingly, the actuator 6 is driven in the deceleration direction by the tap-down initialize signal and the actual vehicle speed is decreased.

On the other hand, when the set-coast switch 3, which is switched on at the time j after repeating the on-off operation of the switch 3, is switched off at the time m without being switched off at the time k as shown in FIG. 6, control proceeds in the first place to the steps 153 and 154 through the decision at the step 151 (YES) and the step 152 (YES), the tap-down initialize signal is output at the step 153, the target cruising speed is renewed at the step 154 by subtracting the tap-down speed $V_{tap}$ from the presently stored speed $V_m$, and then control proceeds to the step 156 through the decision at the step 151 (YES), the step 152 (NO) and the step 155 (YES) after returning to the step 151 shown in FIG. 7. The decision is done to be "NO" at the step 156 since the count number Cn of the counter 12 is increased by the on-off operation before the time j, so that control proceeds to the step 158 and the fourth reference value B is stored in the memory area RV at the step 158.

Control proceeds to the step 159 from the step 158, the comparison is done at the step 159 between the fourth reference value B and the difference obtained by subtracting the vehicle speed $V_{off}$ at the time m when the set-coast switch 3 is switched off from the vehicle speed $V_{on}$ at the time j when the set-coast switch 3 is switched on. The aforementioned difference exceeds the fourth reference value B as shown in FIG. 6, accordingly control proceeds to the step 161 and further proceeds to the step 162 after clearing the count number Cn of the counter 12 at the step 161. At the step 162, the target cruising speed is renewed by storing the actual vehicle speed $V_{off}$ at the time m when the set-coast switch 3 is switched off in the memory means 8, and control returns to the step 151. In this manner, in the case where the set-coast switch 3 is switched on at the time j after the repetition of the on-off operation, and switched off at the time m, the deceleration control means 14 in the controller 7 decides the signal generated form the set-coast switch 3 to be the coast command signal because the difference between the vehicle speed $V_{on}$ at the time j and the vehicle speed $V_{off}$ at the time m exceeds the fourth reference value B, and stores the vehicle speed signal at the time of switching off the set-coast switch 3 in the memory means 8 as the target cruising speed. Consequently, the actuator 6 is driven in the deceleration direction and the actual vehicle speed is decreased.

Accordingly, it is possible to prevent that the acceleration or the coast control starts unexpectedly even if the acceleration switch or the coast switch is operated repeatedly and the first and successive operation of the switch is done similarly to the first operation of switch.

[Embodiment 2]

An explanation will be given about a cruising control apparatus according to the second embodiment of this invention with reference to FIG. 8 to FIG. 11.

The cruising control apparatus 1 according to this embodiment has structure basically similar to the cruising control apparatus shown in FIG. 1 as the first embodiment, and is composed mainly of the speed sensor 2, the set-coast switch 3, the resume-acceleration switch 4, the cancel switch 5, the actuator 6 and the controller 7 which is further provided with a shift-down demand signal generating means 26 and a prohibition time control means 27 in addition to the memory means 8, the calculation means 9, the speed increase means 10 and the speed decrease means 11 in the microcomputer MCU. Therefore, the explanation concerning the formation or the function previously described in the first embodiment is omitted.

The shift-down demand signal generating means 26 has a function to generate a shift-down demand signal and to supply the signal to a transmission controller 25 of the vehicle at the time when a first and a second prohibition period of time elapses in a prohibition time control means 27 as described later, and another function to generate the shift-down demand signal and to supply the signal to the transmission controller 25 at the time when a difference between the vehicle speed signal generated form the speed sensor 2 and the speed signal stored in the memory means 8 exceeds a predetermined value. The shift-down demand signal is generated in a form of a pulse signal and switched over into a signal to demand the shift-down of the transmission (for example, 100 msec against one cycle of 200 msec) from a signal not to demand the shift-down (for example, 50 msec against on cycle of 200 msec) by changing a duty ratio of the pulse signal.

The shift-down demand signal generated by the shift-down demand signal generating means 26 is supplied to a sixth switching transistor TR6 (npn-type) as a base current through a resistor R6 in the first place, whereby a fifth switching transistor TR5 (pnp-type) is turned on through a resistor R5 and the signal is supplied to the transmission controller 25 of the vehicle from a terminal No. 14 of the controller 7 through a resistor R8.

When the shift-down demand signal is supplied to the transmission controller 25, the controller 25 detects the shift-down demand signal as one of logic for performing shift-down of the transmission (automatic transmission, not shown) of the vehicle, thereby inspiring the shift-down of the transmission, on the other side the transmission controller 25 detects a shift-up command signal supplied to the controller 25 as one of logic for performing shift-up of the transmission (automatic transmission), thereby inspiring the shift-up of the transmission.

The prohibition time control means 27 has mainly a double function. The first function of the prohibition time control means 27 is to prohibit generation of the shift-down demand signal from the shift-down demand signal generating means 26 for a time as long as a predetermined first prohibition period T1 (from time b to time c shown in FIG. 8) in a case where the cruise command signal is generated at the time b according to the set operation, that is the off-operation of the set-coast switch 3 at the time b after the on-operation at time a shown in FIG. 8 in a state where the cruising control is not carried out.

Figure 9:
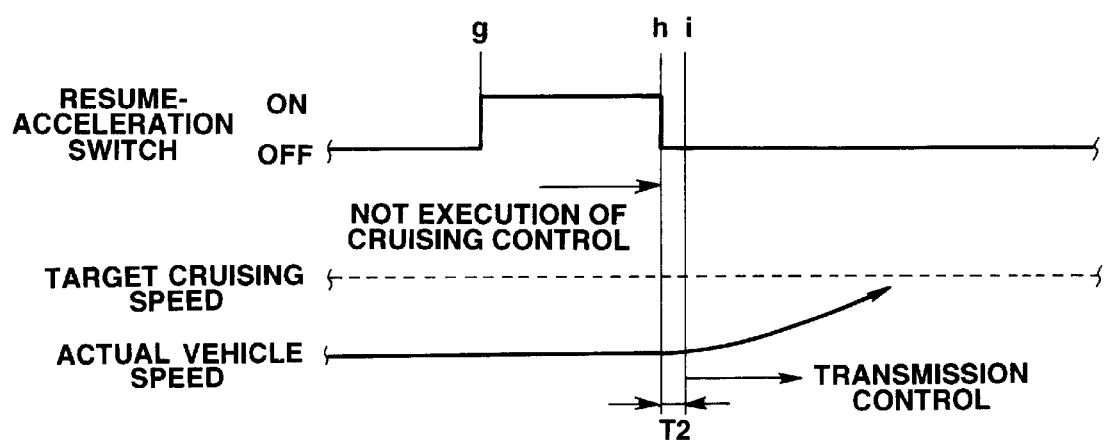

The second function of the prohibition time control means 27 is to prohibit the generation of the shift-down demand signal from the shift-down demand signal generating means 26 for a time as long as a predetermined second prohibition period T2 (from time h to time i shown in FIG. 9) in a case where the resume command signal is generated according to the resume operation, that is the off-operation of the resume-acceleration switch 4 at the time h after the off-operation at time g shown in FIG. 9 in a state where the cruising control is not carried out.

Figure 10:
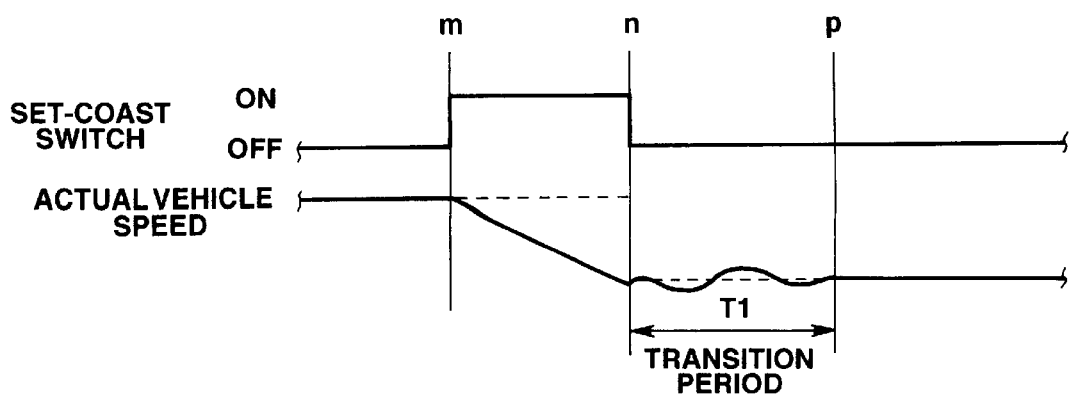

Furthermore, the prohibition time control means 27 has a function to prohibit the generation of the shift-down demand signal from the shift-down demand signal generating means 26 for a time as long as the predetermined first prohibition period T1 (from time n to time p shown in FIG. 10) in a case where the coast command signal is generated by switching off the set-coast switch 3 at the time n after switching on it at time m shown in FIG. 10 during the cruising control.

In this embodiment, numerical value of 5 sec is selected as the first prohibition period T1, and numerical value of 0.6 sec, which is smaller than the first prohibition period T1, is selected as the second prohibition period T2. Namely, when the cruise command signal is generated from the set-coast switch 3, the set initialize signal is output and the actuator 6 becomes into a transient state according to the set initialize signal, therefore it is necessary to sufficiently delay the generation of the shift-down demand signal from the shift-down demand signal generating means 26 in accordance with duration time of the set initialize signal by setting the first prohibition period T1 longer than the second prohibition period T2. Contrary to this, the actuator 6 is controlled in the acceleration direction of the vehicle by the actuator driving signal according to the acceleration control without outputting the initialize signal in a case where the resume command signal is generated from the resume-acceleration switch 4, therefore it is necessary to generated the shift-down demand signal in relatively earlier stage in accordance with the constant acceleration control for the actuator 6 by setting the second prohibition period T2 shorter than the first prohibition period T1.

Figure 8:
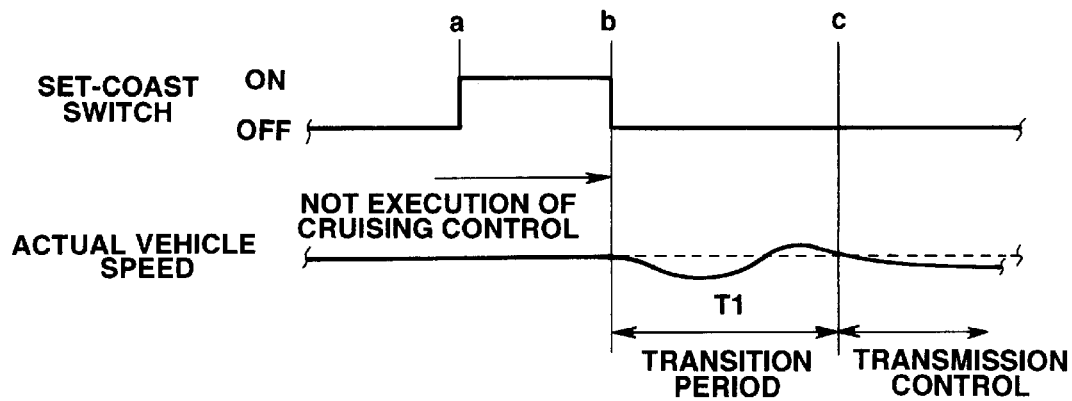
FIGS. 8 to 10 are time charts illustrating the control by the prohibition time control means in the second embodiment of the cruising control apparatus according to this invention.

When the main switch 15 is switched on by, for example, the driver while the vehicle is running and the set-coast switch 3 is switched off at the time b after the on-operation at the time a shown in FIG. 8 in the state of cancelling the cruising control, the first prohibition period T1 is set by the prohibition time control means 27, accordingly the shift-down demand signal is never supplied to the transmission controller 25 from the shift-down demand signal generating means 26 for a time as long as the first prohibition period T1.

When the set-coast switch 3 is switched off at the time b shown in FIG. 8, the cruise command signal is generated, thereby turning on the second switching transistor TR2. The speed increase means 10 works by the output of the set initialize signal calculated by the calculation means 9 and the actuator driving signal consisting of the vent valve closing signal, the safety valve closing signal and the vacuum valve opening signal is supplied to the actuator 6.

The vent valve 6b and the safety valve 6c of the actuator 6 are closed and the vacuum valve 6a is opened through the speed increase means 10 according to the set initialize signal of the cruising control, whereby the negative pressure level in the negative pressure chamber of the actuator 6 becomes higher and the output member is driven as much as an amount corresponding to the set initialize signal so as to coincide the output member of the actuator 6 with throttle valve of the vehicle. After the output of the set initialize signal, the cruising control is started so as to conform the vehicle speed signal generated from the speed sensor 2 with the speed signal stored in the memory means 8 as the target cruising speed.

The controller 7 compares the vehicle speed signal generated by the speed sensor 2 and the speed signal stored in the memory means 8 at the time of the generation of the cruise command signal, and executes calculation according to a predetermined computing equation by using the obtained difference between the both speed signals and acceleration obtained from the change rate of the vehicle speed signal within the defined period of time. The cruising control is performed so as to conform the vehicle speed signal generated from the speed sensor 2 with the speed signal stored in the memory means 8 as the target cruising speed by actuating the speed increase means 10 for a period corresponding to the result of the calculation in a case where negative value is obtained as the calculation result, and conversely by actuating the speed decrease means 11 for a period corresponding to the result of the calculation in a case where positive value is obtained as the calculation result.

When the first prohibition period T1 according to the prohibition time control means 27 elapses at the time c shown in FIG. 8, the shift-down demand signal generating means 26 starts the comparison between the vehicle speed signal generated by the speed sensor 2 and the speed signal stored in the memory means 8, generates the shift-down demand signal and supplies the signal to the transmission controller 25 in order to demand the shift-down of the transmission of the vehicle if the difference between the vehicle speed signal of the speed sensor 2 and the speed signal of the memory means 8 exceeds a predetermined value.

When the resume command signal is generated by switching on the resume-acceleration switch 4 at the time g shown in FIG. 9 and switching off the switch 4 at the time h shown in FIG. 9 while the cruising control is cancelled, the second prohibition period T2 is set by the prohibition time control means 27, therefore the shift-down demand signal is never supplied to the transmission controller 25 from the shift-down demand signal generating means 26 for a time as long as the second prohibition period T2.

When the resume-acceleration switch 4 is switched off at he time h after the time g shown in FIG. 9, the controller 7 reads out the speed signal stored in the memory means 8 before cancelling the cruising control, compares the speed signal read out from the memory means 8 with the vehicle speed signal generated from the speed sensor 2, and executes the calculation according to the obtained difference between the speed signals and the acceleration obtained from the change rate of the vehicle speed signal by using a predetermined computing equation. The negative value is obtained as the calculation result in this case, and the speed increase means 10 works for a time corresponding to the calculation result, whereby the actuator driving signal consisting of the vent valve closing signal, the safety valve closing signal and the vacuum valve opening signal is supplied to the actuator 6 in order to accelerate the vehicle.

When the second prohibition period T2 according to the prohibition time control means 27 elapses at the time i shown in FIG. 9, the shift-dow demand signal generating means 26 starts the comparison between the vehicle speed signal generated by the speed sensor 2 and the speed signal stored in the memory means 8, generates the shift-down demand signal and supplies the signal to the transmission controller 25 in order to demand the shift-down of the transmission of the vehicle if the difference between the vehicle speed signal of the speed sensor 2 and the speed signal of the memory means 8 exceeds the predetermined value.

Figure 11:
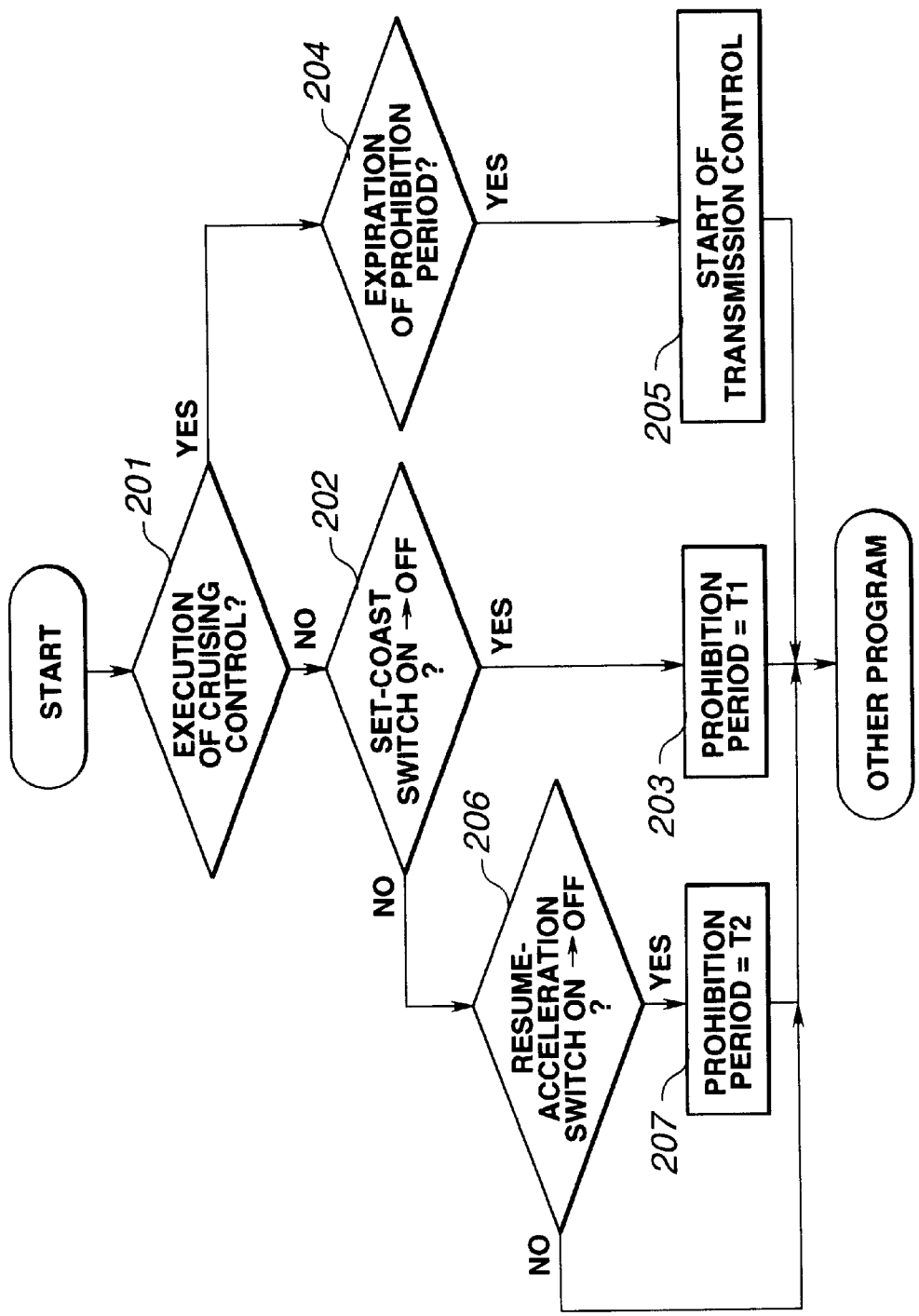
FIG. 11 is a flow chart illustrating the control shown in FIGS. 8 to 10.

The aforementioned control shown in FIGS. 8 to 10 is carried out according to a flow chart shown in FIG. 11.

When the off-operation of the set-coast switch 3 is done at the time b shown in FIG. 8 after the main switch 15 is switched on and the set-coast switch 3 is switched on at the time a shown in FIG. 8 while the vehicle is running at a speed desired by the driver in the state of cancelling the cruising control, control proceeds to step 202 after decision at step 201 that the cruising control is not executed (NO), and decision is done as to whether the set-coast switch 3 is switched off or not after the on-operation at the step 202. Control proceeds to step 203 after the decision to be "YES" at the step 202, the first prohibition period T1 is set by the prohibition time control means 27 at the step 203 and, then control returns to the step 201 after executing the other control.

The cruise command signal is generated in response to the off-operation of the set-coast switch 3 at the time b shown in FIG. 8 after the on-operation of the switch 3 at the time a shown in FIG. 8, whereby the second switching transistor TR2 in the controller 7 is turned on, and the vehicle speed signal generated from the speed sensor 2 at the time of switching off the set-coast switch 3 is stored in the memory means 8. Further, the controller 7 actuates the speed increase means 10 by the output of the set initialize signal corresponding to the vehicle speed at the time of generation of the cruise command signal, and drives actuator 6 so as to coincide with the throttle valve by the actuator driving signal consisting of the vent valve closing signal, the safety valve closing signal and the vacuum valve opening signal.

After the output of the set initialize signal, the predetermined calculation is performed by the calculation means 9 on basis of the difference between the speed signal stored in the memory means 8 and the vehicle speed signal generated from the speed sensor 2, and the acceleration obtained from the change rate of the vehicle speed signal within the defined period of time. When the calculation result has negative value, the accelerative actuator driving signal composed of the vent valve closing signal, the safety valve closing signal and the vacuum valve opening signal is output from the speed increase means 10 to drive the actuator 6 in the acceleration direction of the vehicle, and if the calculation result has positive value, the actuator 6 is driven in the deceleration direction of the vehicle according to the decelerative actuator driving signal composed of the vent valve opening signal, the safety valve closing signal and the vacuum valve closing signal and output from the speed decrease means 11. Consequently, the cruising control is executed so as to conform the actual vehicle speed with the stored target cruising speed.

When the cruising control starts at the time b shown in FIG. 8, control proceeds to step 204 from the step 201 and decision is done as to whether the first prohibition period T1 elapses or not at the step 204. In a case where the first prohibition period T1 does not elapse at the step 204, control returns to the step 201, namely the routine of the steps 201 and 204 is repeated until the first prohibition period T1 expires.

The first prohibition period T1 expires at the time c shown in FIG. 8, control proceeds to step 205 after the decision to be "YES" at the step 204, and the comparison of the difference between the vehicle speed signal of the speed sensor 2 and the speed signal of the memory means 8 is started by the shift-down demand signal generating means 26 at the step 205. Accordingly, if the difference between the vehicle speed signal generated from the speed sensor 2 and the speed signal stored in the memory means 8 as the target cruising speed exceeds the predetermined value, the shift-down demand signal is generated from the shift-down demand signal genereateing means 26 and supplied to the transmission controller 25 in order to demand the shift-down of the automatic transmission of the vehicle.

On the other side, when the resume command signal is generated by switching off the resume-acceleration switch 4 at the time h shown in FIG. 9 after switching on the switch 4 at the time g shown in FIG. 9 in the state of cancelling the cruising control, control proceeds to step 206 after the decision at the step 201 (N) and step 202 (NO), and decision is done as to whether the resume-acceleration switch 4 is switched off or not after the on-operation at the step 206. Control proceeds to step 207 after the decision to be "YES" at the step 206, the second prohibition period T2 is set by the prohibition time control means 27 at the step 207 and control returns to the step 201.

The resume command signal is generated in response to the off-operation of the resume-acceleration switch 4 at the time h shown in FIG. 9 after the on-operation of the switch 4 at the time g shown in FIG. 9, the speed signal stored in the memory means 8 before cancelling the cruising control is read out, the speed signal read out from the memory means is compared with the vehicle speed signal generated from the speed sensor 2, and the calculation using the predetermined computing equation is executed according to the obtained difference between the speed signals and the acceleration obtained from the change rate of the vehicle speed signal in the predefined period of time. The obtained result of the calculation has negative value in this case, therefore the speed increase means 10 works for a time corresponding to the calculation result and the accelerative actuator driving signal composed of the vent valve closing signal, the safety valve closing signal and the vacuum valve opening signal is supplied to the actuator 6.

When the cruising control (resume control) starts at the time h shown in FIG. 9, control proceeds to the step 204 from the step 201 (YES) and the decision is done as to whether the second prohibition period T2 elapses or not at the step 204. In a case where the second prohibition period T2 does not elapse at the step 204, the routine of the step 201 and 204 is repeated until the second prohibition period T2 expires. When the second prohibition period T2 expires at the time i shown in FIG. 9, control proceeds to the step 205 from the step 204 (YES) and the comparison of the difference between the vehicle speed signal of the speed sensor 2 and the speed signal of the memory means 8 is started by the shift-down demand signal generating means 26 at the step 205. Therefore, if the difference between the vehicle speed signal generated from the speed sensor 2 and the speed signal stored in the memory means 8 exceeds the predetermined value, the shift-down demand signal is generated from the shift-down demand signal generating means 26 and supplied to the transmission controller 25 in order to demand the shift-down of the automatic transmission of the vehicle.

In the cruising control apparatus 1 in this embodiment of the invention, as described above, the prohibition time control means 27 prohibits the generation of the shift-down demand signal from the shift-down demand signal generating means 26 for a time as long as the first prohibition period T1 which is longer than the second prohibition period T2 and does not supply the shift-down demand signal to the transmission controller 25 for the first prohibition period T1 when the cruise command signal is generated according to the operation of the set-coast switch 3 while the cruising control is not executed. Additionally, the prohibition time control means 27 prohibits the generation of the shift-down demand signal form the shift-down demand signal generating means 26 for a time as long as the second prohibition period T2 which is shorter than the first prohibition period T1 and does not supply the shift-down demand signal to the transmission controller 25 for the second prohibition period T2 when the resume command signal is generated according to the operation of the resume-acceleration switch 4 while the cruising control is not executed.

Namely, the control is performed by changing the amount of prohibition period between the cases of the operation of the set-coast switch 3 and the operation of the resume-acceleration switch 4. Therefore, it is possible to obtain the comfortable driving feeling without feeling a sense of incompativity.

[Embodiment 3]

An explanation will be given about a cruising control apparatus according to the third embodiment of this invention with reference to FIG. 12 to FIG. 14 in addition to FIGS. 8 and 9 used in the explanation of the second embodiment of this invention.

The cruising control apparatus 1 according to this embodiment has the same structure as that of the cruising control apparatus according to the second embodiment excepting the control by the prohibition time control means 27.

Namely, the prohibition time control means 27 in the cruising control apparatus 1 according to this embodiment has four functions.

The first function of the prohibition time control means 27 is to prohibit the generation of the shift-down demand signal for a time as long as the first prohibition period T1 similarly to the case of the second embodiment in the case of generation of the cruise command signal in response to the set operation of the set-coast switch 3 as shown in FIG. 8.

The second function of the prohibition time control means 27 in the third embodiment is also to prohibit the generation of the shift-down demand signal for a time as long as the predetermined period T2 similarly to the case of the second embodiment in the case of generation of the resume command signal according to resume operation of the resume-acceleration switch 4 as shown in FIG. 9. Also in this embodiment, the numerical value of 5 sec is selected as the first prohibition period T1, and the numerical value of 0.6 sec which is shorter than first prohibition period T1 is selected as the second prohibition period T2 for the reason similar to the case of the second embodiment.

Figure 12:
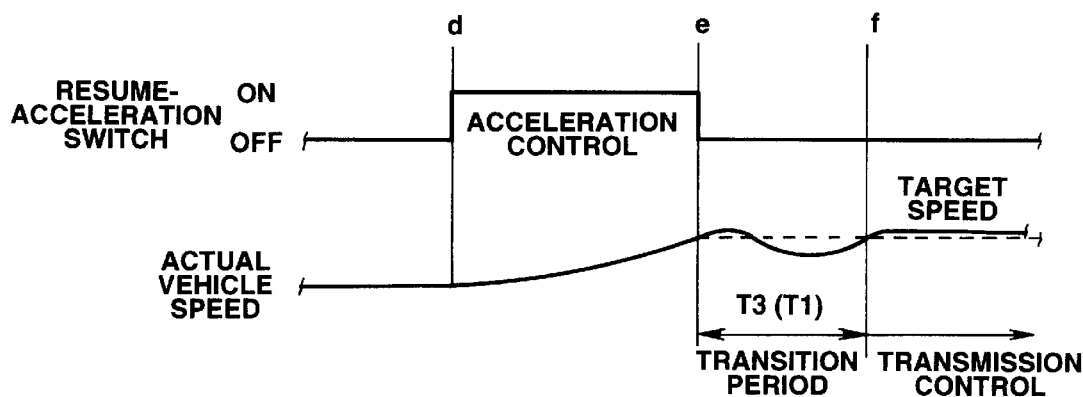
FIGS. 12 and 13 are time charts illustrating the control by the prohibition time control means in the third embodiment of the cruising control apparatus according to this invention.

The third function of the prohibition time control means 27 is to prohibit the generation of the shift-down demand signal from the shift-down demand signal generating means 26 for a time as long as a predetermined third prohibition period T3 since the end of operation of the resume-acceleration switch 4 (from time e to time f shown in FIG. 12) in a case where the acceleration command signal is generated according to the acceleration operation, that is the off-operation of the resume-acceleration switch 4 at the time e after the on-operation at time d shown in FIG. 12 in the state where the cruising control is carried out in response to the cruise command signal generated from the set-coast switch 3.

Figure 13:
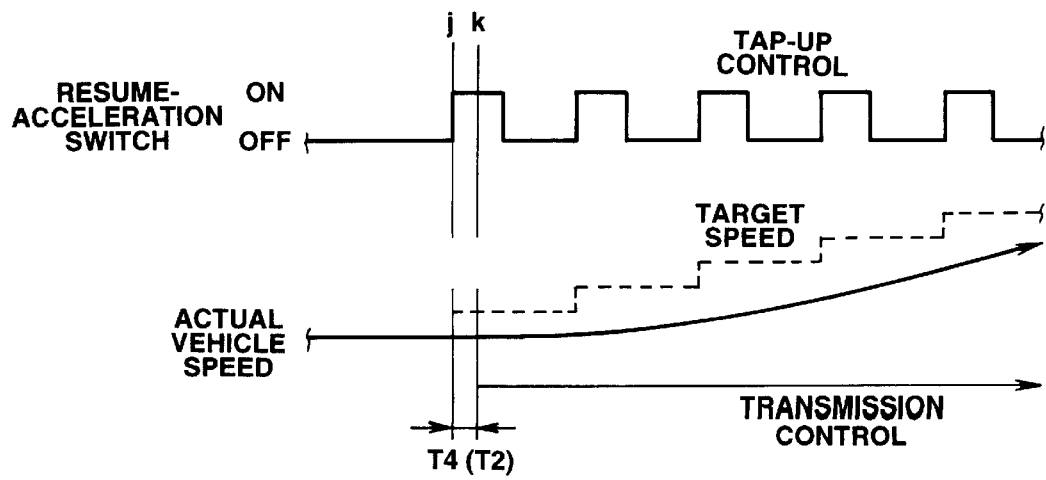

The fourth function of the prohibition time control means 27 in this embodiment is to prohibit the generation of the shift-down demand signal from the shift-down demand signal generating means 26 for a time as long as a predetermined fourth period T4 (from time j to time k shown in FIG. 13) in a case where the tap-up command signal is generated according to the tap-up operation, that is the off-operation of the resume acceleration switch 4 immediately after the on-operation at the time j shown in FIG. 13 in order to renew the target cruising speed by adding the predetermined speed to the actual vehicle speed or the target speed stored in the memory means 8 in the state where the cruising control is carried out in response to the cruise command signal generated from the set-coast switch 3.

In the third embodiment of this invention, the numerical value of 5 sec, that is the same as the first prohibition period T1, is selected as the third prohibition period T3, and the numerical value of 0.6 sec, that is the same as the second prohibition period T2 and smaller than the third prohibition period T3, is selected as the fourth prohibition period T4. Namely, when the acceleration command signal is generated from the resume-acceleration switch 4, the actuator 6 becomes into a transient state according to the actuator driving signal in order to conform the actual vehicle speed with the renewed target cruising speed, so that it is necessary to sufficiently delay the generation of the shift-down demand signal form the shift-down demand signal generating means 26 in accordance with duration time of the actuator driving signal by setting the third prohibition period T3 longer than the fourth prohibition period T4. Contrary to above, the actuator 6 is controlled in a short interval in response to the tap-up command signal generated from the resume-acceleration switch 4, therefore it is necessary to generated the shift-down demand signal in relatively earlier stage by setting the fourth prohibition period T4 shorter than the third prohibition period T3 in order to cope with the control in the short interval against the actuator 6.

In the controller 7 of the cruising control apparatus 1 in this embodiment, the first prohibition period T1 is set by the prohibition time control means 27 according to the cruise command signal generated by the set operation of the set-coast switch 3 as shown in FIG. 8, therefore the shift-down demand signal is not supplied to the transmission controller 25 from the shift-down demand signal generating means 26 for a time as long as the first prohibition period T1 similarly to the case of the second embodiment of this invention.

When the set-coast switch 3 is switched off at the time b shown in FIG. 8, the cruise command signal is generated, whereby the vehicle speed signal generated from the speed sensor 2 at the time of the generation of the cruise command signal is stored in the memory means 8 as the target cruising speed, the set initialize signal is output and the actuator driving signal is supplied to the actuator 6.

The controller 7 compares the vehicle speed signal generated from the speed sensor 2 and the speed signal stored in the memory means 8 and performs the cruising control so as to conform the actual vehicle speed signal with the speed signal stored in the memory means 8 as the target cruising speed similarly to the case of the cruising control apparatus according to the aforementioned embodiment.

When the first prohibition period T1 according to the prohibition time control apparatus 27 expires at the time c shown in FIG. 8, the shift-down demand signal generating means 26 starts the comparison between the vehicle speed signal generated from the speed sensor 2 and the speed signal stored in the memory means 8, generates the shift-down demand signal and supplies the signal to the transmission controller 25 in order to demand the shift-down of the transmission of the vehicle if the difference between the aforementioned speed signals exceeds the predetermined value.

When the resume command signal is generated according to the resume operation of the resume-acceleration switch 4 as shown in FIG. 9, the second prohibition period T2 is set by the prohibition time control means 27, therefore the shift-down demand signal is not supplied to the transmission controller 25 from the shift-down demand signal generating means 26 for a time as long as the second prohibition period T2 similarly to the case of the second embodiment of this invention.

The controller 7 reads out the speed signal stored in the memory means 8 before cancelling the cruising control in response to the resume command signal according to the resume operation shown in FIG. 9, and compares the speed signal read out from the memory means 8 with the vehicle speed signal generated from the speed sensor 2, and executes the calculation by using the predetermined computing equation from the difference between the speed signals and the acceleration obtained from the change rate of the vehicle speed signal from the speed sensor 2. The negative value is obtained as the calculation results in this case, whereby the speed increase means 10 works for a time corresponding to the calculation result and the actuator driving signal is supplied to the actuator 6 in order to accelerate the vehicle.

When the second prohibition period T2 according to the prohibition time control means 27 expires at the time i shown in FIG. 9, the shift-down demand signal generating means 26 starts the comparison between the vehicle speed signal generated by the speed sensor 2 and the speed signal stored in the memory means 8, and generates the shift-down demand signal and supplies the signal to the transmission controller 25 in order to demand the shift-down of the transmission if the difference between the vehicle speed signal of the speed sensor 2 and the speed signal of the memory means 8 exceeds the predetermined value.

When the acceleration command signal is generated by switching on the resume-acceleration switch 4 at time d shown in FIG. 12 and switching off the switch 4 at the time e after the time d shown in FIG. 12 in the case where the cruising control is carried out in response to the cruise command signal generated from the set-coast switch 3, the third prohibition period T3 (T1) is set by the prohibition time control means 27, therefore the shift-down demand signal is never supplied to the transmission controller 25 from the shift-down demand signal generating means 26 for a time as long as the third prohibition period T3.

The shift-down demand signal generating means 26 starts the comparison between the vehicle speed signal generated by the speed sensor 2 and the speed signal stored in the memory means 8 when the third prohibition period T3 (T1) according to the prohibition time control means 27 expires at the time f shown in FIG. 12, the shift-down demand signal generating means 26 generates the shift-down demand signal and supplies the signal to the transmission controller 25 in order to demand the shift-down of the transmission if the difference between the vehicle speed signal of the speed sensor 2 and the speed signal stored in the memory means 8 exceeds the predetermined value.

When the resume-acceleration switch 4 is switched on at the time j shown in FIG. 13 while the cruising control is carried out according to the generation of the cruise command signal from the set-coast switch 3, the fourth prohibition period T4 (T2) is set by the prohibition time control means 27, so that the shift-down demand signal is never supplied to the transmission controller 25 from the shift-down demand signal generating means 26 for a time as long as the fourth prohibition period T4.

The shift-down demand signal generating means 26 starts the comparison between the vehicle speed signal generated by the speed sensor 2 and the speed signal stored in the memory means 8 when the fourth prohibition period T4 (T2) according to the prohibition time control means 27 expires at the time k shown in FIG. 13, the shift-down demand signal generation means 26 generates the shift-down demand signal and supplies the signal to the transmission controller 25 in order to demand the shift-down of the transmission if the difference between the vehicle speed signal of the speed sensor 2 and the speed signal stored in the memory means 8 exceeds the predetermined value.

The aforementioned control shown in FIG. 8, FIG. 9, FIG. 12 and FIG. 13 is carried out according to a flow chart shown in FIG. 14.

When the off-operation of the set-coast switch 3 is done at the time b shown in FIG. 8 after the main switch 15 is switched on and the set-coast switch 3 is switched on at the time a shown in FIG. 8 while the vehicle is running at a speed desired by the driver in the state of cancelling the cruising control, control proceeds to step 252 after decision at step 251 that the cruising control is not executed (NO), and decision is done at step 252 as to whether the set-coast switch 4 is switched of or not after the on-operation. Control proceeds to step 253 after the decision to be "YES" at the step 252, the first prohibition period T1 is set by the prohibition time control means 27 at the step 253 and control returns to the step 251 after the other control, whereby the shift-down demand signal is never supplied to the transmission controller 25 from the shift-down demand signal generating means 26 during the first prohibition period T1.

The cruise command signal is generated according to the off-operation of the set-coast switch 3 at the time b shown in FIG. 8 after the on-operation at the time a shown in FIG. 8, whereby the second switching transistor TR2 in the controller 7 is turned on, and the vehicle speed signal generated at the time of switching off the set-coast switch 3 is stored in the memory means 8. The controller 7 actuates the speed increase means 10 by the output initialize signal obtained corresponding to the vehicle speed at the time of switching off the set-coast switch 3, and drives actuator 6 so as to coincide with the throttle valve by the actuator driving signal composed of the vent valve closing signal, the safety valve closing signal and the vacuum valve opening signal.

After the output of the set initialize signal, the predetermined calculation is carried out by the calculation means 9 according to the difference between the speed signal stored in the memory means 8 and the vehicle speed signal generated from the speed sensor 2, and the acceleration obtained from the change rate of the vehicle speed signal within the predefined period of time. When the calculation result has negative value, the accelerative actuator driving signal composed of the vent valve closing signal, the safety valve closing signal and the vacuum valve opening signal is output from the speed increase means 10 to drive the actuator in the acceleration direction, and if the calculation result has positive value, the actuator 6 is driven in the deceleration direction of the vehicle according to the decelerative actuator driving signal composed of the vent valve opening signal, the safety valve closing signal and the vacuum valve closing signal and output from the speed decrease means 11. In such a manner, the cruising control is executed so as to conform the actual vehicle speed with the target cruising speed stored in the memory means 8.

When the cruising control starts at the time b shown in FIG. 8, control proceeds to step 256 after decision that the cruising control is being executed (YES) at the step 251, that the resume-acceleration switch 4 is not switched on (NO) at step 254, and that the resume-acceleration switch 4 is not switched off after the on-operation (NO) at step 255, and decision is done as to whether the first prohibition period T1 elapses or not at the step 256. The first prohibition period T1 does not yet elapse in an early stage of the control, so that control returns to the step 251 from the step 256 and the routine of the steps 251, 254, 255 and 256 is repeated until the first prohibition period T1 expires.

When the first prohibition period T1 elapses at the time c shown in FIG. 8, control proceeds to step 257 after decision at the step 256 (YES) and the comparison of the difference between the vehicle speed signal of the speed sensor 2 and the speed signal of the memory means 8 is started by the shift-down demand signal generating means 26 at the step 257. Accordingly, if the difference between the vehicle speed signal generated from the speed sensor 2 and the speed signal stored in the memory means 8 exceeds the predetermined value, the shift-down demand signal is generated from the shift-down demand signal generating means 26 and supplied to the transmission controller 25 in order to demand the shift-down of the transmission of the vehicle.

Furthermore, when the resume command signal is generated by switching off the resume-acceleration switch 4 at the time h shown in FIG. 9 after the on-operation at the time g shown in FIG. 9 in the state of cancelling the cruising control, control proceeds to the step 258 after the decision at the step 251 (NO) and the step 252 (NO) and decision is done at the step 258 as to whether the resume-acceleration switch 4 is switched off or not after the on-operation. The decision is done at the step 258 that the resume-acceleration switch 4 is switched off after the on-operation (YES), control proceed to step 259 and the second prohibition period T2 is set by the prohibition time control means 27 at the step 259, and then control returns to the step 251.

The resume command signal is generated according to the off-operation of the resume-acceleration switch 4 at the time h shown in FIG. 9 after the on-operation at the time g shown in FIG. 9, the speed signal stored in the memory means 8 before cancelling the cruising control is read out, the speed signal read out form the memory means 8 is compared with the vehicle speed signal generated from the speed sensor 2, and the calculation using the predetermined computing equation is executed according to the obtained difference between the speed signal and the acceleration obtained from the change rate of the vehicle speed signal. The obtained result of the calculation has negative value in this case, accordingly the speed increase means 10 works for a time corresponding to the calculation result and the accelerative actuator driving signal composed of the vent valve closing signal, the safety valve closing signal and the vacuum valve opening signal is supplied to the actuator 6.

When the accelerative cruising control (resume control) starts at the time h shown in FIG. 9, control proceeds to the step 256 after the decision at the step 251 (YES), the step 254 (NO) and the step 255 (NO), and decision is done as to whether the second prohibition period T2 elapses or not at the step 256. In a case where the second prohibition period T2 does not elapse, control returns to the step 251 from the step 256 and the routine of the steps 251, 254, 255 and 256 is repeated until the second prohibition period T2 expires. When the second prohibition period T2 expires at the time i shown in FIG. 9, control proceeds to the step 257 from the step 256 (YES) and the comparison of the difference between the vehicle speed signal of the speed sensor 2 and the speed signal of the memory means 8 is started by the shift-down demand signal generating means 26 at the step 257. Accordingly, if the difference between the vehicle speed signal generated from the speed sensor 2 and the speed signal stored in the memory means 8 exceeds the predetermined value, the shift-down demand signal is generated form the shift-down demand signal generating means 26 and supplied to the transmission controller 25 in order to demand the shift-down of the automatic transmission of the vehicle.

Further, when the acceleration command signal is generated by switching on the resume-acceleration switch 4 at the time d shown in FIG. 12 and switching off the switch 4 at the time e shown in FIG. 12 while the cruising control is carried out, control proceeds to the step 255 from the step 251 (YES) and the step 254 (NO), and the decision as to whether the resume-acceleration switch 4 is switched off or not after the on-operation at the step 255. Control proceeds to the step 253 after the decision that the resume-acceleration switch 4 is switched off after the on-operation (YES) at the step 255, and the third prohibition period T3 (T1) is set by the prohibition time control means 27 at the step 253, therefore the shift-down demand signal is never supplied to the transmission controller 25 by the shift-down demand signal generating means 26 during the third prohibition period T3.

Control returns to the step 251 from the step 253, and the routine of the steps 251, 254, 255 and 256 is repeated until the third prohibition period T3 (T1) elapses.

When the third prohibition period T3 elapses at the time f shown in FIG. 12, control proceeds to the step 257 after decision at the step 256 (YES) and the comparison of the difference between the vehicle speed signal of the speed sensor 2 and the speed signal of the memory means 8 is started by the shift-down demand signal generating means 26 at the step 257. If the difference between the vehicle speed signal generated from the speed sensor 2 and the speed signal stored in the memory means 8 exceeds the predetermined value, the shift-down demand signal is generated from the shift-down demand signal generating means 26 and supplied to the transmission controller 25 in order to demand the shift-down of the transmission of the vehicle.

Furthermore, when the resume-acceleration switch 4 is switched on at the time j shown in FIG. 13 while the cruising control is carried out, control proceeds to the step 259 from the step 251 (YES) and the step 254 (YES), the fourth prohibition period T4 (T2) is set by the prohibition time control means 27 at the step 259 and the control returns to the step 251.

The fourth prohibition period T4 expires at the time k shown in FIG. 13, so that control proceeds to the step 257 after the decision at the step 256 (YES) and the comparison of the difference between the vehicle speed signal of the speed sensor 2 and the speed signal of the memory means 8 is started by the shift-down demand signal generating means 26 at the step 257. Accordingly, the shift-down demand signal is generated from the shift-down demand signal generating means 26 and supplied to the transmission controller 25 if the difference between the speed signals exceeds the predetermined value.

As mentioned above, in the cruising control apparatus 1 in this embodiment, the prohibition time control means 27 prohibits the generation of the shift-down demand signal for a time as long as the first prohibition period T1 which is longer than the second prohibition period T2 so as not to supply the signal to the transmission controller 25 during the first prohibition period T1 when the cruise command signal is generated according to the operation of the set-coast switch 3 while the cruising control is not executed, and prohibits the generation of the shift-down demand signal for a time as long as the second prohibition period T2 which is shorter than the first prohibition period T1 so as not to supply the signal to the transmission controller 25 during the second prohibition period T2 when the resume command signal is generated according to the operation of the resume-acceleration switch 4 while the cruising control is not executed. Additionally, when the acceleration command signal is generated according to the operation of the resume-acceleration switch 4 under the cruising control, the prohibition time control means 27 prohibits the generation of the shift-down demand signal for a time as long as the third prohibition period T3 after the end of the switching operation so as not to supply the signal to the transmission controller 25 during the third prohibition period T3, and the prohibition time control means 27 further prohibits the generation of the shift-down demand signal for a time as long as the fourth prohibition period T4 so as not to supply the signal to the transmission controller during the fourth prohibition period T4 when the tap-up command signal is generated according to the on-operation of the resume-acceleration switch 4 under the cruising control.

Namely, the control is performed by changing the amount of prohibition period suitably corresponding to the command signals generated from the respective switches. Therefore, it is possible to perform the shift-down of the transmission without missing the chance and possible to obtain the pleasant driving feeling without feeling a sense of incompativity.

[Embodiment 4]

The fourth embodiment of the cruising control apparatus according to this invention will be explained below with reference to FIG. 15 to FIG. 17.

The cruising control apparatus 1 according to the fourth embodiment is provided with the same structure as that of the cruising control apparatus according to the aforementioned second or third embodiment of this invention excepting the control by the prohibition time control means.

The cruising control apparatus 1 is also composed mainly of the speed sensor 2, the set-coast switch 3, the resume-acceleration switch 4, the cancel switch 5, the actuator 6 and the controller 7 as shown FIG. 1, and the controller 7 is provided with the memory means 8, the calculation means 9, the speed increase means 10, the speed decrease means 11, the shift-down demand signal generating means 26 and the prohibition time control means 27 in the microcomputer MCU similarly to the apparatus according to the second or third embodiment of this invention.

The first function of the prohibition time control means 27 in this embodiment is to maintain the shift-down demand signal generated by the shift-down demand signal generating means 26 by setting a prohibition period T0 (zero) shown in FIG. 16 in a case where the acceleration command signal according to the on-operation of the resume-acceleration switch 4 when the difference between the vehicle speed signal generated from the speed sensor 2 and the speed signal stored in the memory means 8 as the target cruising speed exceeds the predetermined value and the shift-down demand signal is generated during the cruising control.

The second function of the prohibition time control means 27 is to prohibit the comparison of the difference between the vehicle speed signal generated from the speed sensor 2 and the speed signal stored in the memory means 8 by the shift-down demand signal generating means 26 for a time as long as a fifth prohibition period T5 shown in FIG. 15 at the time when the acceleration command signal is not generated form the resume-acceleration switch 4 at the beginning of the cruising control. In this embodiment, numerical value of 5 sec is selected as the fifth prohibition period T5.

The third function of the prohibition time control means 27 in this embodiment is to prohibit the comparison of the difference between the vehicle speed signal from the speed sensor 2 and the speed signal stored in the memory means 8 by the shift-down demand signal generating means 26 for a time as long as a sixth prohibition period T6 shown in FIG. 15 by setting the sixth prohibition period T6 at the time when the acceleration command signal is generated by switching on the resume-acceleration switch 4 during the cruising control. In this embodiment, numerical value of 0.6 sec, which is shorter than the fifth prohibition period T5, is selected as the sixth prohibition period T6.

The controller 7 prohibits the comparison of the difference between the vehicle speed signal from the speed sensor 2 and the speed signal stored in the memory means 8 by the shift-down demand signal generating means 26 during the fifth prohibition period T5 through the prohibition time control means 27 when the acceleration command signal is not generated from the resume-acceleration switch 4 at the beginning of the cruising control as shown in FIG. 15. Namely, the actuator 6 is in the transient state while the actuator driving signal corresponding to the output of the set initialize signal is supplied to the actuator 6 in the beginning of the start of cruising control, therefore it is necessary to prohibit the generation of the shift-down demand signal from the shift-down demand signal generating means 26 during the transition period.

The controller 7 sets the sixth prohibition period T6 through the prohibition time control means 27 when the acceleration command signal is generated by operating the resume-acceleration switch 4 during the cruising control as shown in FIG. 15. Namely, the actuator 6 is in the transient state while the actuator driving signal according to the acceleration command is supplied to the actuator 6, so that it is necessary to make the shift-down demand signal generating means 26 so as not to generate the shift-down demand signal during the transition period.

The controller 7 further sets the prohibition period T0 (0 sec) and maintains the shift-down demand signal generated form the shift-down demand signal generating means 26 through the prohibition time control means 27 when the difference between the vehicle speed signal from the speed sensor 2 and the speed signal stored in the memory means 8 exceeds the predetermined value and the acceleration command signal is generated from the resume-acceleration switch 4 during the cruising control as shown in FIG. 16. Namely, it is necessary to execute the acceleration control of the vehicle in the state where the transmission is shifted down by maintaining the shift-down demand signal generated form the shift-down demand signal generation means 26 when the acceleration command signal is generated form the resume-acceleration switch 4 in a state where the transmission of the vehicle is shifted down in response to the shift-down demand signal generated from the shift-down demand signal generating means 26 (for example, in a case where the vehicle under the cruising control enters to the uphill road and the difference between the vehicle speed signal from the speed sensor 2 and the speed signal stored in the memory means 8 exceeds the predetermined value).

Figure 17:
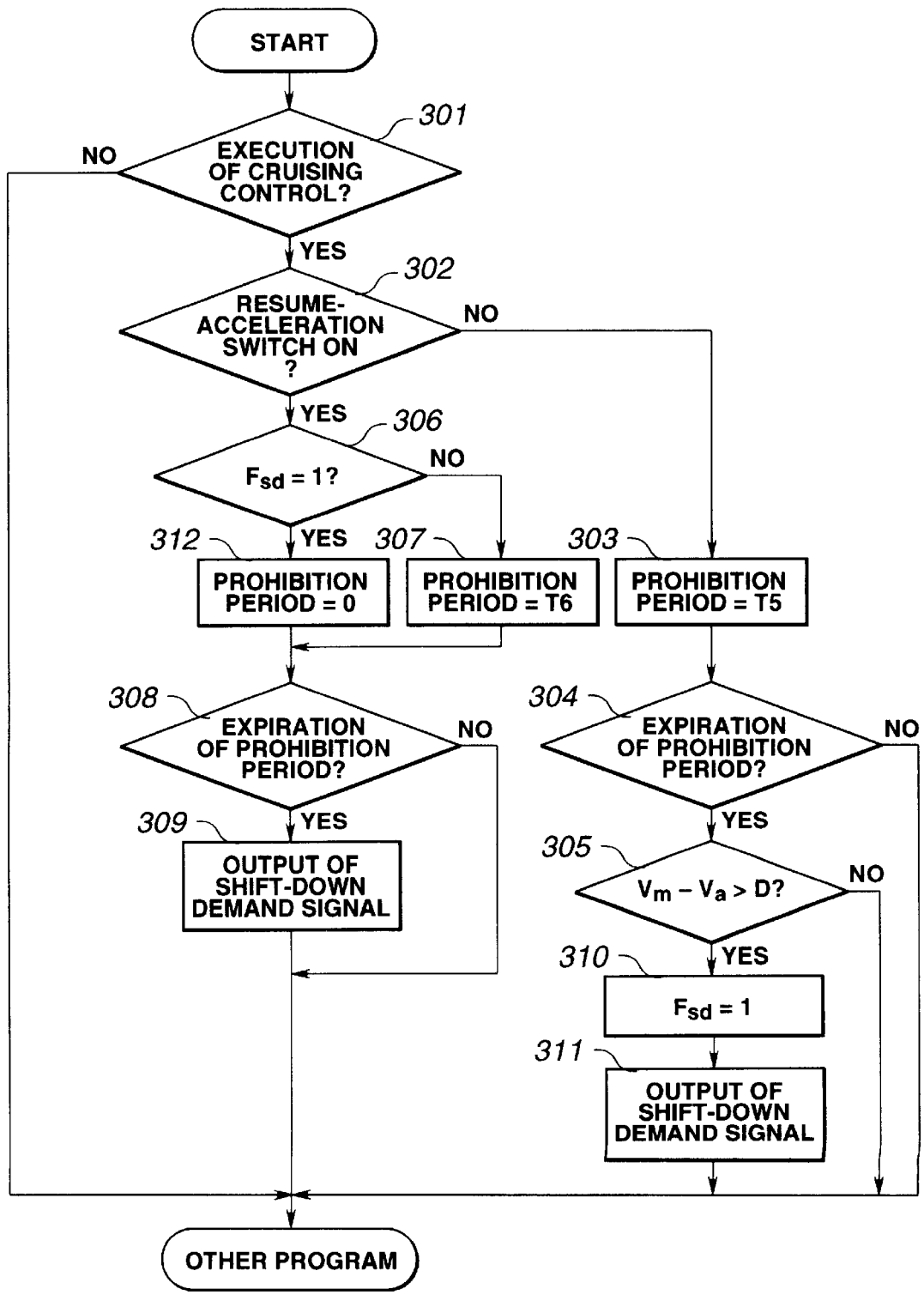
FIG. 17 is a flow chart illustrating the control shown in FIG. 15 and FIG. 16.

In the cruising control apparatus 1, the aforementioned control is carried out according to the flow chart shown in FIG. 17.

When the set-coast switch 3 is switched off after the main switch 15 of the apparatus 1 is switched on and the set-coast switch 3 is switched on while the vehicle is running at a speed desired by the driver in the state of cancelling the cruising control, the second switching transistor TR2 in the controller 7 is turned on, and the vehicle speed signal generated form the speed sensor 2 at the time of switching off the set-coast switch 3 is stored in the memory means 8 as the target cruising speed. Furthermore, the controller 7 actuates the speed increase means 10 by the out put of the set initialize signal corresponding to the vehicle speed signal generated at the time of switching off the set-coast switch 3, and drives actuator 6 so as to coincide with the throttle valve of the vehicle by the actuator driving signal composed of the vent valve closing signal, the safety valve closing signal and the vacuum valve opening signal.

After the output of the set initialize signal, the predetermined calculation is done by the calculation means 9 on basis of the difference between the speed signal stored in the memory means 8 and the vehicle speed signal generated from the speed sensor 2 and the acceleration obtained from the change rate of the vehicle speed signal. When the calculation result has negative value, the accelerative actuator driving signal composed of the vent valve closing signal, the safety valve closing signal and the vacuum valve opening signal is output from the speed increase means 10 to drive the actuator 6 in the acceleration direction of the vehicle, and if the calculation result has positive value, the decelerative actuator driving signal composed of the vent valve opening signal, the safety valve closing signal and the vacuum valve closing signal is output from the speed decrease means 11 to drive the actuator 6 in the deceleration direction of the vehicle. In such a manner, the cruising control is executed so as to conform the actual vehicle speed with the stored target cruising speed.

The control is executed according to the program shown in FIG. 17.

In a case where the resume-acceleration switch 4 is not switched on in the beginning of the cruising control started at time a shown in FIG. 15, decision is done at step 301 that the cruising control is executed (YES), control proceeds to step 302 and decision is done as to whether the resume-acceleration switch 4 is switched on or not at the step 302. The decision is done to be "NO" at the step 302, control proceed to step 304 after setting the fifth prohibition period T5 by the prohibition time control means 27 at step 303 and decision is done at the step 304 as to whether the fifth prohibition period T5 expires or not. In a case the fifth prohibition period T5 does not expire, control returns to the step 301 from the step 304 (NO), that is the routine to return to the step 301 from the step 304 is repeated until the fifth prohibition period T5 expires.

Even in a case where the actual vehicle speed is decreased by some reason and the difference between the actual vehicle speed $V_a$ detected by the speed sensor 2 and the target cruising speed $V_m$ in the memory means 8 becomes larger and exceeds the predetermined value D at time b before the expiration of the fifth prohibition period T5 as shown in FIG. 15, the routine from the step 304 to the step 301 is repeated without generating the shift-down demand signal since the fifth prohibition period T5 does not yet expire after the start of the cruising control.

Namely, the generation of the shift-down demand signal from the shift-down demand signal generating means 26 is forbidden by the prohibition time control means 27 until the fifth prohibition period T5 expires in the beginning of the cruising control even if the difference between the vehicle speed signal generated form the speed sensor 2 and the speed signal stored in the memory means 8 becomes larger.

When the fifth prohibition period T5 expires at time c after the time b shown in FIG. 15, control proceeds to step 305 after the decision (YES) at the step 304 and decision is done as to whether the difference between the actual vehicle speed $V_a$ detected by the speed sensor 2 and the stored target cruising speed $V_m$ in the memory means 8 exceeds the predetermined value D or not at the step 305.

In the case where the difference between the actual vehicle speed $V_a$ and the target cruising speed $V_m$ is not larger than D at the time c as shown in FIG. 15, control returns to the step 301 after the decision (NO) at the step 305 without generating the shift-down demand signal.

When the resume-acceleration switch 4 is switched on at time d shown in FIG. 15 after the cruising control goes on in the state where the difference between the actual vehicle speed $V_a$ and the stored target cruising speed $V_m$ is held in small value and the shift-down demand signal is not generated, the decision is done that the resume-acceleration switch 4 is switched on (YES) at the step 302 after the decision (YES) at the step 301, control proceeds step 306 and decision is done at the step 306 as to whether a shift-down flag Fsd is set or not. Control proceeds to step 307 from the step 306 because the shift-down flag Fsd is not set (NO).

The sixth prohibition period T6 is set by the prohibition time control means 27 at the step 307, then control proceeds to step 308 and decision is done as to whether the sixth prohibition period T6 expires or not at the step 308. Control is repeated between the step 301 and the step 308 without generating the shift-down demand signal until the sixth prohibition period T6 expires. When the sixth prohibition period T6 expires at time e shown in FIG. 15, control proceeds to step 309 and returns to the step 301 after generating the shift-down demand signal at the step 309.

In this manner, the generation of the shift-down demand signal from the shift-down demand signal generating means is forbidden by the prohibition time control means 27 until the sixth prohibition period T6, which is shorter than the fifth prohibition period T5, expires in the case where the resume-acceleration switch 4 is switched on while the cruising control is executed.

On the other side, in a case where the cruising control is started at time a shown in FIG. 16 and the resume-acceleration switch 4 remains in the off-state without being switched on, control proceeds to the step 303 after the decision at the step 301 (YES) and the step 302 (NO), the fifth prohibition period T5 is set by the prohibition time control means 27 at the step 303 and control proceeds to the step 304. The decision is done at the step 304 as to whether the fifth prohibition period T5 expires or not, so that control is repeated between the step 301 and the step 304 without generating the shift-down demand signal until the fifth prohibition period T5 expires as described above.

The actual vehicle speed is decreased after starting the cruising control and the difference between the actual vehicle speed $V_a$ detected by the speed sensor 2 and the stored target cruising speed $V_m$ in the memory means 8 becomes larger and exceeds the predetermined value D at time b as shown in FIG. 16. However, the routine from the step 304 to the step 301 is repeated and the shift-down demand signal is not generated because the fifth prohibition period T5 does not expire after the start of the cruising control.

When the fifth prohibition period T5 expires at time c after the time b shown in FIG. 16, control proceeds to the step 305 after the decision (YES) at the step 304 and the decision is done at the step 305 as to whether the difference between the actual vehicle speed $V_a$ detected by the speed sensor 2 and the stored target cruising speed $V_m$ in the memory means 8 exceeds the predetermined value D or not.

Control proceeds to step 310 as a result of the decision at the step 305 because the difference between the actual vehicle speed $V_a$ and the target cruising speed $V_m$ becomes larger than the predetermined value D at the time c as shown in FIG. 16, the shift-down flag Fsd is set at the step 310 and control returns to the step 301 after generating the shift-down demand signal at step 311.

The shift-down flag Fsd is set at the step 310 and the shift-down demand signal is generated from the shift-down demand signal generating means 26 and supplied to the transmission controller 25 at the step 311. Whereby processing of the sift-down demand signal and the other logic is done in the transmission controller 25 and the shift-down of the transmission is performed.

The vehicle of which transmission is shifted down continues to cruise under the cruising control after the time c as shown in FIG. 16. When the resume-acceleration switch 4 is switched on at time d shown in FIG. 16, the decision is done that the resume-acceleration switch 4 is switched on (YES) at the step 302 after the decision (YES) at the step 301, control proceeds to the step 306 and the decision is done as to whether the shift-down flag Fsd is set or not at the step 306. Control proceeds to step 312 from the step 306 and the prohibition period T0(zero) is set at the step 312 because the shift-down flag Fsd is set in this time (YES).

Although control proceeds to the step 308 from the step 312 and the decision is done as to whether the prohibition period T0 expires or not at the step 308, control proceeds to the step 309 directly because the prohibition period T0 is zero, and the shift-down demand signal is generated without prohibition at the step 309 since the difference between the actual vehicle speed $V_a$ and the stored target cruising speed $V_m$ is larger than the predetermined value D at the time d as shown in FIG. 16.

Namely, in the case where the vehicle is accelerated in the state the transmission of the vehicle is shifted down under the cruising control, the generation of the shift-down demand signal is maintained continuously by the prohibition time control means 27 even when the acceleration command signal is generated by operating the resume-acceleration switch 4, therefore the vehicle continues to acceleratively cruise without the shift-up of the transmission as it was before the on-operation of the resume-acceleration switch 4.

As mentioned above, in the cruising control apparatus 1 in this embodiment, the prohibition time control means 27 prohibits the comparison between the speed signals so as not to generate the shift-down demand signal for a time as long as the fifth prohibition period T5 corresponding to the transition period of the actuator 6 in the beginning of the cruising control, and prohibits the comparison between the speed signals so as not to generate the shift-down demand signal for a time as long as the sixth prohibition period T6, which is shorter than the fifth prohibition period T5 and corresponds to the transition period of the actuator 6 caused by the acceleration command signal. Furthermore, the prohibition time control means 27 maintains the generation of the shift-down demand signal so as not to shift up the transmission of the vehicle when the acceleration command signal generated in the case where the vehicle is accelerated by shifting down the transmission. Therefore, it is possible to timely perform the sift-down of the transmission without the delay and the excessive shift change and possible to obtain the comfortable driving feeling without feeling a sense of incompativity.

[Embodiment 5]

The fifth embodiment of the cruising control apparatus according to this invention will be explained below with reference to FIG. 18 to FIG. 21.

The cruising control apparatus 1 according to this embodiment has the structure basically similar to the cruising control apparatus shown in FIG. 1 as the first embodiment of this invention, and is composed mainly of the speed sensor 2, the set-coast switch 3, the resume-acceleration switch 4, the cancel switch 5, the actuator 6 and the controller 7.

The controller 7 is further provided with a tap-up control means 28 and a tap-down control means 29 in addition to the memory means 8, the calculation means 9, the speed increase means 10, the speed decrease means 11 and the counter 12 in the microcomputer MCU. The speed sensor 2, the switches 3 to 5, the actuator 6, the memory means 8, the calculation means 9, the apeed increase means 10 and the speed decrease means 11 have been described in the first embodiment of this invention, therefore the explanation concerning the formation and the function of these elements in omitted.

The counter 12 provided in the microcomputer MCU of the controller 7 counts the number of on-off operation of the set-coast switch 3 during the cruising control. An increment of the count number in the counter 12 is carried out for each off-operation of the set-coast switch 3 after the on-operation during the cruising control.

In a case where the tap-down command signal is generated in response to the on-operation of the set-coast switch 3, the target cruising speed is renewed by subtracting the predetermined tap-down speed (1.6 km/h) form the actual vehicle speed when the count number of the counter 12 is 0 (zero), and is renewed by subtracting the above-mentioned tap-down speed (1.6 km/h) form the stored target speed if the count number of the counter 12 is not 0 (zero) through the tap-down control means 29 as described later.

Furthermore, the counter 12 also counts the number of on-off operation of the resume-acceleration switch 4 during the cruising control. An increment of the count number of the counter 12 is carried out for each off-operation of the resume-acceleration switch 4 after the on-operation during the cruising control.

In a case where the tap-up command signal is generated in response to the on-operation of the resume-acceleration switch 4, the target cruising speed is renewed by adding the predetermined tap-up speed (1.6 km/h) to the actual vehicle speed when the count number in the counter 12 is 0 (zero), and the target cruising speed is renewed by adding the aforementioned tap-up speed to the presently stored target speed when the count number in the counter 12 is not 0 (zero) through the tap-up control means 28 as described later.

In response to the tap-up command signal, the tap-up control means 28 renews the target cruising speed by newly storing a speed signal obtained by adding a signal corresponding to the predetermined tap-up speed (1.6 km/h) to the vehicle speed signal generated form the speed sensor 2 at the time of switching on the resume-acceleration switch 4 into the memory means 8 in the case where the count number in the counter 12 is 0 (zero) and the resume-acceleration switch 4 is operated in the first time, on the other hand the tap-up control means 28 renews the target cruising speed by newly storing a speed signal obtained by adding the signal corresponding to the tap-up speed (1.6 km/h) to the speed signal presently stored in the memory means 8 at the time of switching on the resume-acceleration switch 4 into the memory means 8 in the case where the count number in the counter 12 is not 0 (zero) and the resume-acceleration switch 4 is operated in the second time or hereafter.

The tap-up control means 28 compares a speed obtained by adding predetermined first threshold value $V_{th1}$ to the target cruising speed renewed in response to the tap-up command signal generated by operating the resume-acceleration switch 4 with the present actual vehicle speed. In a case where the actual vehicle speed does not exceed the speed obtained by adding the first threshold value $V_{th1}$ to the renewed target cruising speed as the result of the comparison, the tap-up control means 28 generates the tap-up initialize signal to drive the actuator 6 in the acceleration direction of the vehicle through the speed increase means 10. Contrary, in a case where the actual vehicle speed exceeds the speed obtained by adding the first threshold value $V_{th1}$ to the renewed target cruising speed, the tap-up control means 28 prohibits the generation of the tap-up initialize signal so as not to further drive the actuator 6. In this embodiment, the numerical value of 5 km/h or 6 km/h is selected as the first threshold value $V_{th1}$.

Figure 18:
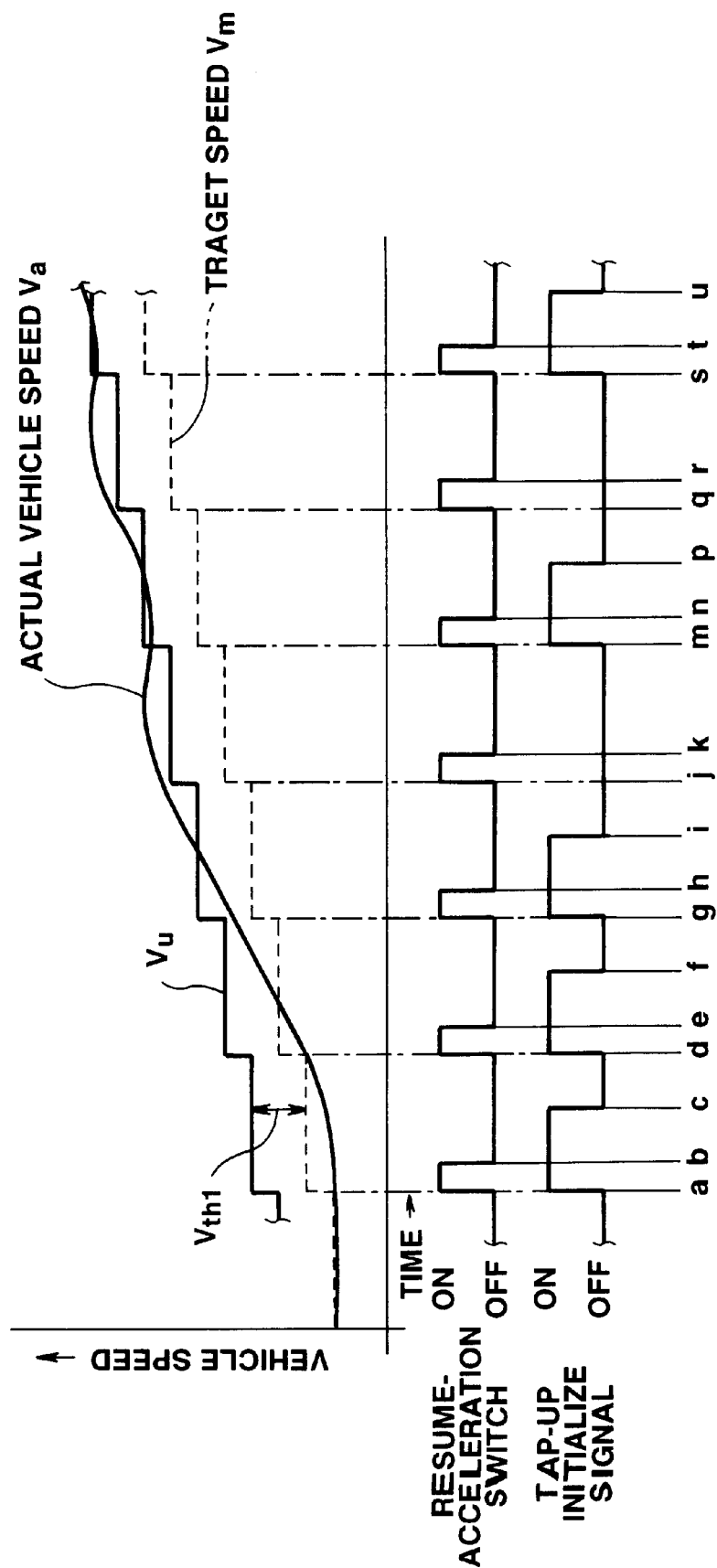
FIG. 18 is a time chart illustrating the tap-up control in the fifth embodiment of the cruising control apparatus according to this invention.

Namely, an upper reference speed $V_u$ higher than the renewed target cruising speed $V_m$ by the first threshold value $V_{th2}$ is set up as shown in FIG. 18, the tap-up control means 28 generates the tap-up initialize signal in response to the tap-up command signal so as to drive the actuator 6 in the acceleration direction when the actual vehicle speed does not exceed the upper reference speed $V_u$. However, when the actual vehicle speed exceeds the upper reference speed $V_u$, the tap-up control means 28 does not generates the tap-up initialize signal so as not to further drive the actuator 6 even if the tap-up command signal generated form the resume-acceleration switch 4.

The tap-down control means 29 renews the target cruising speed in response to the tap-down command signal by newly storing a speed signal obtained by subtracting a signal corresponding to the predetermined tap-down speed (1.6 km/h) from the vehicle speed signal generated form the speed sensor 2 at the time of switching on the set-coast switch 3 into the memory means 8 in the case where the count number in the counter 12 is 0 (zero) and the set-coast switch 3 is operated in the first time, on the other side the tap-don control means 28 renews the target cruising speed by newly storing a speed signal obtained by subtracting the signal corresponding to the tap-down speed (1.6 km/h) form the speed signal presently stored in the memory means 8 at the time switching on the set-coast switch 3 into the memory means 8 in the case where the count number in the counter 12 is not 0 (zero) and the set-coast switch 3 is operated in the second time or hereafter.

The tap-down control means 29 further compares a speed obtained by subtracting predetermined second threshold value $V_{th2}$ from the target cruising speed renewed in response to the tap-down command signal generated by operating the set-coast switch 3 with the present actual vehicle speed. As the result of this comparison, in a case where the actual vehicle speed does not fall below the speed obtained by subtracting the second threshold value $V_{th2}$ from the renewed target cruising speed, the tap-down control means 29 generates the tap-down initialize signal to drive the actuator 6 in the deceleration direction of the vehicle through the speed decrease means 11. Contrary, in a case where the actual vehicle speed falls below the speed obtained by subtracting the second threshold value $V_{th2}$ from the renewed target cruising speed, the tap-down control means 28 prohibits the generation of the tap-down initialize so as not to further drive the actuator 6. In this embodiment, the numerical value of 5 km/h or 6 km/h, which is equivalent to the first threshold value $V_{th1}$, is selected as the second threshold value $V_{th2}$, therefore the first and second threshold values $V_{th1}$ and $V_{th2}$ can be used in common in the control program as described later.

Figure 20:
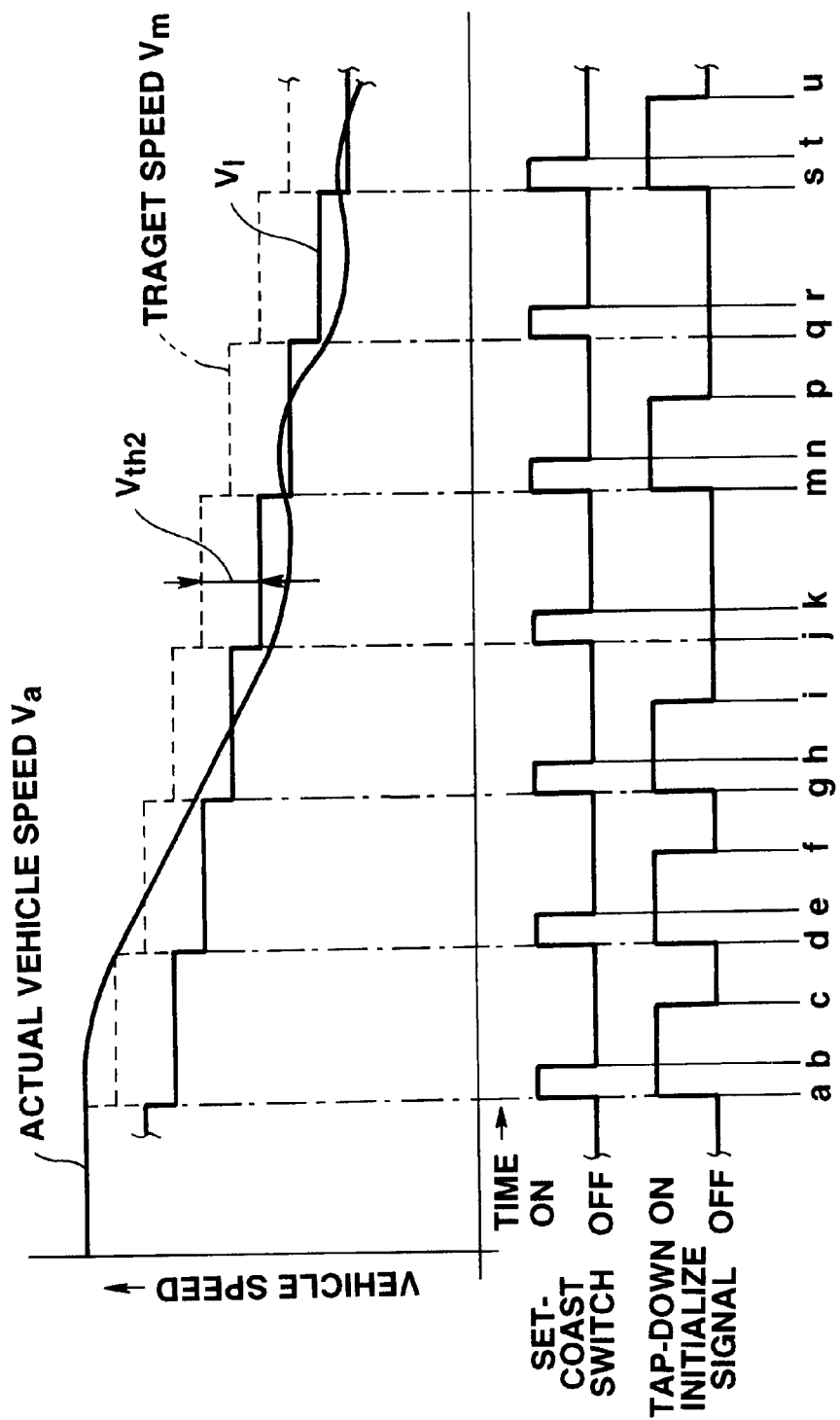
FIG. 20 is a time chart illustrating the tap-down control in the fifth embodiment of the cruising control apparatus according to this invention.

Namely, a lower reference speed $V_l$ lower than the renewed target cruising speed $V_m$ by the second threshold value $V_{th2}$ is set up as shown in FIG. 20, the tap-down control means 29 generates the tap-down initialize signal so as to drive the actuator 6 in the deceleration direction in response to the tap-down command signal when the actual vehicle speed does not fall below the lower reference speed $V_l$. On the other hand, when the actual vehicle speed falls below the lower reference speed $V_l$ the tap-down control means 29 does not generate the tap-down initialize signal even if the tap-down command signal is generated from the set-coast switch 3.

When the main switch 15 of the apparatus 1 is switched on and the set-coast switch 3 is switched by the driver after the on-operation while the vehicle is running in a state of cancelling the cruising control, the cruising control starts as mentioned in the previous embodiments and is carried out so as to conform the vehicle speed signal generated from the speed sensor 2 with the speed signal stored in the memory means 8 as the target cruising speed.

In a case where the resume-acceleration switch 4 is switched on at time a shown in FIG. 18 and switched off at time b shown in FIG. 16 while the cruising control is executed, the tap-up control means 28 renews the target cruising speed $V_m$ by adding the predetermined tap-up speed $V_{tap}$ (1.6 km/h) to the actual vehicle speed $V_a$ at the time of switching on the resume-acceleration switch 4 since the resume-acceleration switch 4 is operated in the first time, and compares the present actual vehicle speed $V_a$ with the speed $V_u$ obtained by adding the first threshold value $V_{th1}$ to the renewed target cruising speed $V_m$. The tap-up control means 28 generates the tap-up initialize signal corresponding to the predetermined tap-up speed (1.6 km/h) until time c and supplies the signal to the speed increase means 10 to drive the actuator 6 in the acceleration direction because the actual vehicle speed $V_a$ does not reach to the speed $V_u$ obtained by adding the first threshold value $V_{th1}$ to the renewed target cruising speed $V_m$ in this time as shown in FIG. 18.

In a case where the resume-accelerate switch 4 is switched on at time d after the time c and switched off at time e as shown in FIG. 18, the tap-up control means 28 renews the target cruising speed $V_m$ by adding the tap-up speed $V_{tap}$ (1.6 km/h) to the target cruising speed $V_m$ at the time of switching on the resume-acceleration switch 4 since the resume-acceleration switch 4 is operated in the second time, and compares the present actual vehicle speed $V_a$ with the speed $V_u$ obtained by adding the first threshold value $V_{th1}$ to the renewed target cruising speed $V_m$. The tap-up control means 28 generates the tap-up initialize signal corresponding to the predetermined tap-up speed (1.6 km/h) until time f and supplies the signal to the speed increase means 10 because the actual vehicle speed $V_a$ does not reach to the speed $V_u$ obtained by adding the first threshold value $V_{th1}$ to the renewed target cruising speed $V_m$ in this time as shown in FIG. 18.

Also in a case where the resume-acceleration switch 4 is switched on at time g and switched off at time h as shown in FIG. 18, the tap-up control means 28 renews the target cruising speed $V_m$ by adding the tap-up speed $V_{tap}$ to the present target cruising speed $V_m$, and similarly generates the tap-up initialize signal until time i after comparing the actual vehicle speed $V_a$ with the speed $V_u$ obtained by adding the first threshold value $V_{th1}$ to the renewed target cruising speed $V_m$ because the actual vehicle speed $V_a$ does not reach to the speed $V_u$ also in this time as shown in FIG. 18.

When the resume-acceleration switch 4 is switched on at time j and switched off at time k as shown in FIG. 18, the tap-up control means 28 renews the target cruising speed $V_m$ by adding the tap-up speed $V_{tap}$ to the target cruising speed $V_m$ at the time of switching on the resume-acceleration switch 4 since the resume-acceleration switch 4 is operated in the fourth time, and compares the present actual vehicle speed $V_a$ with the speed $V_u$ obtained by adding the first threshold value $V_{th1}$ to the renewed target cruising speed $V_m$. In this time, the actual vehicle speed $V_a$ exceeds the speed $V_u$ obtained by adding the first threshold value $V_{th1}$ to the renewed target cruising speed $V_m$ as shown in FIG. 18, therefore the tap-up control means 28 prohibits the generation of the tap-up initialize signal.

Further in a case where the resume-acceleration switch 4 is switched on at time m shown in FIG. 18 and switched off at time n shown in FIG. 18, the tap-up control means 28 generates the tap-up initialize signal until time p since the actual vehicle speed $V_a$ does not exceed the speed $V_u$ obtained by adding the first threshold value $V_{th1}$ to the renewed target cruising speed $V_m$ as shown in FIG. 16.

In a case where the resume-acceleration switch 4 is switched on at time q and switched off at time r as shown in FIG. 18, the tap-up control means 28 renew the target cruising speed $V_m$ in the same manner but does not generate the tap-up initialize signal because the actual vehicle speed $V_a$ exceeds the speed $V_u$ obtained by adding the first threshold value $V_{th1}$ to the target cruising speed $V_m$ renewed by adding the tap-up speed $V_{tap}$ (1.6 km/h) to the target cruising speed $V_m$ at the time q when the resume-acceleration switch 4 is switched on as shown in FIG. 18.

Furthermore, when the resume-acceleration switch 4 is switched on at time s and switched off at time t a shown in FIG. 18, the tap-up control means 28 generates the tap-up initialize signal until time u because the actual vehicle speed $V_a$ becomes lower than the speed $V_u$ obtained by adding the first threshold value $V_{th1}$ to the similarly renewed target cruising speed $V_m$ as shown in FIG. 18. After this, the similar control is executed repeatedly for each on-off operation of the resume-acceleration switch 4.

On the other side, in a case where the set-coast switch 3 is switched on at time a shown in FIG. 20 and switched off at time b shown in FIG. 20 while the cruising control of the vehicle is executed, the tap-down control means 29 renews the target cruising speed $V_m$ by subtracting the predetermined tap-down speed $V_{tap}$ (1.6 km/h) from the actual vehicle speed $V_a$ at the time of switching on the set-coast switch 3 (at the time a) since the set-coast switch 3 is operated in the first time, and compares the present actual vehicle speed $V_a$ with the speed $V_l$ obtained by subtracting the second threshold value $V_{th2}$ from the renewed target cruising speed $V_m$. The tap-down control means 29 generates the tap-down initialize signal corresponding to the predetermined tap-down speed (1.6 km/h) until time c and supplies the tap-down initialize signal to the speed decrease means 11 to drive the actuator 6 in the deceleration direction because the actual vehicle speed $V_a$ does not fall below the speed $V_l$ obtained by subtracting the second threshold value $V_{th2}$ from the renewed target cruising speed $V_m$ in this time as shown in FIG. 20.

In a case where the set-coast switch 3 is switched on at time d and switched off at time e as shown in FIG. 20. the tap-down control means 29 renews the target cruising speed $V_m$ by subtracting the tap-down speed $V_{tap}$ (1.6 km/h) from the target cruising speed $V_m$ at the time of switching on the set-coast switch 3 (at the time d) since the set-coast switch 3 is operated in the second time, and compares the present actual vehicle speed $V_a$ with the speed $V_u$ obtained by subtracting the second threshold value $V_{th2}$ from the renewed target cruising speed $V_m$. The tap-down control means 29 generates the tap-down initialize signal corresponding to the predetermined tap-down speed (1.6 km/h) until time f and supplies the signal to the speed decrease means 11 similarly because the actual vehicle speed $V_a$ does not reach to the speed $V_l$ obtained by subtracting the second threshold value $V_{th2}$ from the renewed target cruising speed $V_m$ also in this time as shown in FIG. 20.

Also in a case where the set-coast switch 3 is switched on at time g and switched off at time h as shown in FIG. 20, the tap-down control means 29 renews the target cruising speed $V_m$ by subtracting the tap-down speed $V_{tap}$ from the present target cruising speed $V_m$ in the same manner, and generates the tap-down initialize signal until time i after comparing the actual vehicle speed $V_a$ with the speed $V_l$ obtained by subtracting the second threshold value $V_{th2}$ from the target cruising speed $V_m$ renewed by subtracting the tap-down speed $V_{tap}$ from the target cruising speed $V_m$ at the time of switching on the set-coast switch 3 (at the time g) because the actual vehicle speed $V_a$ does not yet reach to the speed $V_l$ obtained by subtracting the second threshold value $V_{th2}$ from the renewed target cruising speed $V_m$ also in this time as shown in FIG. 20.

When the set-coast switch 3 is switched on at time j shown in FIG. 20 and switched off at time k shown in FIG. 20, the tap-down control means 29 renews the target cruising speed $V_m$ by subtracting the tap-down speed $V_{tap}$ from the target cruising speed $V_m$ at the time of switching on the set-coast switch 3 (at the time j) since the set-coast switch 3 is operated in the fourth time, and compares the present actual vehicle speed $V_a$ with the speed $V_l$ obtained by subtracting the second threshold value $V_{th2}$ from the renewed target cruising speed $V_m$. In this time, the actual vehicle speed $V_a$ falls below the speed $V_l$ obtained by subtracting the first threshold value $V_{th2}$ from the renewed target cruising speed $V_m$ as shown in FIG. 20, accordingly the tap-down control means does not generate the tap-down initialize signal.

In a case where the set-coast switch 3 is switched on at time m and switched off at time n as shown in FIG. 20, the tap-down control means 29 similarly renews the target cruising speed $V_m$ and generates the tap-down initialize signal until time p since the actual vehicle speed $V_a$ does not fall below the speed $V_l$ obtained by subtracting the second threshold value $V_{th2}$ from the renewed target cruising speed $V_m$ as shown in FIG. 20.

In a case where the set-coast switch 3 is switched on at time q and switched off at time r as shown in FIG. 20, the tap-down control means 29 renews the target cruising speed $V_m$ but does not generate the tap-down initialize signal because the actual vehicle speed $V_a$ falls again below the speed $V_l$ obtained by subtracting the second threshold value $V_{th2}$ from the renewed target speed $V_m$ as shown in FIG. 20.

Furthermore, when the set-coast switch 3 is switched on at time s and switched off at time t as shown in FIG. 20, the tap-down control means 29 generates the tap-down initialize signal again until time u because the actual vehicle speed $V_a$ becomes higher than the speed $V_l$ obtained by subtracting the second threshold value $V_{th2}$ from the target cruising speed $V_m$ renewed by subtracting the tap-down speed $V_{tap}$ from the target cruising speed $V_m$ at the time s when the set-coast switch 3 is switched on as shown in FIG. 20. After this, the similar control is repeated each time the set-coast switch 3 is switched on and off.

Figure 19:
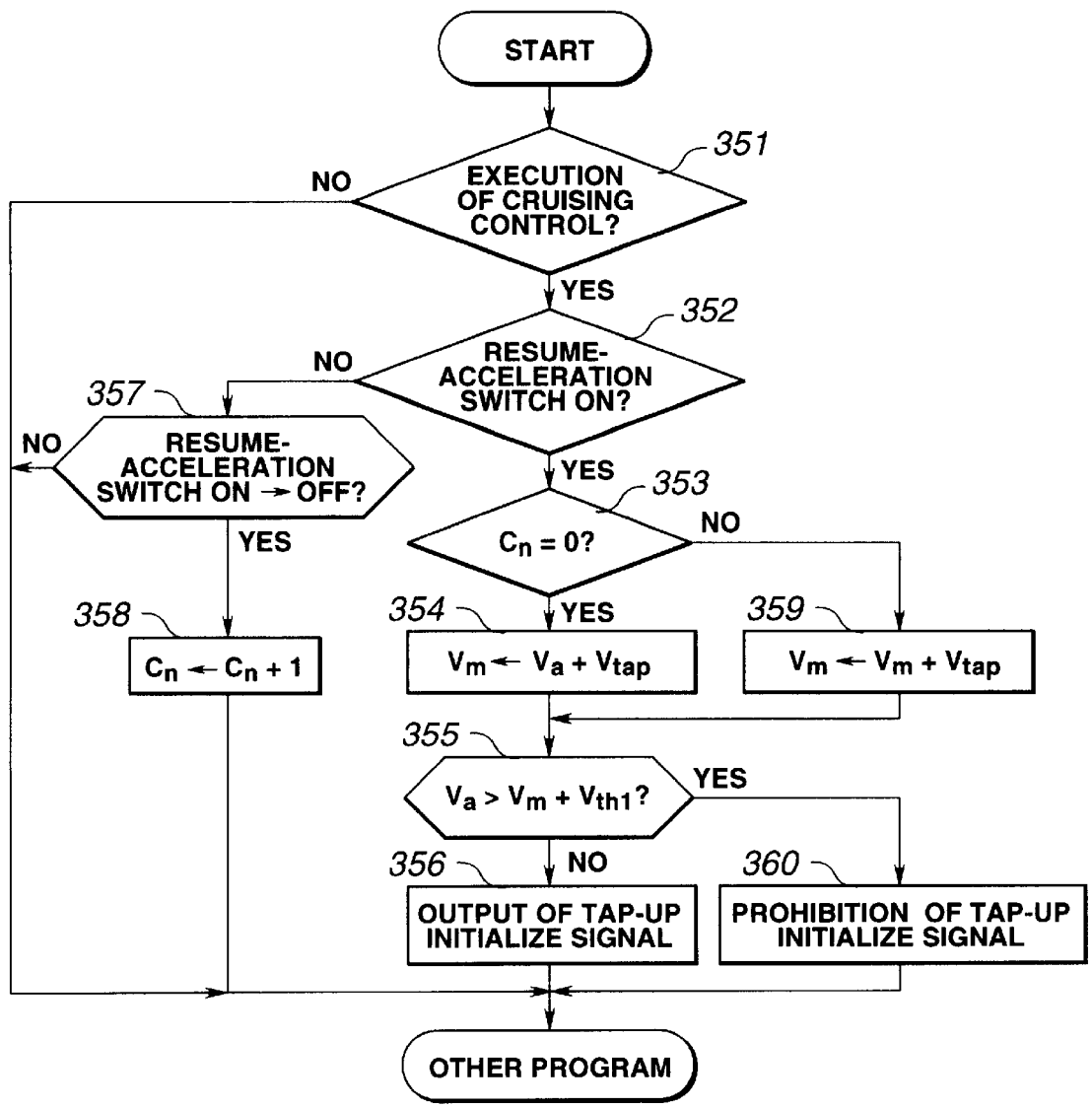
FIG. 19 is a flow chart illustrating the tap-up control shown in FIG. 18.
Figure 21:
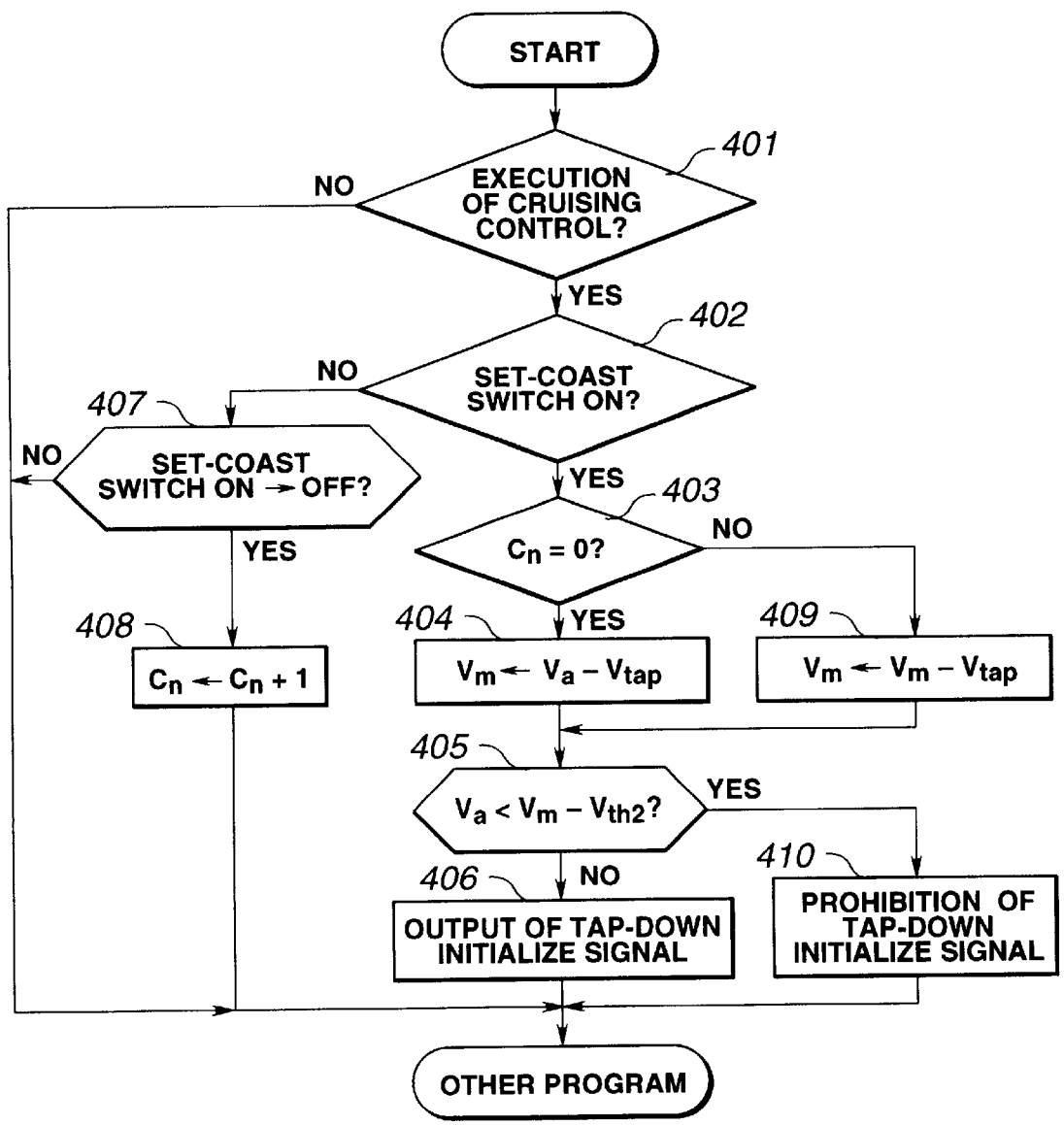
FIG. 21 is a flow chart illustrating the tap-down control shown in FIG. 20.

The above-mentioned control shown in FIG. 18 and FIG. 20 is performed according to the programs shown in FIG. 19 and FIG. 21, respectively.

In the first place, when the resume-acceleration switch 4 is switched on at the time a shown in FIG. 18 while the cruising control is executed, decision is done at step 351 shown in FIG. 19 that the cruising control is executed (YES), control proceeds to step 352 from the step 351 and decision is done as to whether the resume-acceleration switch 4 is switched on or not at the step 352. Control proceeds to step 353 from the step 352 because the resume-acceleration switch 4 is switched on and further proceeds to step 354 after deciding that the count number Cn of the counter 12 is zero (NO) at the step 353 since increment of the counter 12 is not yet done. At the step 354, the target cruising speed $V_m$ is renewed by adding the predetermined tap-up speed $V_{tap}$ (1.6 km/h) to the actual vehicle speed $V_a$ at the time of switching on the resume acceleration switch 4 and control proceeds to step 355.

At the step 355, the actual vehicle speed $V_a$ is compared with the speed $V_u$ obtained by adding the first threshold value $V_{th1}$ to the target cruising speed $V_m$ renewed at the step 354. Control proceeds to step 356 because the actual vehicle speed $V_a$ does not reach to the speed $V_u$ obtained by adding the first threshold value $V_{th1}$ to the renewed target cruising speed $V_m$ at the time a shown in FIG. 18 and further returns to the step 351 after outputting the tap-up initialize signal corresponding to the tap-up speed $V_{tap}$ (1.6 km/h) at the step 356.

When the resume-acceleration switch 4 is switched off at the time b shown in FIG. 18, control proceeds to step 357 through the decision at the step 351 (YES) and the step 352 (NO), and further proceeds to step 358 after deciding that the resume-acceleration switch 4 is switched off (YES) at the step 357. At the step 358, increment of the count number Cn of the counter 12 is carried out, and then control returns to the step 351.

According to the off-operation of the resume-acceleration switch 4 at the time b shown in FIG. 18, the tap-up control means 28 generates the tap-up initialize signal until the time c and supplies the signal to the speed increase means 10 to drive the actuator 6 in the acceleration direction, whereby the actual speed of the vehicle is increased.

When the resume-acceleration switch 4 is switched on again at the time d shown in FIG. 18, control proceeds to the step 353 through the step 351 (YES) and the step 352 (YES) and the decision is done at the step 353 as to whether the count number Cn in the counter 12 is zero or not. The count number Cn of the counter 12 is decided to be not zero at the step 353 because the increment of the counter 12 is done at the step 358, therefore control proceeds to step 359 and further proceeds to the step 355 after renewing the target cruising speed $V_m$ by adding the tap-up speed $V_{tap}$ to the present target cruising speed $V_m$ renewed at the step 354 in the previous time.

At the step 355, the actual vehicle speed $V_a$ is compared with the speed $V_u$ obtained by adding the first threshold value $V_{th1}$ to the target cruising speed $V_m$ renewed at the step 359. As the actual vehicle speed $V_a$ does not reach to the speed $V_u$ obtained by adding the first threshold value $V_{th1}$ to the renewed target cruising speed $V_m$ at the time d shown in FIG. 18, control proceeds to the step 356 and further returns to the step 351 after outputting the tap-up initialize signal corresponding to the tap-up speed $V_{tap}$ at the step 356.

When the resume-acceleration switch 4 is switched off at the time e shown in FIG. 18, control proceeds to the step 358 after the decision at the step 351 (YES), the step 352 (NO) and the step 357 (YES) as mentioned above, and returns to the step 351 after performing the increment of the counter 12 at the step 358.

Namely, the tap-up control means 28 generates the tap-up initialize signal until the time f and supplies the initialize signal into the speed increase means 10 to drive the actuator 6 in the acceleration direction in response to the off-operation of the resume-acceleration switch 4 at the time e, accordingly the actual vehicle speed is increased.

Also at the time when the resume-acceleration switch 4 is switched on again at the time g shown in FIG. 18, control proceeds to the step 356 through the steps 351, 352, 353, 359 and 355, and then returns to the step 351 similarly to the above after renewing the target cruising speed $V_m$ by adding the tap-up speed $V_{tap}$ to the present target cruising speed $V_m$ at the step 359 and outputting the tap-up initialize signal at the step 356 because the actual vehicle speed $V_a$ does not yet reach to the speed $V_u$ obtained by adding the first threshold value $V_{th1}$ to the renewed target cruising speed $V_m$ even at the time g as shown in FIG. 18.

When the resume-acceleration switch 4 is switched off at the time h shown in FIG. 18, control proceeds to the step 358 through the steps 351, 352 and 357, and further returns to the step 351 after the increment of the counter 12 at the step 358.

According to the off-operation of the resume-acceleration switch 4 at the time h shown in FIG. 18, the tap-up control means 28 generates the tap-up initialize signal until the time i and supplies the initialize signal into the speed increase means 10 to drive the actuator 6 in the acceleration direction, thereby further increasing the actual cruising speed of the vehicle.

In the case where the resume-acceleration switch 4 is switched on at the time j successively, control similarly proceeds to the step 355 through the steps 351, 352, 353 and 359, and the decision is done at the step 355 as to whether the actual vehicle speed $V_a$ is larger than the speed $V_u$ obtained by adding the first threshold value $V_{th1}$ to the target cruising speed $V_m$ renewed at the step 359.

The decision is done at the step 355 that the actual vehicle speed $V_a$ exceeds the speed $V_u$ obtained by adding the first threshold value $V_{th1}$ to the renewed target cruising speed $V_m$ (YES) at the time j as shown in FIG. 18, control proceeds to step 360 and further returns to the step 351 after prohibiting the generation of the tap-up initialize signal at the step 360.

After the time j, when the resume-acceleration switch 4 is switched off at the time k shown in FIG. 18, control proceeds to the step 358 through the steps 351, 352 and 357, and returns to the step 351 after the increment of the counter 12 at the step 358.

In this manner, the actuator 6 is not driven in the acceleration direction in spite of the off-operation of the resume-acceleration switch 4 at the time k because the tap-up control means 28 prohibits the generation of the tap-up initialize signal, therefore increase of the actual vehicle speed is discontinued.

When the resume-acceleration switch 4 is further switched on again at the time m shown in FIG. 18, control proceeds similarly to the step 359 through the steps 351, 352, 353, and proceeds to the step 355 after further renewing the target cruising speed $V_m$ at the step 359.

The comparison is done at the step 355 between the actual vehicle speed $V_a$ and the speed $V_u$ obtained by adding the first threshold value $V_{th1}$ to the target cruising speed $V_m$ renewed at the step 359. The actual vehicle speed $V_a$ becomes lower than the speed $V_u$ obtained by adding the first threshold value $V_{th1}$ to the target cruising speed $V_m$ renewed repeatedly at the time m as shown in FIG. 18, control proceeds to the step 356 from the step 355 (NO) and returns to the step 351 after outputting the tap-up initialize signal at the step 356.

When the resume-acceleration switch 4 is switched off at the time n shown in FIG. 18, control proceeds to the step 358 through the steps 351, 352, 357 and returns to the step 351 after the increment of the counter 12 at the step 358.

In accordance with the off-operation of the resume-acceleration switch 4 at the time n, the tap-up control means 28 generates the tap-up initialize signal until the time p and supplies the initialize signal to the speed increase means 10 to drive the actuator 6, therefore the actual vehicle speed is increased again.

Furthermore, when the resume-acceleration switch 4 is switched on successively at the time q shown in FIG. 18, control proceeds to the step 355 through the steps 351, 352, 353, 359, and the decision is done similarly at the step 355 as to whether or not the actual vehicle speed $V_a$ is higher than the speed $V_u$ calculated by adding the first threshold value $V_{th1}$ to the target cruising speed $V_m$ renewed at the step 359.

The actual vehicle speed $V_a$ is decided at the step 355 to be higher than the speed $V_u$ calculated by adding the first threshold value $V_{th1}$ to the renewed target cruising speed $V_m$ (YES) at the time q as shown in FIG. 18, the generation of the tap-up initialize signal is prohibited at the step 360 and control returns to the step 351.

After the time q, when the resume-acceleration switch 4 is switched off at the time r shown in FIG. 18, control proceeds to the step 358 through the steps 351, 352, 357, and further returns to the step 351 after the increment of the counter 12 at the step 358.

Although the resume-acceleration switch 4 is switched off at the time r, the actuator 6 is not driven in the acceleration direction because the tap-up control means 28 prohibits the generation of the tap-up initialize signal, so that the actual speed of the vehicle is not increased.

When the on-operation of the resume-acceleration switch 4 is further repeated at the time s as shown in FIG. 18, control proceeds to the step 355 through the steps 351, 352, 353, 359, and the comparison is done at the step 355 between the actual vehicle speed $V_a$ and the speed $V_u$ obtained by adding the first threshold value $V_{th1}$ to the target cruising speed $V_m$ renewed at the step 359.

The actual vehicle speed $V_a$ becomes lower than the speed $V_u$ obtained by adding the first threshold value $V_{th1}$ to the renewed target cruising speed $V_m$ at the time s as shown in FIG. 18, therefore control proceeds to the step 356 from the step 355 (NO) and returns to the step 351 after outputting the tap-up initialize signal at the step 356.

Immediately after the time s, when the resume-acceleration switch 4 is switched off at the time t shown in FIG. 18, control proceeds to the step 358 through the steps 351, 352 and 357, and further returns to the step 351 after the increment of the counter 12 at the step 358.

In such the manner, the tap-up control means 28 generates the tap-up initialize signal until the time u according to the off-operation of the resume-acceleration switch 4 at the time t, and supplies the tap-up initialize signal to the speed increase means 10 to drive the actuator 6 in the acceleration direction, thereby increasing the actual vehicle speed.

As mentioned above, in the cruising control apparatus 1 according to this embodiment, the tap-up initialize signal is not always generated every time the tap-up command signal is generated according to the on-off operation of the resume-acceleration switch 4, and the tap-up initialize signal is not supplied to the actuator 6 even if the tap-up command signal is generated at the time when the actual vehicle speed $V_a$ exceeds the speed $V_u$ calculated by adding the first threshold value $V_{th1}$ to the renewed target cruising speed $V_m$, therefore the actual vehicle speed does not deviate from the target cruising speed by large margin even if the tap-up command signal is generated repeatedly according to the successive operation of the resume-acceleration switch 4 in a case where the vehicle enters to the downhill road, for example.

On the other hand, when the set-coast switch 3 is switched on at the time a shown in FIG. 20 while the cruising control is executed, decision is done that the cruising control is executed (YES) at step 401 shown in FIG. 21, control proceeds to step 402 from the step 401 and decision is done at the step 402 as to whether the set-coast switch 3 is switched on or not. Control proceeds to step 403 from the step 402 because the set-coast switch is switched on and further proceeds to step 404 from the step 403 because increment of the counter 12 is not yet done and the count number Cn of the counter 12 is zero. At the step 404, the target cruising speed $V_m$ is renewed by subtracting the predetermined tap-down speed $V_{tap}$ (1.6 km/h) from the actual vehicle speed $V_a$ at the time of switching on the set-coast switch 3 (at the time a shown in FIG. 20), and control proceeds to step 405.

At the step 405, the actual vehicle speed $V_a$ is compared with the speed $V_l$ obtained by subtracting the second threshold value $V_{th2}$ (which is used in this control program as the first threshold value $V_{th1}$ in common) from the target cruising speed $V_m$ renewed at the step 404. Control proceeds to step 406 from the step 405 because the actual vehicle speed $V_a$ does not reach to the speed $V_l$ obtained by subtracting the second threshold value $V_{th2}$ from the renewed target cruising speed $V_m$ at the time a shown in FIG. 20, and returns to the step 401 after outputting the tap-down initialize signal corresponding to the tap-down speed $V_{tap}$ (1.6 km/h) at the step 406.

When the set-coast switch 3 is switched off at the time b shown in FIG. 20, control proceeds to step 407 through the decision at the step 401 (YES) and the step 402 (NO), and further proceeds to step 408 after deciding that the set-coast switch 3 is switched off (YES) at the step 407. Increment of the count number Cn of the counter 12 is carried out at the step 408, and then control returns to the step 401.

In response to the off-operation of the set-coast switch 3 at the time b shown in FIG. 20, the tap-down control means 29 generates the tap-down initialize signal until the time c and supplies the initialize signal to the speed decrease means 11 to drive the actuator 6 in the deceleration direction, therefore the actual speed of the vehicle is decreased.

When the set-coast switch 3 is switched on again at the time d shown in FIG. 20, control proceeds to the step 403 through the step 401 (YES) and the step 402 (YES) and decision is done as to whether the count number Cn in the counter 12 is zero or not. The increment of the counter 12 is done at the step 408 and the count number Cn of the counter 12 is decided to be not zero at the step 403, whereby control proceeds to step 409 and further proceeds to the step 405 after renewing the target cruising speed $V_m$ by subtracting the tap-down speed $V_{tap}$ from the present target cruising speed $V_m$ renewed at the step 404 in the previous time.

The actual vehicle speed $V_a$ is compared with the speed $V_l$ calculated by subtracting the second threshold value $V_{th2}$ from the target cruising speed $V_m$ renewed at the step 409. Because the actual vehicle speed $V_a$ does not reach to the speed $V_l$ calculated by subtracting the second threshold value $V_{th2}$ from the renewed target cruising speed $V_m$ at the time d as shown in FIG. 20, control proceeds to the step 406 and further returns to the step 401 after outputting the tap-down initialize signal corresponding to the tap-down speed $V_{tap}$ at the step 406.

When the set-coast switch 3 is switched off at the time e as shown in FIG. 20, control proceeds to the step 408 after decision at the step 401 (YES), the step 402 (NO) and the step 407 (YES) as described above, and returns to the step 401 after performing the increment of the counter 12 at the step 408.

In this manner, the tap-down control means 29 generates the tap-down initialize signal until the time f and supplies the tap-down initialize signal to the speed decrease means 11 to drive the actuator 6 in the deceleration direction in response to the off-operation of the set-coast switch 3 at the time e, therefore the vehicle speed is decreased.

At the time when the set-coast switch 3 is switched on again at the time g shown in FIG. 20, control proceeds to the step 406 through the steps 401, 402, 403, 409, 405, and then returns to the step 401 similarly to the above after renewing the target cruising speed $V_m$ by subtracting the tap-down speed $V_{tap}$ from the present target cruising speed $V_m$ at the step 409 and outputting the tap-down initialize signal at the step 406 because the actual vehicle speed $V_a$ does not yet falls to the speed $V_l$ obtained by subtracting the second threshold value $V_{th2}$ from the target cruising speed $V_m$ renewed at the step 409 even at the time g as shown in FIG. 20.

Immediately after the time g, when the set-coast switch 3 is switched off at the time h shown in FIG. 20, control proceeds to the step 408 through the steps 351, 352, 357 and further returns to the step 401 after the increment of the counter 12 at the step 408.

According to the off-operation of the set-coast switch 3 at the time h shown in FIG. 20, the tap-down control means 29 generates the tap-down initialize signal until the time i and supplies the initialize signal into the speed decrease means 11 to drive the actuator 6 in the deceleration direction, whereby the actual vehicle speed of the vehicle is further decreased.

In the case where the set-coast switch 3 is switched on at the time j as shown in FIG. 20, control similarly proceeds to the step 405 through the steps 401, 402, 403, 409, and the comparison is done in the decision at the step 405 between the actual vehicle speed $V_a$ and the speed $V_l$ obtained by subtracting the second threshold value $V_{th2}$ from the target cruising speed $V_m$ renewed at the step 409.

The decision is done at the step 405 that the actual vehicle speed $V_a$ falls below the $V_l$ obtained by subtracting the second threshold value $V_{th2}$ from the renewed target cruising speed $V_m$ (YES) at the time j as shown in FIG. 20, control proceeds to step 410 and further returns to the step 401 after the generation of the tap-down initialize signal is prohibited at the step 410.

Immediately after the time j, when the set-coast switch 3 is switched off at the time k shown in FIG. 20, control proceeds to the step 408 through the steps 401, 402, 407 and returns to the step 401 after the increment of the counter 12 at the step 408.

Namely, the actuator 6 is not driven in the deceleration direction in spite of the off-operation of the set-coast switch 3 at the time k because the generation of the tap-down initialize signal is prohibited by the tap-down control means 29, therefore decrease of the actual speed of the vehicle is descontinued.

When the set-coast switch 3 is further switched on again at the time m shown in FIG. 20, control similarly proceeds to the step 409 through the steps 401, 402, 403 and further proceeds to the step 405 after renewing the target cruising speed $V_m$ at the step 409.

The decision is done at the step 405 that the actual vehicle speed $V_a$ becomes higher than the speed $V_l$ calculated by subtracting the second threshold value $V_{th2}$ from the target cruising speed $V_m$ at the time m as shown in FIG. 20, control proceeds to the step 406 from the step 405 (NO) and returns to the step 401 after outputting the tap-down initialize signal at the step 406.

When the set-coast switch 3 is switched off at the time n immediately after the time m as shown in FIG. 20, control proceeds to the step 408 through the steps 401, 402, 407 and returns to the step 401 after the increment of the counter 12 at the step 408.

According to the off-operation of the set-coast switch 3 at the time n shown in FIG. 20, the tap-down control means 29 generates the tap-down initialize signal until the time p and supplies the signal to the speed decrease means 11 to drive the actuator 6 in the deceleration direction, thereby decreasing the actual speed of the vehicle again.

Furthermore, when the set-coast switch 3 is switched on successively at the time q, control proceeds to the step 405 through the step 401, 402, 403, 409 and the decision is done similarly at the step 405 as to whether or not the actual vehicle speed $V_a$ is lower than the speed $V_l$ calculated by subtracting the second threshold value $V_{th2}$ from the target cruising speed $V_m$ renewed at the step 409.

The actual vehicle speed $V_a$ is decided at the step 405 to be lower than the speed $V_l$ calculated by subtracting the second threshold value $V_{th2}$ from the renewed target cruising speed $V_m$ (YES) at the time q as shown in FIG. 20, so that the generation of the tap-down initialize signal is prohibited at the step 410 and control returns to the step 401.

Immediately after the time q, when the set-coast switch 3 is switched off at the time r shown in FIG. 20, control proceeds to the step 408 through the steps 401, 402, 407 and further returns to the step 401 after the increment of the counter 12 at the step 408.

The set-coast switch 3 is switched off at the time r, however the actuator 6 is driven in the deceleration direction since the tap-down control means 29 prohibits the generation of the tap-down initialize signal, accordingly the actual speed of the vehicle is not decreased.

When the set-coast switch 3 is switched on again at the time s shown in FIG. 20, control proceed to the step 405 through the steps 401, 402, 403, 409 and the comparison is done at the step 405 between the actual vehicle speed $V_a$ and the speed $V_l$ obtained by subtracting the second threshold value $V_{th2}$ from the target cruising speed $V_m$ renewed at the step 409.

The actual vehicle speed $V_a$ becomes higher than the speed $V_l$ obtained by subtracting the second threshold value $V_{th2}$ from the renewed target cruising speed $V_m$ at the time s as shown in FIG. 20, accordingly control proceeds to the step 406 from the step 405 and returns to the step 401 after outputting the tap-down initialize signal at the step 406.

Immediately after the time s, when the set-coast switch 3 is switched off at the time t shown in FIG. 20, control proceeds to the step 408 through the steps 401, 402, 407 and returns to teh step 401 after the increment of the counter 12 at the step 408.

Namely, the tap-down control means 29 generates the tap-down initialize signal until the time u according to the off-operation of the set-coast switch 3 at the time t, and supplies the tap-down initialize signal to the speed decrease means 11 to drive the actuator 6 in the deceleration direction, whereby the actual vehicle speed is decreased again.

In the cruising control apparatus 1 according to this embodiment, the tap-down initialize signal is not always generated for each generation of the tap-down command signal according the on-off operation of the set-coast switch 3, and the tap-down initialize signal is not supplied to the actuator 6 through the speed decrease means 11 even if the tap-down command signal is generated at the time when the actual vehicle speed $V_a$ falls below the speed $V_l$ calculated by subtracting the second threshold value $V_{th2}$ from the renewed target cruising speed $V_m$, therefore, the actual vehicle speed does not deviate form the target cruising speed by large margin even if the tap-down command signal is generated repeatedly according to the successive operation of the set-coast switch 3 in a case where the vehicle enters to the uphill road, for example.

[Embodiment 6]

An explanation will be given below about a cruising control apparatus according to the sixth embodiment of this invention with reference to FIG. 22 to FIG. 24.

The cruising control apparatus 1 according to the sixth embodiment is structured similarly to the cruising control apparatus shown in FIG. 1 as the first embodiment of this invention, and is composed mainly of the speed sensor 2, the set-coast switch 3, the resume-acceleration switch 4, the cancel switch 5, the actuator 6 and the controller 7.

The controller 7 includes the microcomputer MCU, and further provided with a tap-up initialize calculation means 30 for calculating output of the tap-up initialize signal corresponding to the actual vehicle speed at the time of generation of the tap-up command signal, a tap-down initialize calculation means 31 for calculating output of the tap-down initialize signal corresponding to the actual vehicle speed at the time of generation of the tap-down command signal, a tap-up control means 28 for renewing the target cruising speed by adding the predetermined tap-up speed (for example, 1.6 km/h) to the present actual vehicle speed or the presently stored target speed in response to the tap-up command signal, and for driving the actuator 6 in the acceleration direction by outputting the tap-up initialize signal with output power calculated by the tap-up initialize calculation means 30 in a case where the tap-up command signal is generated in the first time, by outputting the tap-up initialize signal with output power obtained by multiplying the output power calculated in the tap-up initialize calculation means 30 by a predetermined coefficient A less than 1 (for example, 0.5) in a case where the tap-up command signal is generated again before the actual vehicle speed arrives in a target speed range renewed by the previous tap-up command signal, and by outputting the tap-up initialize signal with the power calculated by the tap-up initialize calculation means 30 without the multiplication in a case where the tap-up command signal is generated after the actual vehicle speed arrives in the renewed target speed range, and a tap-down control means 29 for renewing the target cruising speed by subtracting the predetermined tap-down speed (for example, 1.6 km/h) from the present actual vehicle speed or the presently stored target speed in response to the tap-down command signal, and for driving the actuator 6 in the deceleration direction by outputting the tap-down initialize signal with output power calculated by the tap-down initialize calculation means 31 in a case where the tap-down command signal is generated in the first time, by outputting the tap-down initialize signal with output power obtained by multiplying the output power calculated in the tap-down initialize calculation means 31 by a predetermined coefficient B less than 1 (for example, 0.5) in a case where the tap-down command signal is generated again before the actual vehicle speed arrives in a target speed range renewed by the previous tap-down command signal, and by outputting the tap-down initialize signal with the power calculated by the tap-down initialize calculation means 31 without the multiplication in a case where the tap-down command signal is generated after the actual vehicle speed arrives in the renewed target speed range, in addition to the memory means 8, the calculation means 9, the speed increase means 10, the speed decrease means 11 in the microcomputer MCU.

Also in the cruising control apparatus 1 according to this embodiment, the cruising control is started in the same manner as explained above by switching off the set-coast switch 3 after the on-operation at the time when the vehicle is running at the speed desired to cruise automatically.

Figure 22:
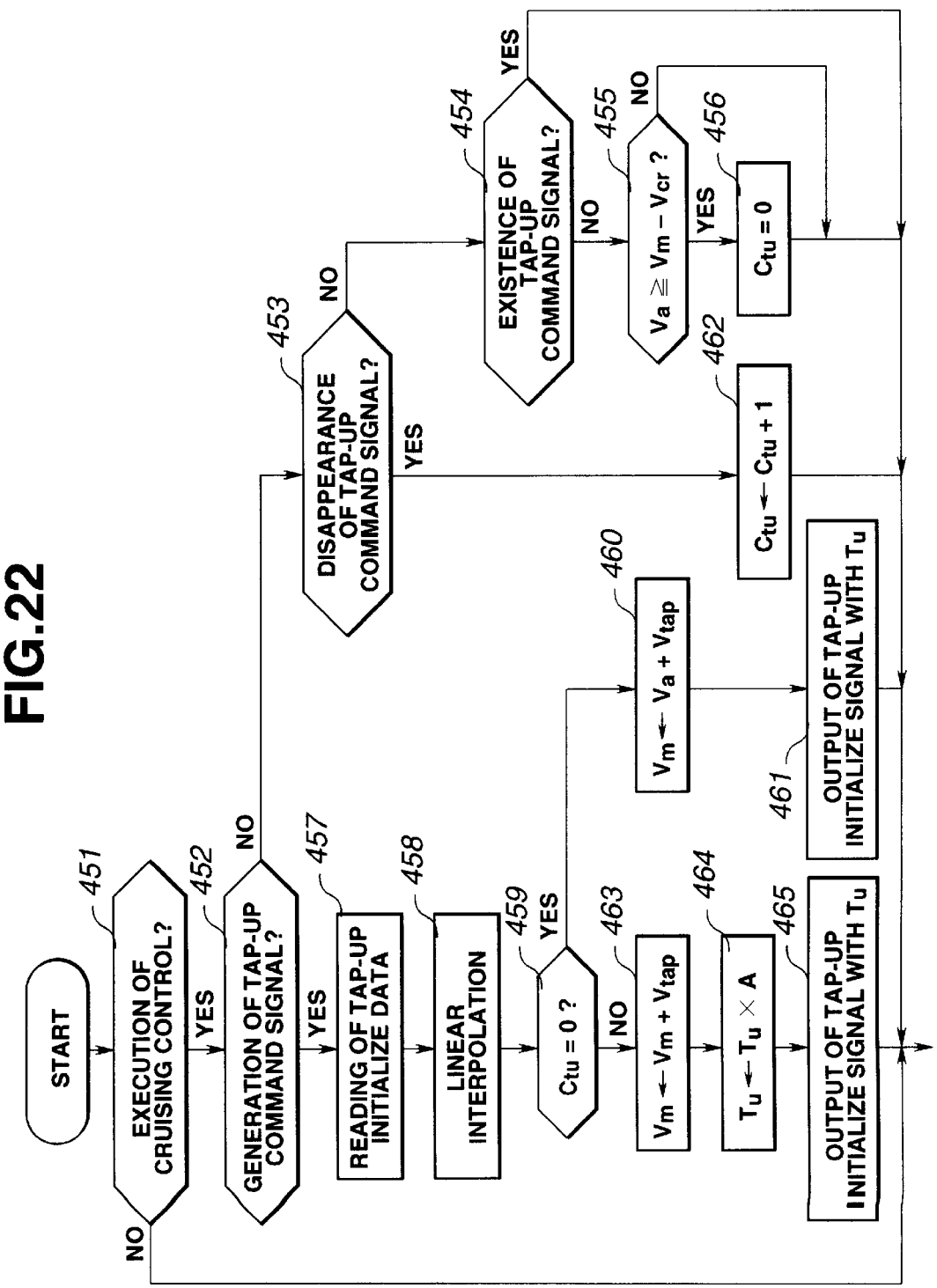
FIG. 22 is a flow chart illustrating the tap-up control in the sixth embodiment of the cruising control apparatus according to this invention.

When the tap-up command signal is generated according to the operation of the resume-acceleration switch 4 during the cruising control, the tap-up control means 28 in the microcomputer MCU of the controller 7 works and tap-up control is started as shown in FIG. 22.

At the beginning, decision is done as to whether the cruising control is executed at present or not at step 451, and control proceed the other control program if the cruising control is not presently executed (NO).

When the cruising control is done at present (YES), control proceeds to step 452 from the step 451 and decision is done at the step 452 whether or not the tap-up command signal is generated according to the on-operation of the resume-acceleration switch 4 by detecting a positive going edge of the signal generated from the resume-acceleration switch 4.

In a case where the resume-acceleration switch 4 is not yet operated and the tap-up command signal is not generated (NO), control proceeds to step 453 and decision is done whether or not the tap-up command signal disappears according to the off-operation of the resume-acceleration switch 4 by detecting a negative going edge of the signal generated from the resume-acceleration switch at the step 453. In this case, control further proceeds to step 455 from the step 453 (NO) through step 454 (NO) because the switch 4 is not yet operated as described above and the tap-up command signal is not generated and does not exist nor disappear, and decision is done at the step 455 as to whether the actual vehicle speed $V_a$ arrives in a renewed target speed range or not, that is whether or not the actual vehicle speed $V_a$ is equal to or higher than a speed obtained by subtracting a predetermined criterion $V_{cr}$ (0.5 km/h in this embodiment) from the target cruising speed $V_m$ stored in the memory means 8 of the microcomputer MCU. Control returns to the start directly from the step 455 or after clearing a tap-up counter $C_{tu}$ at step 456 depending on the result of the decision at the step 455 and the processing consisting of these steps 451, 452, 453, 454, 455 and 456 is repeated until the tap-up command signal is generated in response to the on-operation of the resume-acceleration switch 4. In this case, the control is not influenced at all by the processing of the steps 455 and 456 because the tap-up control is not yet started substantially.

Figure 23:
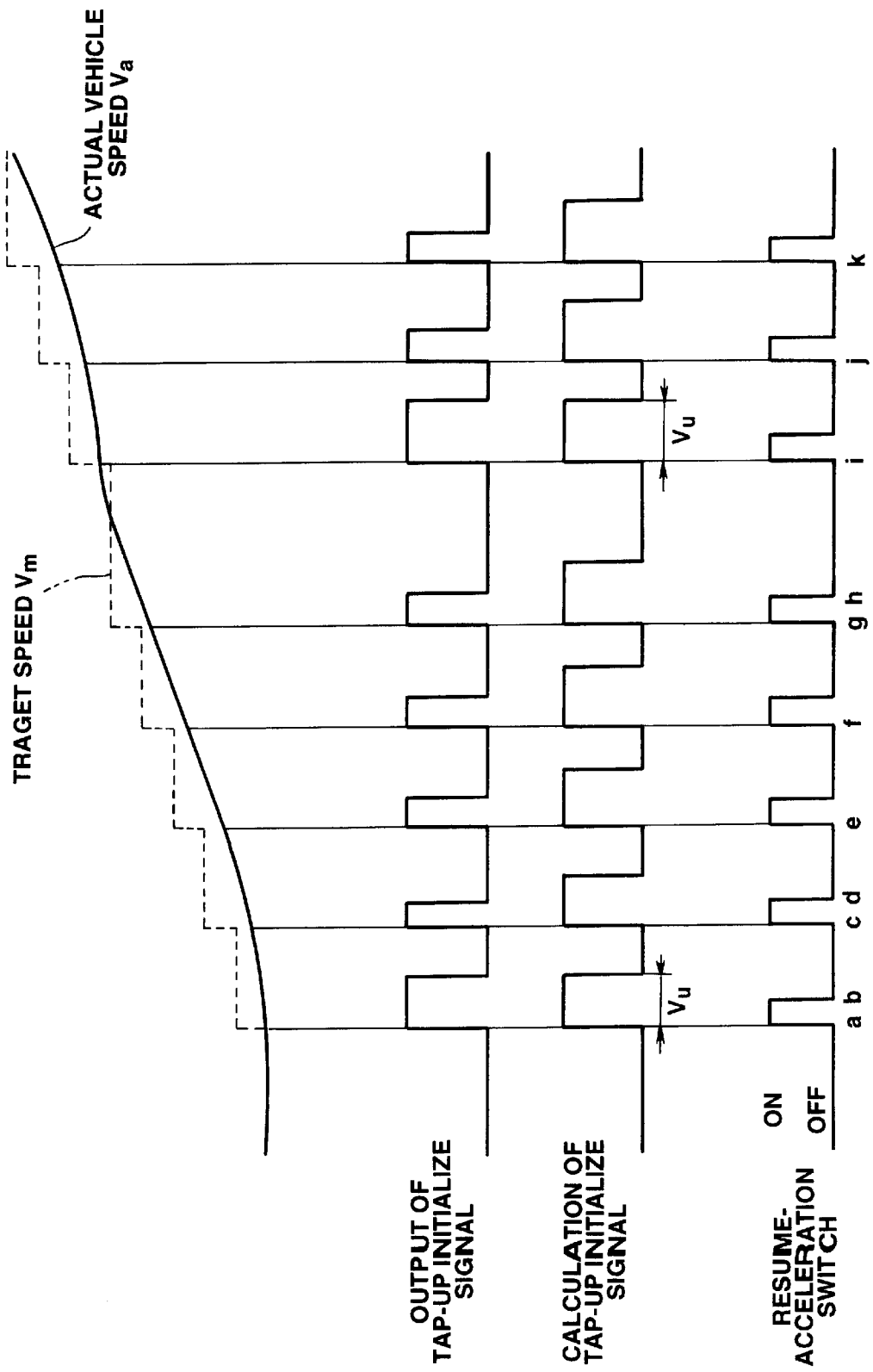
FIG. 23 is a time chart illustrating the tap-up control shown in FIG. 22.

When the first on-operation of the resume-acceleration switch 4 is done at time a as shown in FIG. 23, the positive going edge of the signal from the resume-acceleration switch 4 is detected and the decision is done that the tap-up command signal is generated at the step 452 in the flow chart shown in FIG. 22. Accordingly, control proceeds to step 457 and 458 and the output of the tap-up initialize signal, that is duration time Tu of the tap-up initialize signal is calculated by the tap-up calculation means 30 at the step 457 and the step 458.

Namely, the vehicle speed signal at the time of generation of the tap-up command signal is inputted to the tap-up initialize calculation means 30 from the speed sensor 2, tap-up initialize data corresponding to vehicle speeds close enough to the actual vehicle speed $V_a$ detected by the speed sensor 2 are read out from a data map stored in the microcomputer MCU in advance at the step 457, and the duration time Tu of the tap-up initialize signal corresponding to the actual vehicle speed at the time of switching on the resume-acceleration switch 4 is calculated through linear interpolation between the tap-up initialize data obtained from the data map in the microcomputer MCU as the output of the tap-up initialize signal at the step 459.

Subsequently, control proceeds to step 459 and decision as to whether the count number of the tap-up counter $C_{tu}$ is zero or not at the step 459. As the tap-up counter $C_{tu}$ remains in the cleared state (YES) in this time, control proceeds to step 460 from the step 459 and the vehicle speed obtained by adding the predetermined tap-up speed $V_{tap}$ (1.6 km/h) to the actual vehicle speed $V_a$ is stored in the memory means 8 as a new target cruising speed $V_m$ at the step 460. In other words, a speed signal obtained by adding a speed signal corresponding the predetermined tap-up speed $V_{tap}$ to the vehicle speed signal generated form the speed sensor 2 at the time of generation of the tap-up command signal is written to the memory means 8.

Next, control proceeds to step 461, the tap-up initialize signal with the duration time Tu obtained in the steps 457 and 458 is output at the step 461 whereby the actuator 6 is driven in the acceleration direction of the vehicle, and control returns to the start.

In a case where the resume-acceleration switch 4 remains in the state of on-operation, whereby maintaining the tap-up command signal, decision is done to be "YES" at the step 451 and control proceeds to the step 453 from the step 452 because the positive going edge in the signal is not detected (NO) at the step 452. Decision is done to be "NO" and "YES" at the steps 453 and 454, respectively because the tap-up command signal continues to be generated, and the processing of these step 451, 452, 453 and 454 is repeated until the tap-up command signal is extinguished according to the off-operation of the resume-acceleration switch 4.

When the resume-acceleration switch 4 is switched off at time b shown in FIG. 23 and the tap-up command signal disappears, the negative going edge in the signal of the tap-up command signal is detected at the step 453, whereby control proceeds to step 462 from the step 453 and returns to the start after executing increment of the tap-up counter $C_{tu}$ at the step 462.

Then control proceeds to the step 453 through the step 451 (YES) and the step 452 (NO) and further proceeds to the step 454 from the step 453 because the tap-up command signal is already extinguished and the edge in the signal is not detected (NO).

The decision is done at the step 454 to be "NO", control proceeds to the step 455 and the decision is done at the step 455 as to whether the actual vehicle speed $V_a$ arrives in the range of the present target cruising speed $V_m$, that is whether or not the actual vehicle speed $V_a$ is equal to or higher than the speed obtained by subtracting the criterion $V_{cr}$ from the target cruising speed $V_m$ renewed at the step 460 ($V_m - V^{cr}$). Control returns to the start directly from the step 455 without clearing the tap-up counter $C_{tu}$ at the step 106 because the actual vehicle speed $V_a$ does not yet arrive in the renewed target speed range at the time b in this example shown in FIG. 23, and the decision at the step 455 is repeated until the tap-up command signal is generated in the next time before the actual vehicle speed $V_a$ arrives in the target speed range. If the actual vehicle speed $V_a$ arrives in the target speed range before the next generation of the tap-up command signal, the tap-up counter $C_{tu}$ is cleared at the step 456.

When the resume-acceleration switch 4 is switched on in the second time at time c as shown in FIG. 23, control proceeds to the steps 457 and 458 through the step 451 (YES) and the step 452 (YES), and the output (duration time $T_u$) of the tap-up initialize signal corresponding to the present actual vehicle speed $V_a$ is obtained by the tap-up initialize calculation means 30 in the same manner as explained above.

Control proceeds to the step 459 and the decision as to whether the count number of the tap-up counter $C_{tu}$ is zero or not at the step 459. In this example shown in FIG. 23, control proceeds to step 463 from the step 459 because the actual vehicle speed $V_a$ does not arrive in the target speed range in a period from the disappearance of the first tap-up command signal at the time b till the generation of the second tap-up command signal at the time c and the tap-up counter $C_{tu}$ is not cleared after the increment at the step 462, the vehicle speed obtained by adding the predetermined tap-up speed (1.6 km/h) to the target speed $V_m$ presently stored in the memory means 8 is stored in the memory means 8 as a new target cruising speed $V_m$ at the step 463 and control further proceeds to step 464. Control proceeds to step 465 after multiplying the duration time Tu of the tap-up initialize signal calculated at the steps 457 and 458 by a predetermined coefficient A less than 1 (0.5 in this embodiment) at the step 464 and the tap-up initialize signal with the duration time Tu reduced by half at the step 465.

When the resume-acceleration switch 4 is switched off and the second tap-up command signal is extinguished at time d as shown in FIG. 23, control proceeds to the step 462 through the steps 451, 452, 453 and returns to the start after the increment of the tap-up counter $C_{tu}$ at the step 462. After this, control proceeds to the step 455 through the steps 451, 452, 453, 454 and the decision at the step 454 is repeated similarly until the tap-up command signal is generated in the next time. If the actual vehicle speed $V_a$ arrives in the target speed range even for once before the generation of the tap-up command signal in the next time, control proceeds to the step 456 from the step 455 and the tap-up counter $C_{tu}$ is cleared at the step 456.

In the example shown in FIG. 23, although the third to fifth operations of the resume-acceleration switch 4 are done successively at time e, f and g, the similar control is executed without clearing the tap-up counter $C_{tu}$ at the step 456 because each of the operations is done before the actual vehicle speed $V_a$ arrives in the target speed range in all cases, and the tap-up initialize signal with the duration time Tu obtained by multiplying the duration time Tu obtained at the steps 458 and 459 by the predetermined coefficient A (0.5) is output at the step 465.

The resume-acceleration switch 4 is operated in the sixth time at time i in the example shown in FIG. 23. However, in advance to the sixth operation of the resume-acceleration switch 4, the actual vehicle speed $V_a$ arrives in the target speed range during the disappearance of the tap-up command signal after the disappearance of the fifth tap-up command signal at time h, therefore the decision is done to be "YES" at the step 455 at the time when the actual vehicle speed arrives in the target speed range and the tap-up counter $C_{tu}$ is cleared at the step 456.

Accordingly, when the resume-acceleration switch 4 is switched on at the time i and the sixth tap-up command signal is generated, control proceeds to the step 459 through the steps 451, 452, 457, 458 and further proceeds to the step 460 after deciding the count number of the tap-up counter $C_{tu}$ to be zero (YES) at the step 459. The vehicle speed obtained by adding the tap-up speed $V_{tap}$ to the actual vehicle speed $V_a$ is stored in the memory means 8 as the new target cruising speed at the step 460 and the tap-up initialize signal with the duration time Tu calculated by the tap-up initialize calculation means 30 at the steps 458 and 459 without the multiplication of the coefficient A.

In a case where the resume acceleration switch 4 further operated at time j and time k successively before the actual vehicle speed $V_a$ arrives in the target speed range as shown in FIG. 23, the tap-up initialize signal with duration time obtained by multiplying the duration time Tu calculated at the steps 457 and 458 by the coefficient A, that is duration time reduced by half of the duration time Tu originally calculated by the tap-up initialize calculation means 30 is output at the step 465.

Figure 24:
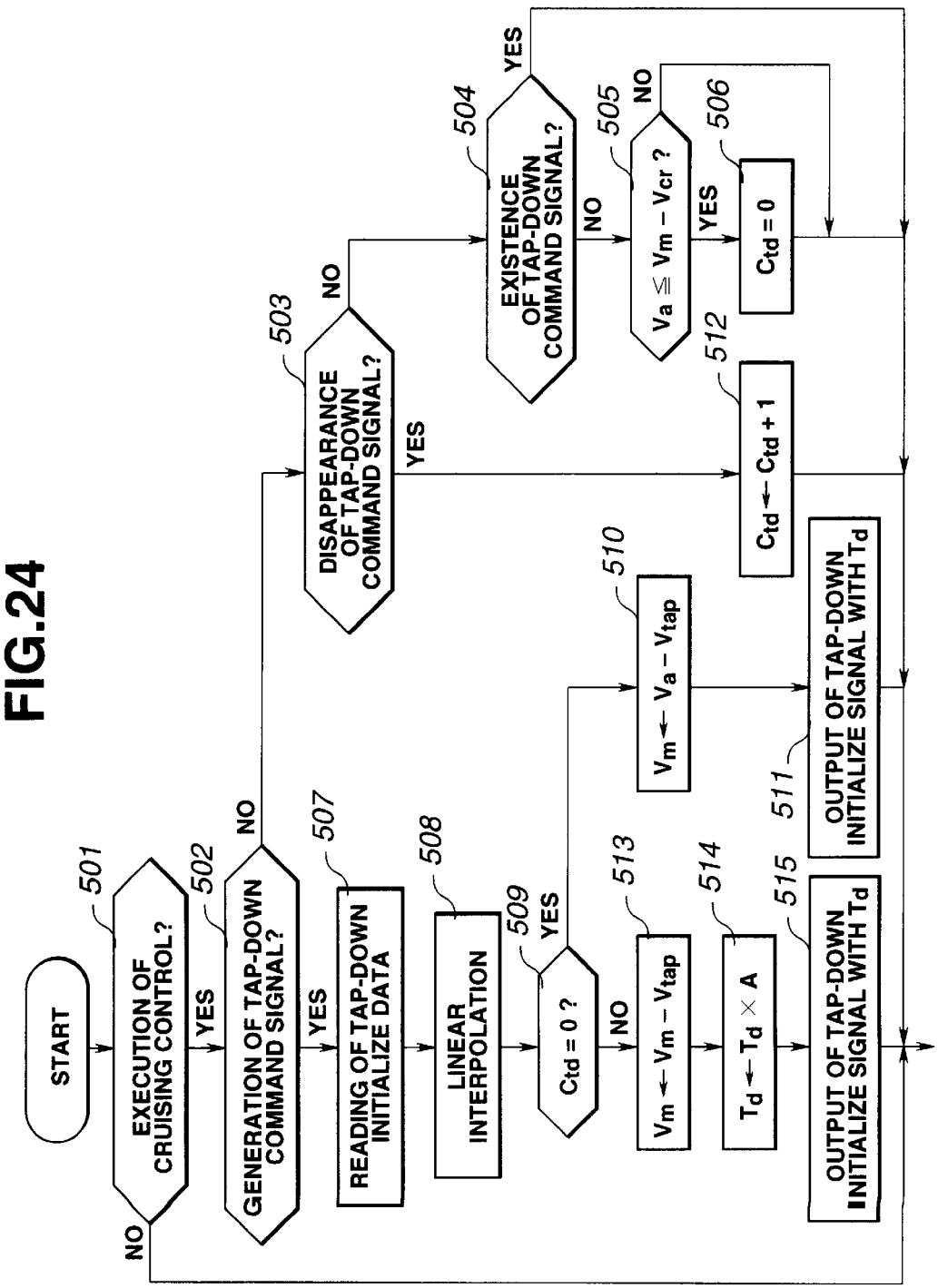
FIG. 24 is a flow chart illustrating the tap-down control in the sixth embodiment of the cruising control apparatus according to this invention.

When the tap-down command signal is generated according to the operation of the set-coast switch 3 during the cruising control, the tap-down control means 29 in the microcomputer MCU of the controller 7 works and tap-down control is started as shown in FIG. 24.

In the tap-down control, there is not fundamental difference in the control system from the tap-up control explained in FIG. 22 and FIG. 23 in principle, excepting that the actuator 6 is driven in the deceleration direction in response to the tap-down initialize signal, the tap-down speed $V_{tap}$ (1.6 km/h) is subtracted form the actual vehicle speed $V_a$ or the present target speed $V_m$ in the renewal of the target cruising sped $V_m$ at the step 510 or 513, the output of tap-down initialize signal is calculated by the tap-down initialize calculation means 31 at steps 507 and 508, and the actual vehicle speed $V_a$ is compared with the speed obtained by adding the criterion $V_{cr}$ (0.5 km/h) to the target cruising speed $V_m$ at the decision whether the actual vehicle $V_a$ speed arrives in the target speed range at step 505. Accordingly, explanation concerning the tap-down control is only given by showing the flow chart in FIG. 24. In the flow chart shown in FIG. 24 of the tap-down control, the symbol "Td" represents duration time of the tap-down initialize signal, and the symbol "Ctd" represents the tap-down counter.

Additionally, in the aforementioned embodiment of this invention, it is exemplified to add (or subtract) the tap-up (or tap-down) speed $V_{tap}$ to (or from) the actual vehicle speed $V_a$ at the first tap-up (or tap-down) operation, and to add (or subtract) the tap-up (or tap-down) seed $V_{tap}$ to (or from) the target speed $V_m$ presently stored in the memory means 8 at the tap-up (or tap-down) operation after the first time, however the tap seed $V_{tap}$ may be added (or subtracted) to (or from) the stored target speed $V_m$ at the first operation and may be added to (or from) the actual vehicle speed $V_a$ at the second or successive operation. Furthermore, the tap speed $V_{tap}$ may be added (or subtracted) to (or from) either actual vehicle speed $V_m$ or stored target speed $V_m$ for each tap-up (or tap-down) operation independently of the order of switching operation.

As described above, in the cruising control apparatus according to the sixth embodiment of this invention, the tap-up control means 28 drives the actuator 6 in the acceleration direction by outputting the tap-up initialize signal with duration time obtained by multiplying the duration time Tu calculated in the tap-up initialize calculation means 30 by the predetermined coefficient A less than 1 (for example, 0.5) in a case where the tap-up command signal is generated again before the actual vehicle speed $V_a$ arrives in the target speed range renewed by the previous tap-up operation, and drives the actuator 6 in the acceleration direction by outputting the tap-up initialize signal with duration time Tu calculated by the tap-up initialize calculation means 30 without the multiplication of the coefficient A in a case where the tap-up command signal is generated after the actual vehicle speed $V_a$ arrives in the target speed range renewed by the previous tap-up operation. Furthermore, the tap-down control means 29 drives the actuator 6 in the deceleration direction by outputting the tap-down initialize with duration time obtained by multiplying the duration time Td calculated in the tap-down initialize calculation means 31 by the predetermined coefficient B (coefficient A may be used in common) less than 1 (for example, 0.5) in a case where the tap-down command signal is generated again before the actual vehicle speed $V_a$ arrives in the target speed range renewed by the previous tap-down operation, and drives the actuator 6 in the deceleration direction by outputting the tap-up initialize signal with duration time Td calculated by the tap-down initialize calculation means 31 without the multiplication of the coefficient B in a case where the tap-down command signal is generated after the actual vehicle speed $V_a$ arrives in the target speed range renewed by the previous tap-down operation. Accordingly, it is possible to prevent the excessive output of the initialize signal caused by the second or successive tap operation even if the tap-up or tap-down operation is done continuously, and possible to speedily conform the actual vehicle speed with the renewed target cruising speed.

[Embodiment 7]

The seventh embodiment of the cruising control apparatus according to this invention will be described below with reference to FIG. 25 and FIG. 26.

The cruising control apparatus 1 according to the seventh embodiment of this invention has the structure basically similar to the cruising control apparatus shown in FIG. 1 as the first embodiment of this invention, and is composed mainly of the speed sensor 2, the set-coast switch 3, the resume-acceleration switch 4, the cancel switch 5, the actuator 6 and the controller 7.

The controller 7 includes the microcomputer MCU, and further provided with the memory means 8, the calculation means 9, the speed increase means 10, the speed decrease means 11, the tap-up initialize calculation means 30, the tap-down initialize calculation means 31, the tap-up control means 28, the tap-down control means 29 and a timer means 32.

The timer means 32 counts duration time of the tap-up command signal and the tap-down command signal, respectively.

In this embodiment, the tap-up control means 28 renews the target cruising speed by adding the predetermined tap-up speed (1.6 km/h for example) to the actual vehicle speed at the time of generation of the tap-up command signal and drives the actuator 6 in the acceleration direction by outputting the tap-up initialize signal calculated in the tap-up initialize calculation means 30 in response to the tap-up command signal, and further drives the actuator 6 by generating the actuator driving signal according to constant speed control till the tap-up command signal disappears in a case where the tap-up command signal is maintained even after the output of the tap-up initialize signal and till the duration time of the tap-up command signal obtained through the timer means 32 attains a predetermined period in a case where the tap-up command signal is further maintained.

The tap-down control means 29 in this embodiment renews the target cruising speed by subtracting the predetermined tap-down speed (1.6 km/h for example) from the actual vehicle speed at the time of generation of the tap-down command signal and drives the actuator 6 in the deceleration direction by outputting the tap-down initialize signal calculated in the tap-down initialize calculation means 31 in response to the tap-down command signal, and further drives actuator 6 by generating the actuator driving signal according to constant speed control till the tap-down command signal disappears in a case where the tap-down command signal is maintained even after the output of the tap-down initialize signal and till the duration time of the tap-down command signal obtained through the timer means 32 attains a predetermined period in a case where the tap-down command signal is further maintained.

Also in the cruising control apparatus 1 according to this embodiment, when the set-coast switch 3 is switched off after the on-operation in the case the vehicle is running at the speed desired to cruise automatically, the cruising control is started in the same manner as described above.

Figure 25:
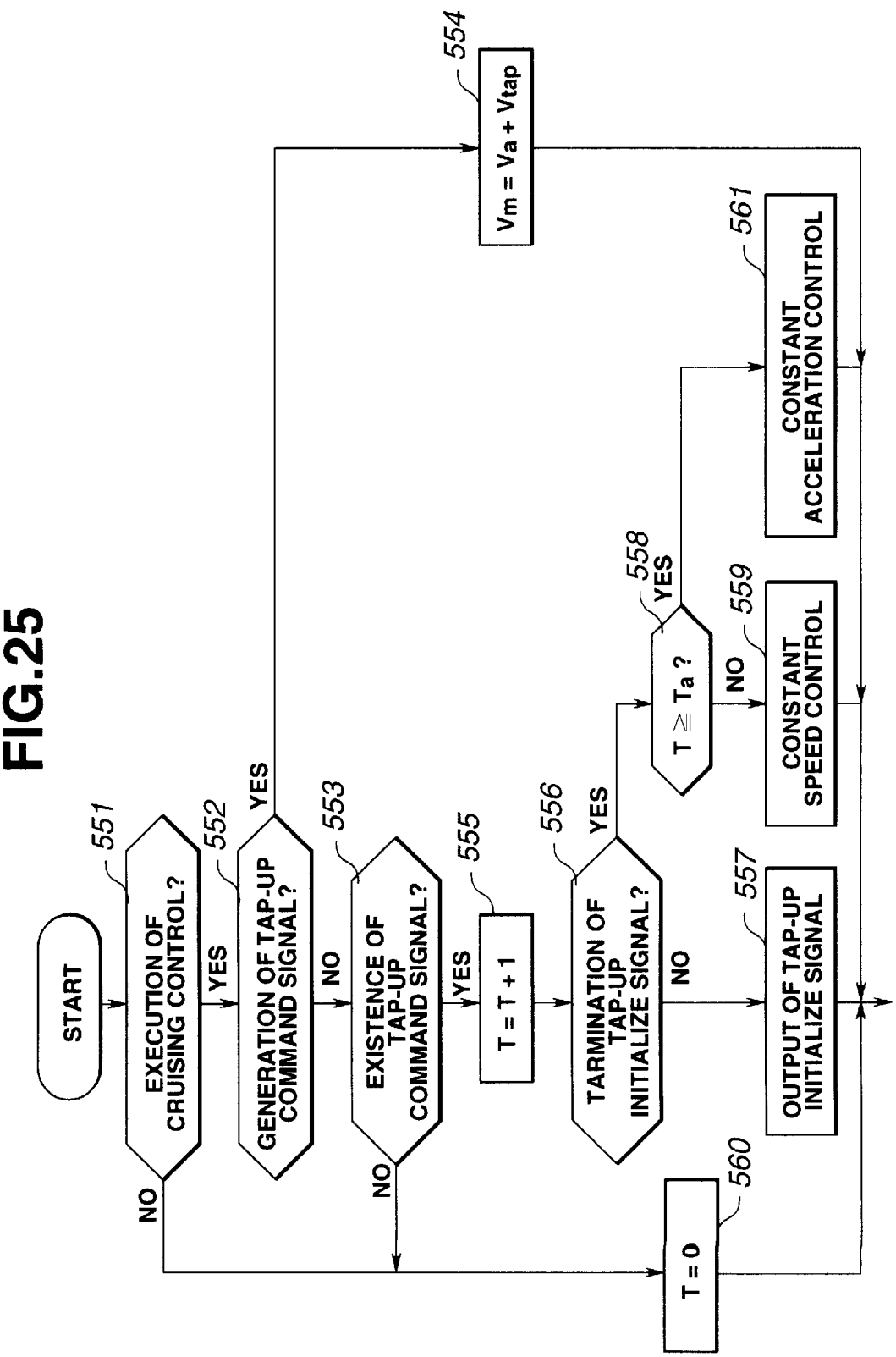
FIGS. 25 and 26 are flow charts illustrating the tap-up control and the tap-down control in the seventh embodiment of the cruising control apparatus according to this invention, respectively.

When the resume-acceleration switch 4 is operated during the cruising control, whereby the tap-up command signal is generated, the tap-up control means 28 in the microcomputer MCU of the controller 7 works and tap-up control is started as shown in FIG. 25.

In the first place, decision is done as to whether the cruising control is executed presently or not at step 551, if the cruising control is not executed at present (NO), control proceeds to the other control program.

When the cruising control is presently executed (YES), control proceeds to step 552 from the step 551 and decision is done at the step 552 as to whether or not the tap-up command signal is generated according to the on-operation of the resume-acceleration switch 4 by detecting a positive going edge of the signal generated from the resume-acceleration switch 4.

In a case where the resume-acceleration switch 4 is not yet operated and the tap-up command signal is not generated (NO), control proceeds to step 553 from the step 552 and decision is done at the step 553 as to whether the tap-up command signal exists or not at present. In this case, control returns to the start because the resume-acceleration switch 4 is not operated, so that the tap-up command signal is not yet generated, and decision at the steps 551, 552 and 553 is repeated until the resume-acceleration switch 4 is switched on.

When the resume-acceleration switch 4 is switched on, decision is done at the step 552 that the tap-up command signal is generated (YES) by detecting the positive going edge in the signal from the resume-acceleration switch 4, control proceeds to step 554 from the step 552 and the vehicle speed obtained by adding the predetermined tap-up speed $V_{tap}$ (for example, 1.6 km/h) to the actual vehicle speed $V_a$ is stored in the memory means 8 as a new target cruising speed at the step 554. Namely, a speed signal obtained by adding a speed signal corresponding to the tap-up speed $V_{tap}$ to the vehicle speed signal generated from the speed sensor 2 at the time of generation of the tap-up command signal is written to the memory means 8. After the renewal of the target cruising speed, control returns to the start.

In this time, the resume-acceleration switch 4 remains in the state of on-operation and tap-up command signal is maintained. Therefore, the decision is done to be "YES" at the step 551, the decision to be "NO" is done at the step 552 because the positive going edge in the signal form the resume-acceleration switch 4 is not detected and the decision is further done to be "YES" at the step 553. Control further proceeds to step 556 after increment of memory T in the timer means 32 at step 555.

At the step 556, decision is done as to whether the output of the tap-up initialize signal is finished or not. In this time, the tap-up initialize signal is not yet output (NO), therefore control proceeds to step 557 from the step 556 and the tap-up initialize signal calculated by the tap-up initialize calculation means 30 on basis of the actual vehicle speed at the time of switching on the resume-acceleration switch 4 is output at the step 557, thereby driving the actuator 6 in the acceleration direction of the vehicle. Control returns to the start.

Control proceeds to the step 553 through the steps 551, 552 and the decision is done again as to whether the tap-up command signal exists or not at the step 553. In a case where the on-operation of the resume-acceleration switch 4 is continued, the decision is done as to whether the output of the tap-up initialize signal is finished or not at the step 556 after the increment of the memory T in the timer means 32 at the step 555. If the output of the tap-up initialize signal is not finished, control proceeds to the step 557 and the output of the tap-up initialize signal is continued at the step 557.

When the output of the tap-up initialize signal is completed, control proceeds to step 558 from the step 556 and decision is done at the step 558 as to whether the memory T in the timer means 32 attains a predetermined value $T_a$ or not, that is a predetermined period elapses or not since the tap-up command signal is generated.

Control proceeds to step 559 from the step 558 because the duration time of the tap-up command signal does not attain the predetermined period in this time, output of the actuator driving signal according to the constant speed control is calculated so as to conform the actual vehicle speed $V_a$ with the target cruising speed $V_m$ renewed at the step 554 and the actuator driving signal according to the constant speed control (feedback control) is output at the step 559. The processing consisting of the steps 551, 552, 553, 555, 556, 558 and 559 is repeated until the resume-acceleration switch is switched off, or the memory T in the timer means 32 attains the predetermined value $T_a$.

When the resume-acceleration switch 4 is switched off and the tap-up command signal disappears, control proceeds to step 560 through the steps 551, 552 and 553 since the decision is done to be "NO" at the step 553 and returns to the start after clearing the memory T of the timer means 32 at the step 560.

In a case where the tap-up command signal is further continued without switching off the resume-acceleration switch 4, the actuator driving signal according to the constant speed control is output repeatedly at the step 559, whereby the feedback control against the target cruising speed $V_m$ is continued until the memory T of the timer means 32 attains the predetermined value $T_a$. When the duration time of the tap-up command signal attains the predetermined period, decision is done at the step 58 that the memory T of the timer means 32 attains the predetermined value $T_a$ (YES) and control proceeds to step 561. At the step 561, the actuator driving signal is output according to the constant acceleration control. Namely, the cruising control is shifted from the tap-up control into the acceleration control.

Figure 26:
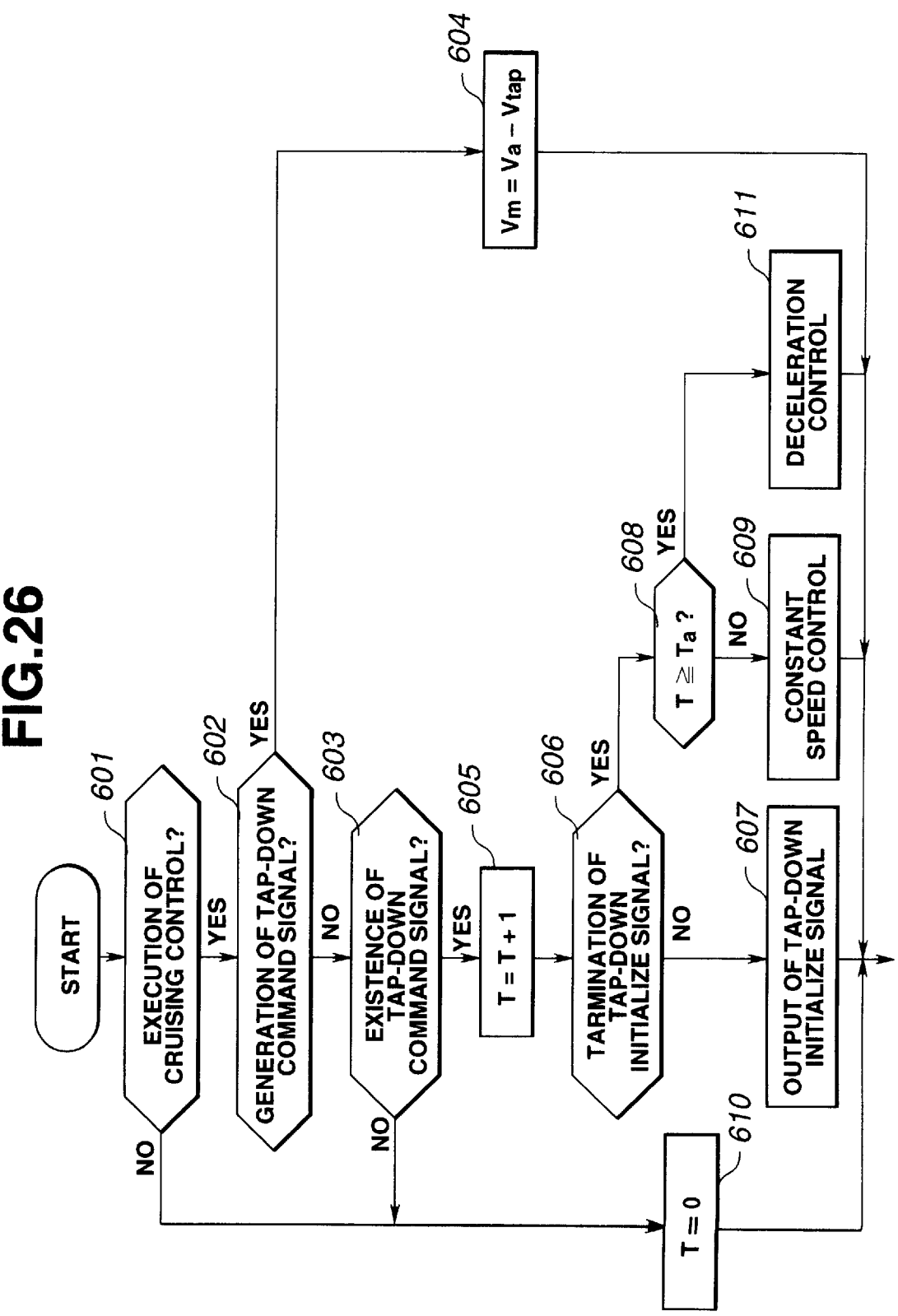

When the set-coast switch 3 is operated during the cruising control and the tap-down command signal is generated, the tap-down control means 29 in the microcomputer MCU of the controller 7 works, whereby tap-down control is started as shown in FIG. 26.

In a case where the cruising control is not executed, such as a case where the cruising control is not yet started, or the cruising control is cancelled even after the start of the cruising control, for example, and in a case where the set-coast switch 3 is not operated and the tap-down command signal is not yet generated, decision is done to be "NO" at respective steps 601, 602 and 603, and control proceeds to the other control program.

The aforementioned decision is repeated until the cruising control is started and the tap-down command signal is generated according to the on-operation of the set-coast switch 3.

When the set-coast switch 3 is switched on after the cruising control is started, control proceeds to step 604 from the step 602 and the vehicle speed obtained by subtracting the predetermined tap-down speed $T_{tap}$ (for example, 1.6 km/h) from the actual vehicle speed $V_a$ is stored in the memory means 8 as a new target cruising speed at the step 604. That is, a speed signal obtained by subtracting a speed signal corresponding to the tap-down speed $V_{tap}$ from the vehicle speed signal generated from the speed sensor 2 at the time of generation of the tap-down command signal is written into the memory means 8. After the renewal of the target cruising speed, control returns to the start.

In this time, control proceeds to step 605 after the decision at the step 601 (YES), the step 602 (NO) and the step 603 (YES), control further proceeds to step 606 after the increment of memory T of the timer means 32 at the step 605, and decision is done as to whether the output of the tap-down initialize signal is finished or not at the step 606.

Since the tap-down initialize signal is not yet output in this time (NO), control proceeds to step 607 from the step 606 and the tap-down initialize signal calculated by the tap-down initialize calculation means 31 on basis of the actual vehicle speed at the time of switching on the set-coast switch 3 is output at the step 607, thereby driving the actuator 6 in the deceleration direction of the vehicle.

After the output of the tap-down initialize signal, control returns to the start and further proceeds the step 603 through the steps 601, 602, and the decision is done again as to whether the tap-down command signal exists or not at the step 603. In the case where the on-operation of the set-coast switch 3 is continued, the decision is done as to whether the output of the tap-down initialize signal is finished or not at the step 606 after the increment of the memory T in the timer means 32 at the step 605. In a case the output of the tap-down initialize signal is completed (YES), control proceeds to step 608 form the step 606 and decision is done as to whether the memory T in the timer means 32 attains a predetermined value $T_a$ or not, that is the duration time of the tap-down command signal attains the predetermined period or not at the step 608.

Control proceeds to step 609 from the step 608 since the predetermined period does not yet elapse in this time, the output of the actuator driving signal according to the constant speed control is calculated so as to conform the actual vehicle speed $V_a$ with the target cruising speed $V_m$ renewed at the step 604, and the actuator driving signal according to the constant speed control is output (feedback control) at the step 609. The output of the actuator driving signal based on the constant speed control is repeated at the step 609 until the set-coast switch 3 is switched off or the memory T in the timer means 32 attains the predetermined value $T_a$.

When the set-coast switch 3 is switched off and the tap-down command signal disappears, control proceed to step 610 through the steps 601, 602 and 603 because the decision is done to be "NO" at the step 603 and control returns to the start after clearing the memory T of the timer means 32 at the step 560.

In a case where the predetermined period elapses since the tap-down command signal is generated without switching off the set-coast switch 3 and decision is done at the step 608 that the memory T in the timer means 32 attains the predetermined value $T_a$ (YES), control proceeds to step 611 and the actuator driving signal according to the deceleration control is output at the step 611. Namely, the cruising control is shifted from the tap-down control into the coast control by interrupting the base current to the second switching transistor TR2.

As mentioned above, in the cruising control apparatus according to the seventh embodiment of this invention, the tap-up control means 28 drives the actuator 6, after the output of the tap-up initialize signal, by generating the actuator driving signal according to the constant speed control until the tap-up command signal disappears or until the duration time of the tap-up command signal attains the predetermined period of time, and the tap-down control means 29 drives the actuator 6, after the output of the tap-down initialize signal, by generating the actuator driving signal according to the constant speed control until the tap-down command signal disappears or until the duration time of the tap-down command signal attains the predetermined period of time. Accordingly, it is possible to start the feedback control against the renewed target cruising speed immediately after the output of the tap-up initialize signal or the tap-down initialize signal even when the tap-up command signal or the tap-down command signal is still generated continuously, the difference between the actual vehicle speed and the target cruising speed is never enlarged even if the tap-up operation or the tap-down operation is done continuously and it is possible to speedily conform the actual vehicle speed with the target cruising speed.

[Embodiment 8]

The eighth embodiment of the cruising control apparatus according to this invention will be explained below with reference to FIG. 27.

The cruising control apparatus 1 according to the eighth embodiment of this invention is structured similarly to the cruising control apparatus shown in FIG. 1 as the first embodiment of this invention, and is also composed of the speed sensor 2, the set-coast switch 3, the resume-acceleration switch 4, the cancel switch 5, the actuator 6 and the controller 7.

The controller 7 is provided with the memory means 8, the calculation means 9, the speed increase means 10, the speed decrease means 11, the tap-up initialize calculation means 30 and the tap-up control means 28 in the microcomputer MCU thereof.

In this embodiment, the calculation means 9 compares the vehicle speed signal generated from the speed sensor 2 with the speed signal stored in the memory means 8 and generates the actuator driving signal corresponding to the difference between the both speed signals. In this time, the calculation means 9 is so designed as to generate the actuator driving signal according to constant speed control in a case where the actual vehicle speed is within a difference range predetermined against the target cruising speed, and generate the actuator driving signal according to constant acceleration control in a case where the actual vehicle speed falls below the aforementioned difference range predetermined against the target cruising speed.

The tap-up control means 28 in this embodiment is so designed as to renew the target cruising speed by adding the predetermined tap-up speed (1.6 km/h, for example) to the target speed presently stored in the memory means 8 in response to the tap-up command signal and drive the actuator 6 in the acceleration direction by outputting the tap-up initialize signal calculated by the tap-up initialize calculation means 30 in the case where the actual vehicle speed is within the difference range predetermined against the renewed target cruising speed, but so designed as to renew the target cruising speed without outputting the tap-up initialize signal in the case where the actual vehicle speed falls below the difference range predetermined against the renewed target cruising speed.

In the cruising control apparatus 1, when the set-coast switch 3 is switched off after the on-operation while the vehicle is running at the speed desired to cruise automatically, the cruising control is started in the same manner as described above.

The controller 7 compares the vehicle speed signal generated from the speed sensor 2 with the speed signal stored in the memory means 8, performs calculation according to the predetermined computing equation on basis of the difference between the both speed signals and the acceleration obtained from the change rate of the vehicle speed signal through the calculation means 9, and controls the vehicle speed so as to coincide with the target cruising speed by generating the actuator driving signal corresponding to the result of calculation.

In this time, when the actual vehicle speed is within a predetermined difference range set on the higher and lower sides of the target cruising speed, that is the range of the target cruising speed $V_m \pm$predetermined difference $V_d$ (5 km/h in this embodiment), the calculation means 9 generates the actuator driving signal according to the constant speed control, which is the feedback control for controlling the vehicle speed so as to conform the actual vehicle speed with the target cruising speed in itself. On the other hand, if the actual vehicle speed falls below the predetermined difference range against the target cruising speed, that is the actual vehicle speed falls below the speed obtained by subtracting the predetermined difference $V_d$ from the target cruising speed $V_m$ stored in the memory means 8, for example in a case where the vehicle enters into the uphill road or so, the calculation means 9 generates the actuator driving signal according to the constant acceleration control in order to speedily conform the actual vehicle speed with the target cruising speed. Namely, the vehicle speed is controlled so as to conform the actual acceleration of the vehicle with the objective acceleration obtained in accordance with the present vehicle speed and the target cruising speed stored in the memory means 8.

Figure 27:
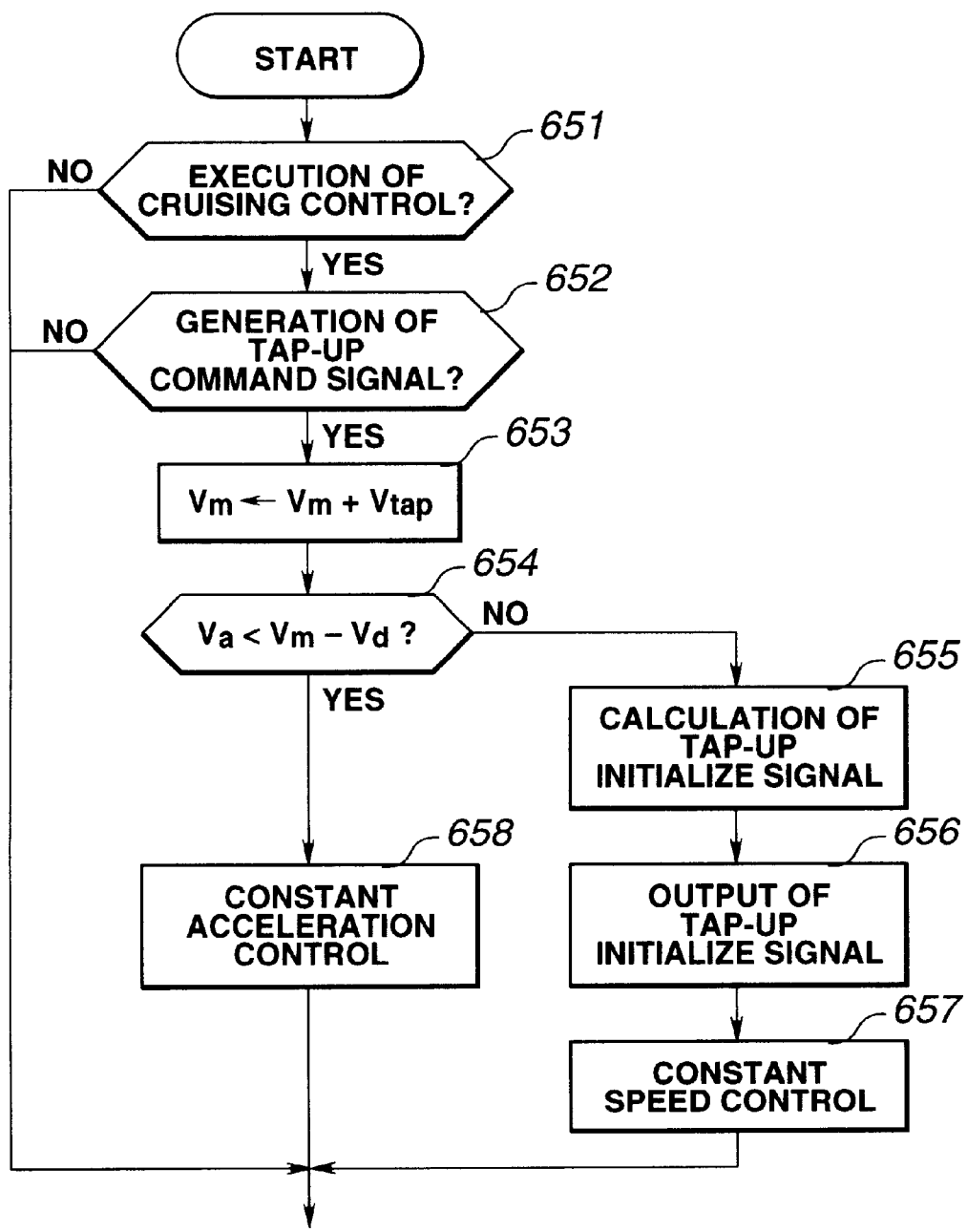
FIG. 27 is a flow chart illustrating the tap-up control in the eighth embodiment of the cruising control apparatus according to this invention.

When the tap-up command signal is generated according to the operation of the resume-acceleration switch 4 during the cruising control, the tap-up control means 28 in the microcomputer MCU of the controller 7 works and the tap-up control is started as shown in FIG. 27.

In the first place, decision is done as to whether the cruising control is executed or not at present at the step 651, control proceeds to the other control program if the cruising control is not presently executed (NO).

When the cruising control is executed (YES), control proceed to step 652 form the step 651 and decision is done as to whether or not the tap-up command signal is generated according to the operation of the resume-acceleration switch 4 at the step 652. If the resume-acceleration switch 4 is not yet operated and the tap-up command signal is not generated (NO), control returns to the start after executing the other control program and the processing of the steps 651 and 652 is repeated until the tap-up command signal is generated by switching the resume-acceleration switch 4.

When the tap-up command signal is generated according to the operation of the resume-acceleration switch 4, the decision is done to be "YES" at the step 652, control proceed to step 653 from the step 652 and the vehicle speed obtained by adding the predetermined tap-up speed $V_{tap}$ to the target cruising speed $V_m$ (strong vehicle speed) at the time of generation of the tap-up command signal is stored in the memory means 8 as a new target cruising speed $V_m$ at the step 653. Namely, the speed signal stored in the memory means 8 as the target cruising speed $V_m$ is renewed by a speed signal obtained by adding a speed signal corresponding to the tap-up speed $V_{tap}$ to the aforementioned stored speed signal.

Control proceeds to step 654 from the step 653, and decision is done at the step 654 as to whether the actual vehicle speed $V_a$ is lower or not than value $(V_m-V_d)$ obtained by subtracting the predetermined difference $V_d$ from the target cruising speed $V_m$ renewed at the step 653, that is whether or not the actual vehicle speed $V_a$ is in a constant acceleration control area situated on the further lower side of a constant speed control area $(V_m \pm V_d)$ set on the higher and lower sides of the target cruising speed $V_m$.

In a case where the actual vehicle speed $V_a$ is in the constant speed control area in the vicinity of the target cruising speed $V_m$ and the decision is done at the step 654 that the actual vehicle speed $V_a$ is not less than $(V_m-V_d)$, control proceeds to step 655 and output of the tap-up initialize signal corresponding to the actual vehicle speed $V_a$ is calculated from a data map stored in ROM of the microcomputer MCU by the tap-up initialize calculation means 30 at the step 655. Control proceeds to step 656 and step 657, the actuator driving signal according to the tap-up initialize signal obtained at the step 655 is output at the step 656 and the constant speed control is executed so as to conform the actual vehicle speed $V_a$ with the target cruising speed $V_m$ at the step 657.

On the other side, in a case where the actual vehicle speed $V_a$ is in the constant acceleration control area situated on the lower side of the constant speed control area $(V_m \pm V_d)$, and the decision is done at the step 654 that the actual vehicle speed $V_a$ is less than $(V_m-V_d)$, control proceeds to step 658 without outputting the tap-up initialize signal and the constant acceleration control is executed at the step 568 in order to speedily recover the actual vehicle speed $V_a$ into a speed within the constant speed control area $(V_m \pm V_d)$ by controlling the vehicle speed so as to conform the actual acceleration of the vehicle with the objective acceleration calculated from another data map stored in ROM of the microcomputer MCU on basis of the actual vehicle speed $V_a$.

As described above, in the cruising control apparatus according to the eighth embodiment of this invention, the tap-up initialize signal is output in the case where the actual vehicle speed $V_a$ is within the predetermined difference range $(V_m \pm V_d)$ situated on the higher and lower sides of the target cruising speed $V_m$ so that the actuator driving signal is generated according to the constant speed control. On the other hand, in the case where the actual vehicle speed $V_a$ falls below the above-mentioned difference range ($V_m \pm V_d$) situated against the target cruising speed $V_m$ so that the actuator driving signal is generated according to the constant acceleration control, the tap-up initialize signal is never output even if the tap-up command signal is generated form the resume-acceleration switch 4. Therefore, it is possible to disolve a shock and a sense of incompatibility caused by abrupt acceleration of the vehicle even when the difference between the actual vehicle speed $V_a$ and the target cruising speed $V_m$ becomes larger remarkably by the continuous switching operation.

[Embodiment 9]

An explanation will be given below about a cruising control apparatus according to the ninth embodiment of this invention with reference to FIG. 28 to FIG. 30.

The cruising control apparatus 1 according to the ninth embodiment of this invention has the structure similar to the cruising control apparatus shown in FIG. 1 as the first embodiment of this invention basically, and is composed of the speed sensor 2, the set-coast switch 3, the resume-acceleration switch 4, the cancel switch 5, the actuator 6 and the controller 7.

The controller 7 includes the microcomputer MCU, and is provided with the memory means 8, the calculation means 9, the speed increase means 10, the speed decrease means 11, the tap-down control means 29, the tap-down initialize calculation means 31, an acceleration-off calculation means 33 and an acceleration control means 34 in the microcomputer MCU.

The calculation means 9 compares the vehicle speed signal generated form the speed sensor 2 with the speed signal stored in the memory means 8 as the target cruising speed, and is so designed as to generate the actuator driving signal according to constant speed control in a case where the actual vehicle speed is within a difference range predetermined against the target cruising speed and to generate the actuator driving signal according to constant acceleration control in a case where the actual vehicle speed falls below the aforementioned difference range predetermined against the target cruising speed.

The acceleration-off calculation means 33 calculates output of an acceleration-off signal from a data map stored in the microcomputer MCU on basis of the vehicle signal generated from the speed sensor 2 at the time of generation of the acceleration command signal.

The acceleration control means 34 drives the actuator 6 in the acceleration direction by outputting the actuator driving signal according to the constant acceleration control in response to the generation of the acceleration command signal, and renews the target cruising speed by storing the vehicle speed signal generated from the speed sensor 2 at the time of disappearance of the acceleration command signal in the memory means 8 and drives the actuator 6 in the deceleration direction by outputting the acceleration-off signal calculated in the acceleration-off calculation means 33 in response to the disappearance of the acceleration command signal.

The tap-down control means 29 in this embodiment renews the target cruising speed by storing a speed signal obtained by subtracting a signal corresponding to a predetermined tap-down speed (for example, 1.6 km/h) from the vehicle speed signal generated from the speed sensor 2 at the time of generation of the tap-down command signal in the memory means 8 in response to the generation of the tap-down command signal, and drives the actuator 6 in the deceleration direction by outputting the tap-down initialize signal calculated in the tap-down initialize calculation means 31 when the tap-down command signal is generated during the constant speed control and drives the actuator 6 in the deceleration direction by outputting the total signal of the tap-down initialize signal calculated by the tap-down initialize calculation means 31 and the acceleration-off signal calculated by the acceleration-off calculation means 33 on basis of the actual vehicle speed at the time of the generation of the tap-down command signal if the tap-down command signal is generated during the constant acceleration control.

In the cruising control apparatus 1, when the set-coast switch 3 is operated while the vehicle is running at the desired speed, the cruise command signal is generated whereby the cruising control is started in the same manner as described above.

The controller 7 compares the vehicle speed signal generated from the speed sensor 2 with the speed signal stored in the memory means 8 as the target cruising speed $V_m$, performs calculation according to the predetermined computing equation on basis of the difference between the both speed signals and the acceleration of the vehicle obtained from the change rate of the vehicle speed signal in the calculation means 9, and controls the vehicle speed so as to conform the actual vehicle speed with the target cruising speed in itself by generating the actuator driving signal corresponding to the result of the calculation according to the constant speed control at the time when the actual vehicle speed $V_a$ does not deviate from the target cruising speed $V_m$ stored in the memory means 8 so much.

However, in a case where the vehicle is decelerated in, for example, a uphill road or so and the difference between the actual vehicle speed $V_a$ and the target cruising speed $V_m$ becomes larger than a predetermined value $V_d$ (5 km/h in this embodiment), the controller 7 generates the actuator driving signal according to the constant acceleration control through the calculation means 9 in order to speedily increase the actual vehicle speed $V_a$ up to the target cruising speed $V_m$. Namely, the controller 7 accelerates the vehicle by controlling the vehicle speed so as to conform the actual acceleration of the vehicle with the objective acceleration calculated in accordance with the present actual vehicle speed $V_a$ and the target cruising speed $V_m$ presently stored in the memory means 8.

Contrary to this, in a case where the vehicle is accelerated in, for example, a downhill road or so and the difference between the actual vehicle speed $V_a$ and the target cruising speed $V_m$ exceeds the predetermined value $V_d$, deceleration control is carried out, that is power supply to the actuator 6 is cut off by interrupting the base current to the second switching transistor TR2, so that the throttle valve of the vehicle is driven in the closing direction.

Figure 28:
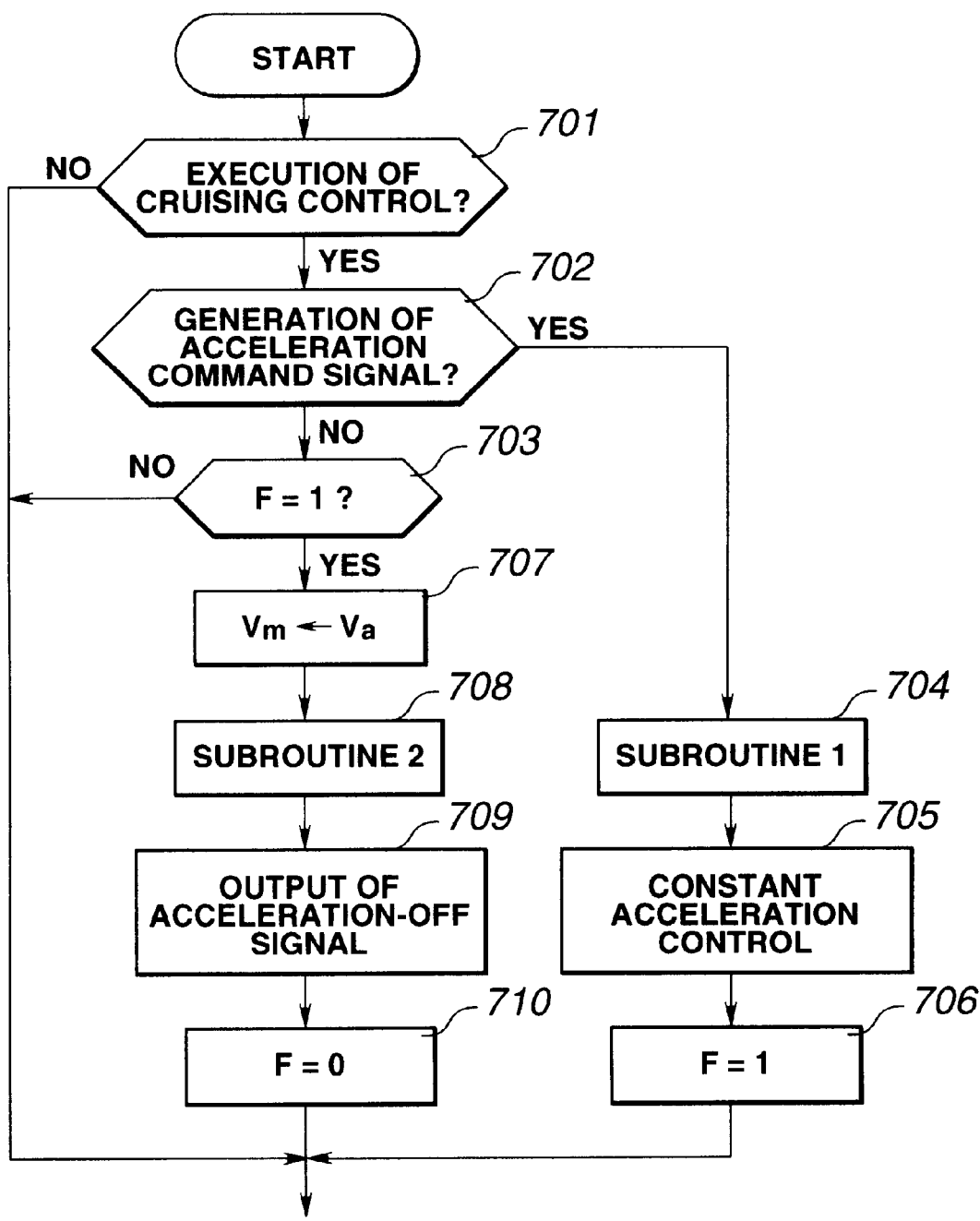
FIGS. 28 and 29 are flow charts illustrating the acceleration control and the tap-down control in the ninth embodiment of the cruising control apparatus according to this invention, respectively.

When the acceleration command signal is generated according to the operation of the resume-acceleration switch 4 during the cruising control, the acceleration control means 34 in the microcomputer MCU of the controller 7 works and the acceleration control is started as shown in FIG. 28.

First of al, decision is done as to whether the cruising control is executed at present or not at the step 701, control proceeds to the other control program when the cruising control is not presently executed (NO).

In a case the cruising control is executed at present (YES), control proceeds to step 702 form the step 701 and decision is done as to whether the acceleration command signal is generated or not according to the on-operation of the resume-acceleration switch 4 at the step 702. When the resume-acceleration switch 4 is not yet operated and the acceleration command signal is not generated (NO), control proceeds to step 703 and decision is done as to whether flag F is set or not at the step 703 and control returns to the start from the step 703 because the resume-acceleration switch 4 is not yet operated and the flag F is not set (NO). The processing of the steps 701 to 703 is repeated until the resume-acceleration switch 4 is switched on.

Figure 30C:
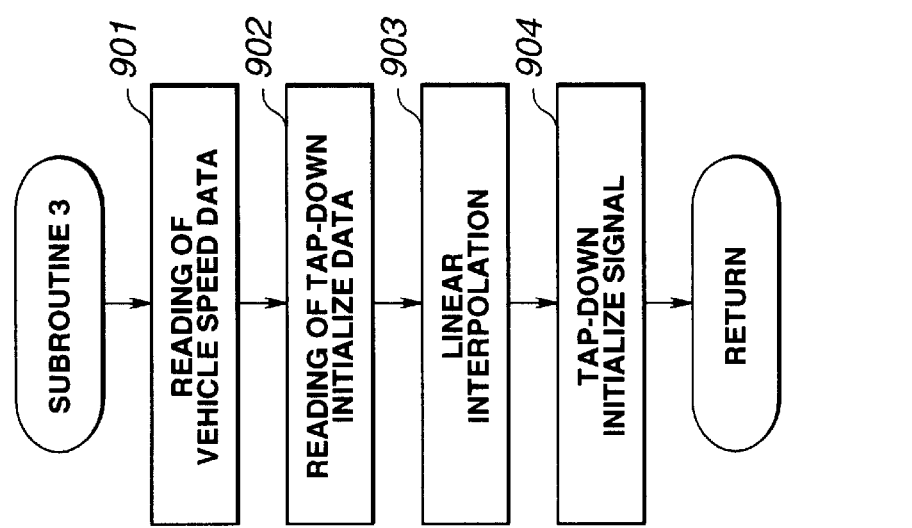
FIG. 30C is a flow chart illustrating the subroutine for obtaining output of the tap-down initialize signal shown in FIG. 29.
Figure 30B:
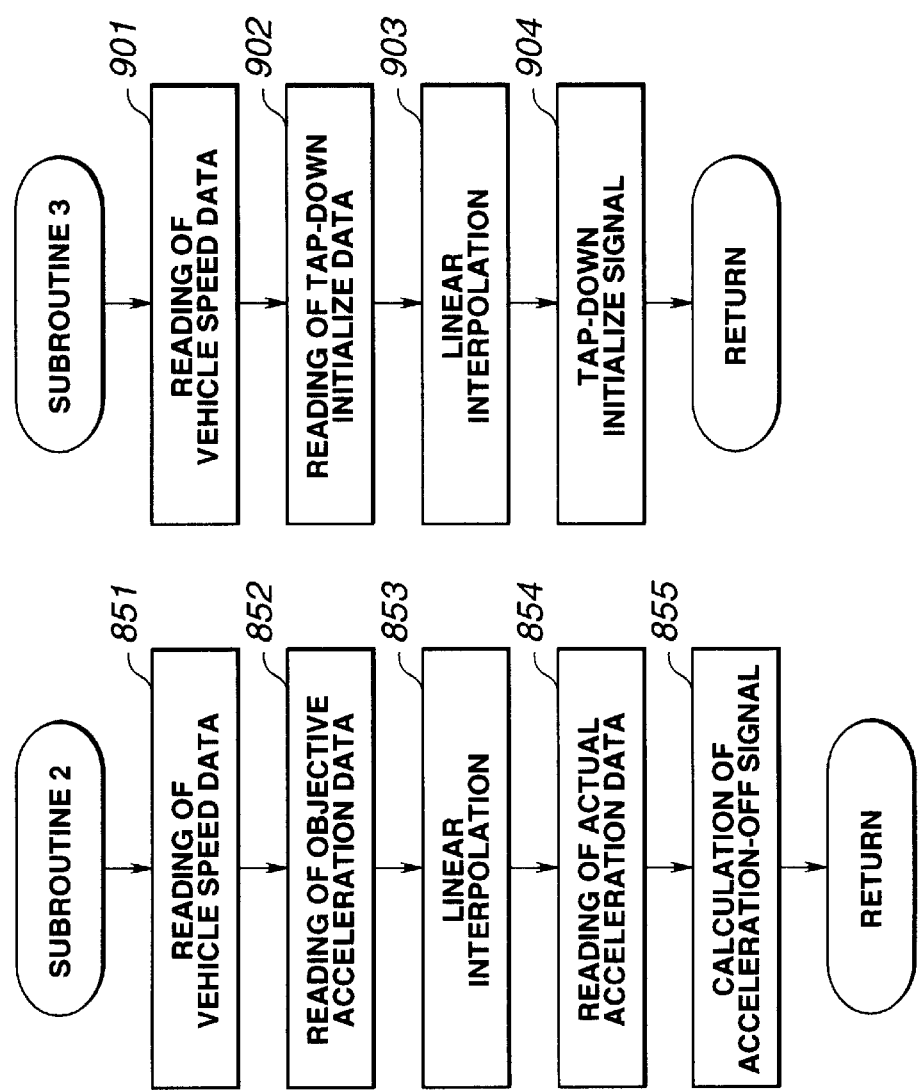
FIG. 30B is a flow chart illustrating the subroutine for obtaining output of the acceleration-off signal shown in FIGS. 28 and 29.
Figure 30A:
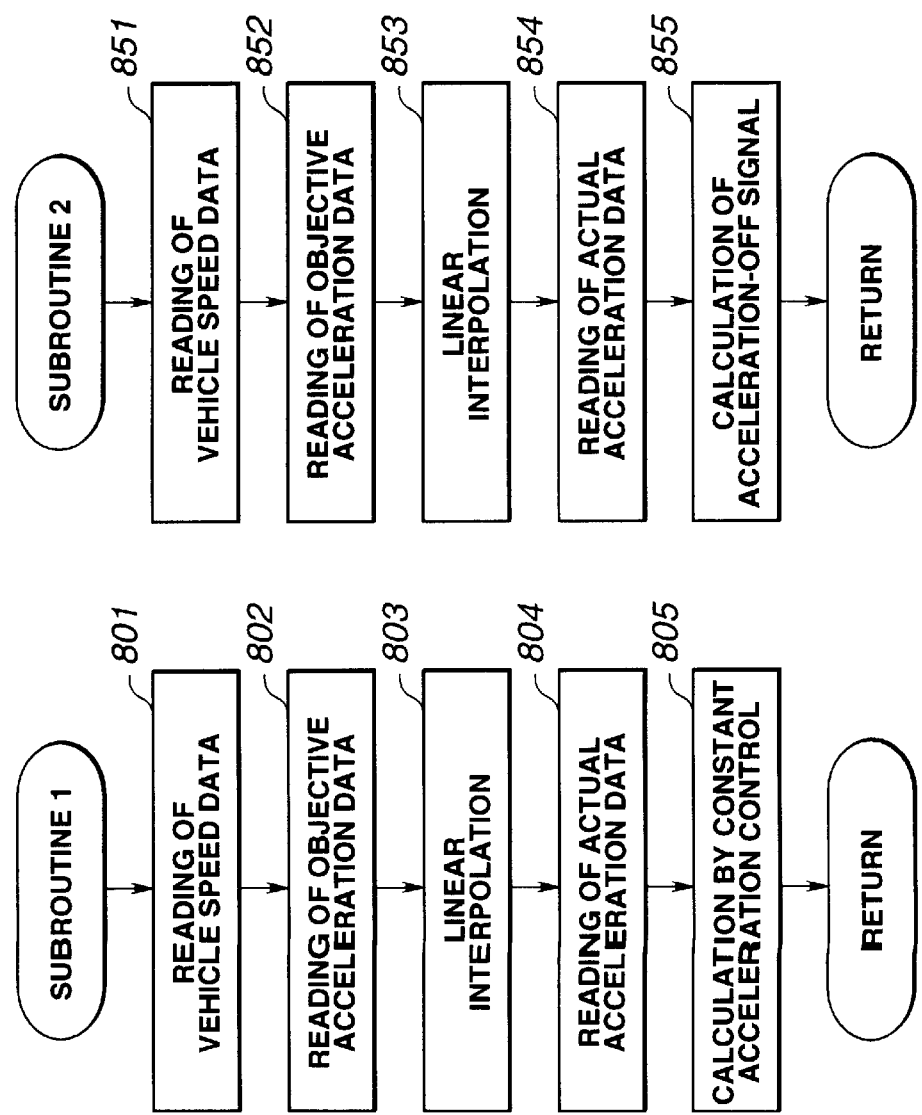
FIG. 30A is a flow chart illustrating the subroutine for the constant acceleration control shown in FIGS. 28 and 29.

When the resume-acceleration switch 4 is switched on and the decision is done at the step 702 that the acceleration command signal is generated (YES), control proceeds to subroutine 1 shown in FIG. 30A at step 104 and output of the actuator driving signal is calculated according to the constant acceleration control as shown is FIG. 30A. The actuator driving signal calculated according to the constant acceleration control in the subroutine 1 is output at step 705, whereby the throttle valve is opened through the actuator 6 by turning on the third and fourth switching transistors TR3 and TR4, and the acceleration control is performed according to the constant acceleration control. Control returns to the start after setting the flag F at step 706.

In the subroutine 1 shown in FIG. 30A, vehicle speed data are read on basis of the vehicle speed signal generated from the speed sensor 2 at step 801, objective acceleration data corresponding to vehicle speed close enough to the actual vehicle speed $V_a$ obtained at the step 801 are read from a data map stored in the microcomputer MCU at step 802, and the objective acceleration corresponding to the present actual vehicle speed $V_a$ is obtained at step 803 through linear interpolation of the objective acceleration data read at the step 802. Further, actual acceleration data of the vehicle is read at step 804 and the output of the actuator driving signal is calculated at step 805 so as to conform the actual acceleration of the vehicle with the objective acceleration obtained at the steps 802 and 803. The constant acceleration control is repeated until the acceleration command signal is extinguished by switching off the resume-acceleration switch 4 whereby the vehicle is accelerated and the actual vehicle speed continues to increase gradually during the on-operation of the resume-acceleration switch 4.

When the resume-acceleration switch 4 is switched off and the decision os done at the step 702 that the acceleration command signal disappears (NO), control proceeds to the step 703 and further proceeds to step 707 from the step 703 because the constant cruising control is already done according to the acceleration command signal and the flag F is set at the step 706. At the step 707, the target cruising speed $V_m$ is renewed by the present actual vehicle speed $V_a$, that is the vehicle speed at the time of switching of the resume-acceleration switch 4. Control proceeds to subroutine 2 shown in FIG. 30B at step 708 from the step 707, the output of the acceleration-off signal is calculated by the acceleration-off calculation means 33 in the microcomputer MCU as shown in FIG. 30B and the actuator driving signal is output at step 709 according to the result of the calculation in the subroutine 2. The actuator 6 moves the throttle valve in the closing direction, thereby promoting the agreement of the actual vehicle speed $V_a$ with the target cruising speed $V_m$ renewed at the step 707.

In the subroutine 2 shown in FIG. 30B, the vehicle speed data are read at step 851 on basis of the vehicle speed signal generated from the speed sensor 2, the objective acceleration data corresponding to vehicle speed close enough to the actual vehicle speed $V_a$ obtained at the step 851 are read from the data map stored in the microcomputer MCU similarly to the case of the subroutine 1 at step 852, and the objective acceleration corresponding to the actual vehicle speed $V_a$ is obtained at step 853 through the linear interpolation of the objective acceleration data read at the step 852. Furthermore, the actual acceleration data of the vehicle is read at step 854 and the output of the acceleration-off signal is calculated at step 855 in accordance with the actual acceleration data read at the step 854 and the objective acceleration obtained at the steps 852 and 853.

Figure 29:
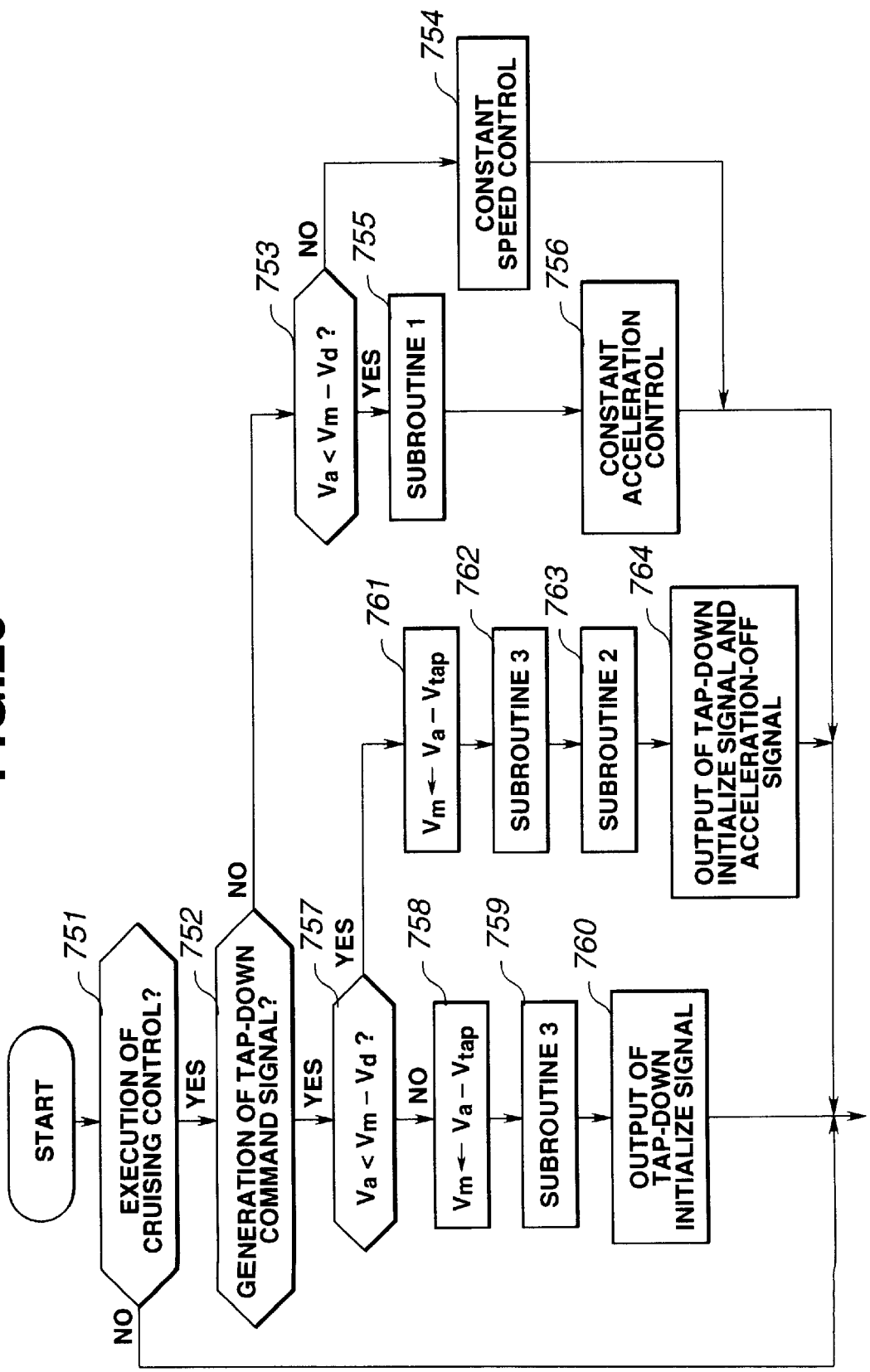

When the tap-down command signal is generated according to the operation of the set-coast switch 3 during the cruising control, the tap-down control means 29 in the microcomputer MCU of the controller 7 works and the tap-down control is started as shown in FIG. 29.

Namely, decision is done as to whether the cruising control is presently executed or not at step 751, control proceeds to the other control program if the cruising control is not executed at present (NO).

When the cruising control executed (YES), control proceeds to step 752 from the step 751, decision is done as to whether or not the tap-down command signal is generated according to the operation of the set-coast switch 3, and control proceeds to step 753 from the step 752 in a case where the set-coast switch 3 is not yet operated and the tap-down command signal is not generated. At the step 753, decision is done as to whether or not the actual vehicle speed $V_a$ is less than a speed $(V_m-V_d)$ obtained by subtracting the predetermined value $V_d$ from the target cruising speed $V_m$, control proceeds to step 754 from the step 753 and the constant speed control is executed at the step 754 so as to conform the actual vehicle speed $V_a$ with the target cruising speed $V_m$ in a case where the actual vehicle speed $V_a$ is not less than the speed $(V_m-V_d)$, that is the actual vehicle speed $V_a$ is within a range of predetermined difference $V_d$ against the target cruising speed $V_m$ stored in the memory means 8.

In a case where the decision is done at the step 753 that the actual vehicle speed $V_a$ is less than the speed $(V_m-V_d)$, that is the actual vehicle speed $V_a$ falls below the out of range of difference $V_d$ against the target cruising speed $V_m$, control proceeds to subroutine 1 at step 755, the output of the actuator driving signal is similarly calculated according to the constant acceleration control in the subroutine 1 shown in FIG. 30A, and the actuator driving signal is output at step 756 according to the result of the calculation in the subroutine 1, whereby the constant acceleration control is performed in order to speedily recover the actual vehicle speed $V_a$ in the aforementioned difference range situated against the target cruising speed $V_m$.

When the set-coast switch 3 is operated, control proceeds to step 757 after the decision at the step 752 that the tap-down command signal is generated (YES) and decision is done at step 757 similarly to the decision at the step 753.

In a case where the actual vehicle speed $V_a$ is within the range of the predetermined difference $V_d$ from the target cruising speed $V_m$ (NO), control proceeds to step 758 and the vehicle speed obtained by subtracting the predetermined tap-down speed $V_{tap}$ from the actual vehicle speed $V_a$ is stored in the memory means 8 as a new target cruising speed $V_m$. Namely, the signal obtained by subtracting the signal corresponding to the predetermined tap-down speed $V_{tap}$ from the vehicle speed signal from the speed sensor 2 in written in the memory means 8. Control proceeds to subroutine 3 shown in FIG. 30C at step 759 and output of the tap-down initialize signal is obtained by the tap-down initialize calculation means 31 in the microcomputer MCU in the subroutine 3. The actuator driving signal is output at step 760 in accordance with the tap-down initialize obtained in the subroutine 3, whereby the throttle valve of the vehicle is moved in the closing direction and the actual vehicle speed $V_a$ agrees with the target cruising speed $V_m$ renewed at the step 758 by subtracting the tap-down speed $V_{tap}$ from the actual vehicle speed $V_a$ at the time of operating the set-coast switch 3 very speedily.

In the subroutine 3 shown in FIG. 30C, the vehicle speed data are read at step 901 on basis of the vehicle speed signal generated from the speed sensor 2, tap-down initialize data corresponding to vehicle speed close enough to the actual vehicle speed $V_a$ detected at the step 901 are read from a data map stored in the microcomputer MCU at step 902, and the output of the tap-down initialize signal is obtained at step 904 through the linear interpolation at step 904 using the tap-down initialize data read at the step 902.

In a case where the actual vehicle speed $V_a$ falls below the range of the predetermined difference $V_d$ from the target cruising speed $V_m$ and the decision is done at the step 757 that the actual vehicle speed $V_a$ is less than the speed ($V_m$–$V_d$), control proceeds to step 761 and the vehicle speed obtained by subtracting the predetermined tap-down speed $V_{tap}$ from the actual vehicle speed $V_a$ is stored in the memory means 8 is the new target cruising speed $V_m$ at the step 761.

Furthermore, control proceeds to the subroutine 3 at step 762 and the subroutine 2 at step 763, the output of the tap-down initialize signal and the acceleration-off signal in the same manner as described above at the steps 762 and 763, respectively, and the actuator driving signal obtained by totaling the tap-down initialize signal obtained in the subroutine 3 and the acceleration-off signal obtained in the subroutine 2 is output at step 764.

According to the output of the actuator driving signal, the throttle valve is moved in the closing direction through the actuator 6, and actual vehicle speed $V_a$ agrees with the new target cruising speed $V_m$ renewed at the step 761 very speedily in spite of the tap-down operation during the constant acceleration control because the tap-down initialize signal and the acceleration-off signal are totaled and the actuator driving signal is output for a long time.

[Embodiment 10]

The tenth embodiment of the cruising control apparatus according to this invention will be explained below with reference to FIG. 31 to FIG. 33.

The cruising control apparatus 1 according to the tenth embodiment of this invention is also structured similarly to the cruising control apparatus shown in FIG. 1 as the first embodiment of this invention basically, and is composed of the speed sensor 2, the st-coast switch 3, the resume-acceleration switch 4, the cancel switch 5, the actuator 6 and the controller 7.

The controller 7 includes the microcomputer MCU, and is provided with the memory means 8, the calculation means 9, the speed increase means 10, the speed decrease means 11, the timer means 32, a set initialize calculation means 35, a regulative initialize calculation means 36 and a coast control means 37 in the microcomputer MCU.

The timer means 32 in this embodiment counts duration time of the coast command signal.

The set initialize calculation means 35 calculates output of the set initialize signal corresponding to the actual vehicle speed at the time of disappearance of the cruise command signal and the coast command signal. The regulative initialize calculation means 36 calculates output of a regulative initialize signal increasing in proportional to a period obtained by subtracting a predetermined period from the duration time of the coast command signal obtained by the timer means 32.

The coast control means 37 has a function to drive the actuator 6 in the deceleration direction by outputting the actuator driving signal according to the deceleration control in response to generation of the coast command signal. On the other side, when the coast command signal disappears, the coast control means 37 renews the target cruising speed by storing the vehicle speed signal generated from the speed sensor 2 at the time of disappearance of the coast command signal in the memory means 8 and drives the actuator 6 in the acceleration direction by outputting a smaller signal as a coast initialize signal between the regualtive initialize signal calculated by the regulative initialize calculation means 36 and the set initialize signal calculated by the set initialize calculation means 35 according to the actual vehicle speed at the time of disappearance of the coast command signal in a case where the duration time of the coast command signal counted by the timer means 32 is longer than a predetermined period of time. Furthermore, the coast control means 37 renews the target cruising speed without outputting the coast initialize signal in a case where the duration time of the coast command signal is not longer than the predetermined period of time.

In the cruising control apparatus 1, the cruising control is started in the same manner as described in the embodiments by operating the set-coast switch 4 at the time when the vehicle starts and the vehicle speed becomes suitable to cruise automatically.

Figure 32:
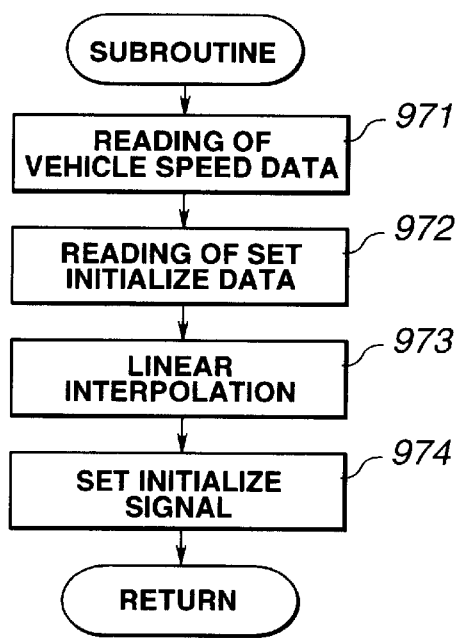
FIG. 32 is a flow chart illustrating the subroutine for obtaining output of the set initialize signal shown in FIG. 31.

Namely, the controller 7 writes the vehicle speed signal generated from the speed sensor 2 at the time of switching off the set-coast switch 3 into the memory means 8 in the microcomputer MCU as a target cruising speed in response to the cruise command signal generated from the set-coast switch 3, obtains the output of the set initialize signal corresponding to the vehicle speed at the time of switching off the set-coast switch 3 by the set initialize calculation means 35 through the subroutine shown in FIG. 32 and controls vehicle speed so as to conform the vehicle speed signal generated from the speed sensor 2 with the vehicle signal stored in the memory means 8 as the target cruising speed after adjusting the actuator 6 with the throttle valve position by driving the actuator 6 in the acceleration direction with the actuator driving signal according to the obtained set initialize signal.

Figure 31:
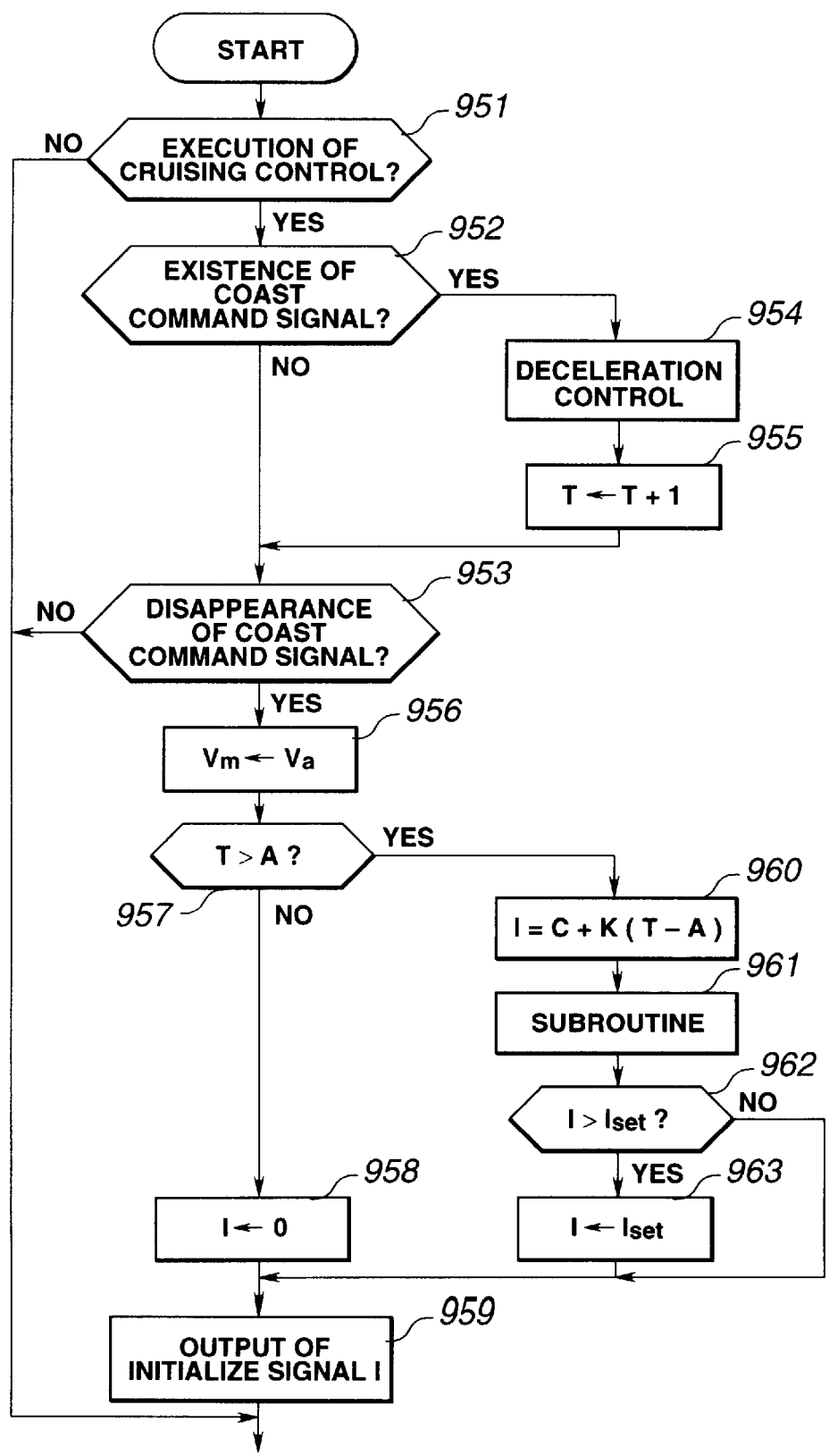
FIG. 31 is a flow chart illustrating the coast control in the tenth embodiment of the cruising control apparatus according to this invention.

When the coast command signal is generated in response to the operation of the set-coast switch 3 during the cruising control, the coast control means 37 in the microcomputer MCU of the controller 7 works and the coast control is started as shown in FIG. 31.

At the beginning, decision is done as to whether the cruising control is presently executed or not at step 951, if the cruising control is not executed at present (NO), control proceeds to the other control program.

When the cruising control is presently done (YES), control proceeds step 952 from the step 951, decision is done at the step 952 as to whether the coast command signal is generated or not according to the on-operation of the set-coast switch 3, and control proceeds to step 953 from the step 952 when the set-coast switch 3 is not yet operated and the coast command signal is not generated (NO). At the step 953, decision is done as to whether the coast command signal disappears or not by detecting a negative going edge in the signal generated from the set-coast switch 3. Control returns to the start from the step 953 because the set-coast switch 3 is not yet operated in this time and the edge in the signal is not detected, therefore the processing of the steps 951 to 953 is repeated until the set-coast switch 3 is switched on.

When the set-coast switch 3 is switched on and the decision is done at the step 952 that the coast command signal is generated (YES), control proceeds to step 954 and the deceleration control is executed at the step 954. Namely, the throttle valve of the vehicle is moved in the closing direction through the actuator 6 by interrupting the base current to the second switching transistor TR2 in the controller 7.

After increment of memory T of the timer means 32 at the successive step 955, control proceeds to the decision at the step 953. When the negative going edge of the signal is not detected, that is the coast command signal is maintained owing to continuation of the on-operation of the set-coast switch 3 (NO), control returns to the start and the processing of the steps 951,952,954 and 955 is repeated until the coast command signal is extinguished by switching off the set-coast switch 3.

When the negative going edge of the signal is detected by switching off the set-coast switch 3 and the decision is done at the step 953 that the coast command signal disappears, control proceeds to step 956 and the target cruising speed $V_m$ is renewed with the present vehicle speed $V_a$, that is the vehicle speed at the time of disappearance of the coast command signal according to the off-operation of the set-coast switch 3 at the step 956.

Control further proceeds to step 957, and decision is done at the step 957 as to whether the memory T of the timer means 32 (duration time of the coast command signal) is longer than the predetermined period of time A or not, that is whether time required for the throttle valve to start in the closing direction in response to decelerative driving of the actuator 6 elapses or not. The period of time A can be obtained according to the property of the respective actuator 6 used in the cruising control apparatus 1 in advance.

In a case where the duration time T of the coast command signal is not longer than the period of time A (NO), that is a case where the duration time T of the signal is short and the throttle valve is not yet scarcely moved from the position at the time of generation of the coast command signal, therefore the deceleration control is not substantially started, control proceeds to step 958 from the step 957 and the output I of the coast initialize signal is determined into 0 (zero) at the step 958. The coast initialize signal with the output I of zero is generated at step 959, namely, the coast initialize signal is not output.

In a case where the duration time T of the coast command signal exceeds the period of time A (YES), control proceeds to step 960 from the step 957 and the output I of the regulative initialize signal is calculated the formula I=C+K (T−A) at the step 957.

In the aforementioned formula, C is a constant predetermined according to the property the respective actuator 6 to be incorporated into the cruising control apparatus 1 and corresponds to an amount of movement of the actuator 6 required for the throttle valve to start the response. K is a coefficient to be selected so that the calculated output I may accord with output Iset of the set initialize signal at the time when the time required for the throttle valve to arrive the full-closed position expires after the generation of the coast command signal, and read out from a data map stored in ROM of the microcomputer MCU according to the vehicle speed at the time of generation and disappearance of the coast command signal.

After the calculation of the output I of the regulative initialize signal at the step 960, control proceeds to the subroutine shown in FIG. 32 at step 961 and the output Iset of the set initialize signal is calculated at the step 961 in the set initialize calculation means 35.

In the subroutine shown in FIG. 32, vehicle speed data are read according to the vehicle speed signal generated from the speed sensor 2 first of all at step 971. Control proceeds to step 972 and set initialize data corresponding to vehicle speed close enough to the actual vehicle speed $V_a$ obtained at the step 971 are read from a data map stored in the microcomputer MCU at the step 972. The output Iset of the set initialize signal corresponding to the present vehicle speed, that is the actual vehicle speed $V_a$ at the time of disappearance of the coast command signal is obtained at step 974 through the linear interpolation of the set initialize data read out from the data map at step 973.

After the calculation of the set initialize signal by the set initialize calculation means 35 in the subroutine shown in FIG. 32, comparison is done at step 962 between the output I of the regulative initialize signal calculated at the step 960 and the output Iset of the set initialize calculated at the step 961. When the decision is done at the step 961 that the output I of the regulative initialize signal is not larger than the output Iset of the set initialize signal (NO), control proceeds to the step 959 and the regulative initialize signal with the output I is output at the step 959 as the coast initialize signal.

If the decision is done at the step 962 that the output I of the regulative initialize signal is larger than the output Iset of the set initialize signal (YES), control proceeds to step 963 and the output Iset of the set initialize signal is written to replace the output I of the regualtive initialize signal in the memory I at the step 963. Therefore the initialize signal with the output I replaced by Iset, that is the set initialize signal with the output Iset calculated at the step 961 is output at the step 959 as the coast initialize signal.

Figure 33:
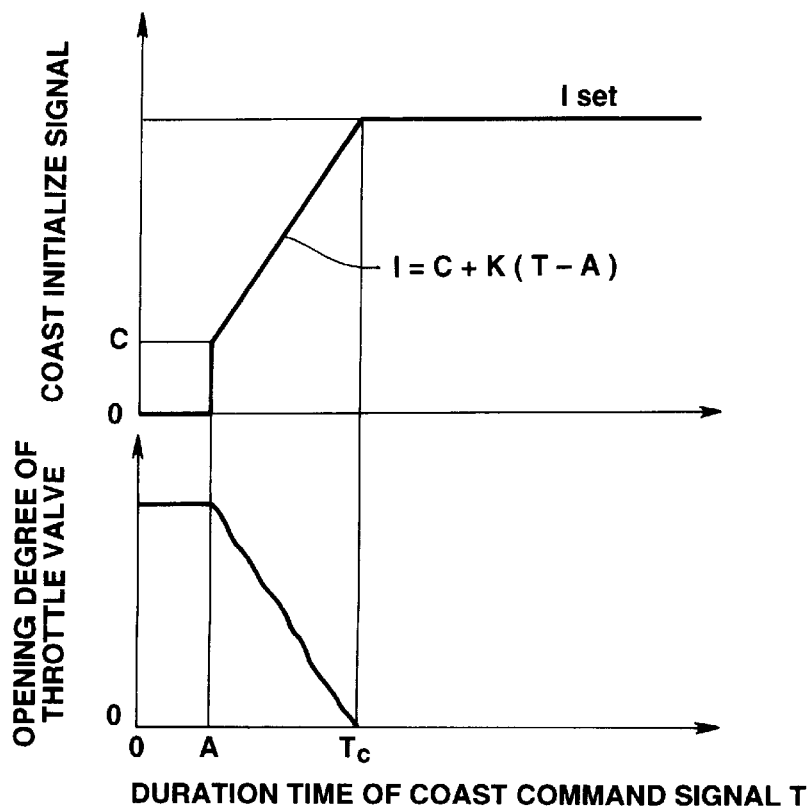
FIG. 33 is a graph illustrating a relationship between the opening degree of the throttle valve and the output of the coast initialize signal against the duration time of the coast command signal.

In the cruising control apparatus 1 according to this embodiment of this invention, the coast initialize signal is not generated in the case where the duration time T of the coast command signal is not longer the time A as shown in FIG. 33, that is in the case where the coast command signal is extinguished before the throttle valve starts the closing movement, and the regulative initialize signal with the output I calculated from the equation I=C+K(T−A) is generated as the coast initialize signal in the case where the duration time T of the coast command signal is longer than time A and not longer than time Tc, that is in the case where the throttle valve starts the closing movement and the cost command signal is extinguished before the throttle valve arrives the full-closed position. Furthermore, the set initialize signal with the output Iset corresponding to the opening degree of the throttle valve at the target cruising speed is generated as the coast initialize signal in the case where the duration time T exceeds the time Tc shown in FIG. 33, that is in the case where the coast command signal is extinguished after the throttle valve is completely closed. Accordingly, it is possible to generate the coast initialize signal in proper quantities against the opening degree of the throttle valve at the time of disappearance of the coast command signal and possible to speedily conform the actual vehicle speed with the target cruising speed renewed by the coast operation regardless of the operation time of the st coast switch 3.

What is claimed is:

1. A cruising control apparatus for a vehicle comprising:
   a speed sensor for generating a vehicle speed signal proportional to an actual running speed of the vehicle;
   an actuator for driving a throttle valve of the vehicle in an acceleration and a deceleration direction of the vehicle;
   a set switch operable for generating a cruise command signal;
   a coast switch operable for generating a coast command signal or a tap-down command signal;

a resume switch operable for generating a resume command signal;

an acceleration switch operable for generating an acceleration command signal or a tap-up command signal;

a memory means for storing the vehicle speed signal generated from said speed sensor as a target cruising speed in response to the cruise command signal generated from said set switch;

a calculation means for comparing the vehicle speed signal generated from said speed sensor with the speed signal stored in said memory means and generating an actuator driving signal corresponding to a difference between the stored speed signal and the actual vehicle speed signal;

a speed increase means for driving said actuator in the acceleration direction of the vehicle according to said actuator driving signal;

a speed decrease means for driving said actuator in the deceleration direction of the vehicle according to said actuator driving signal;

an acceleration control means for deciding a signal generated from said acceleration switch to be the tap-up command signal in a case where a difference between the vehicle speed signal generated at the time of switching on said acceleration switch and the vehicle speed signal generated at the time of switching off said acceleration switch does not exceed a predetermined first value and for deciding the signal generated from said acceleration switch to be the acceleration command signal and storing the vehicle speed signal generated at the time of switching off the acceleration switch in said memory means as a new target cruising speed in a case where the difference between the vehicle speed signal generated at the time of switching on said acceleration switch and the vehicle speed signal generated at the time of switching off said acceleration switch exceeds said first value when said acceleration switch is operated in the first time, and for deciding the signal generated from said acceleration switch to be the tap-up command signal in a case where a difference between the vehicle speed signal generated at the time of switching on said acceleration switch and the vehicle speed signal generated at the time of switching off said acceleration switch does not exceed a predetermined second value and for deciding the signal generated from said acceleration switch to be the acceleration command signal and storing the vehicle speed signal generated at the time of switching off the acceleration switch in said memory means as a new target cruising speed in a case where the difference between the vehicle speed signal generated at the time of switching on said acceleration switch and the vehicle speed signal generated at the time of switching off said acceleration switch exceeds said second value if said acceleration switch is operated after the first time; and an deceleration control means for deciding a signal generated from said coast switch to be the tap-down command signal in a case where a difference between the vehicle speed signal generated at the time of switching on said coast switch and the vehicle speed signal generated at the time of switching off said coast switch does not exceed a predetermined third value and for deciding the signal generated from said coast switch to be the coast command signal and storing the vehicle speed signal generated at the time of switching off the coast switch in said memory means as a new target cruising speed in a case where the difference between the vehicle speed signal generated at the time of switching on said coast switch and the vehicle speed signal generated at the time of switching off said coast switch exceeds said third value when said coast switch is operated in the first time, and for deciding the signal generated from said coast switch to be the tap-down command signal in a case where a difference between the vehicle speed signal generated at the time of switching on said coast switch and the vehicle speed signal generated at the time of switching off said coast switch does not exceed a predetermined fourth value and for deciding the signal generated from said coast switch to be the coast command signal and storing the vehicle speed signal generated at the time of switching off the coast switch in said memory means as a new target cruising speed in a case where the difference between the vehicle speed signal generated at the time of switching on said coast switch and the vehicle speed signal generated at the time of switching off said coast switch exceeds said fourth value if said coast switch is operated after the first time.

2. A cruising control apparatus as set forth in claim 1, wherein said first value is smaller than said second value, and said third value is smaller than said fourth value.

3. A cruising control apparatus as set forth in claim 2, wherein said first value is equivalent to the third value, and said second value is equivalent to fourth value.

4. A cruising control apparatus as set forth in claim 1, wherein said apparatus is further provided with;

a shift-down demand signal generating means for comparing the vehicle speed signal generated from said speed sensor with the speed signal stored in said memory means and for supplying a shift-down demand signal to a transmission controller at the time when a difference between the vehicle speed signal generated from the speed sensor and the speed signal stored in the memory means exceeds a predetermined value; and a prohibition time control means for prohibiting generation of said shift-down demand signal for a time as long as a predetermined first prohibition period at the time of generation of the cruise command signal by operating said set switch.

5. A cruising control apparatus as set forth in claim 4, wherein said prohibition time control means further prohibits the generation of said shift-down demand signal for a time as long as a predetermined second prohibition period at the time of generation of the resume command signal by operating said resume switch.

6. A cruising control apparatus as set forth in claim 5, wherein said first prohibition period is selected in a value larger than said second prohibition period.

7. A cruising control apparatus as set forth in claim 5, wherein said prohibition time control means further prohibits the generation of said shift-down demand signal for a time as long as a predetermined third prohibition period at the time of generation of the acceleration command signal by operating said acceleration switch.

8. A cruising control apparatus as set forth in claim 7, wherein said first prohibition period is selected in a value larger than said second prohibition period, and said third prohibition period is selected in a value equivalent to said first prohibition period.

9. A cruising control apparatus as set forth in claim 7, wherein said prohibition time control means further prohibits the generation of said shift-down demand signal for a time as long as a predetermined fourth prohibition period at the time of generation of the tap-up command signal by operating said acceleration switch.

10. A cruising control apparatus as set forth in claim 9, wherein said first prohibition period is selected in a value larger than said second prohibition period, said third prohibition period is selected in a value equivalent to said first prohibition period, and said fourth prohibition period is selected in a value equivalent to said second prohibition period.

11. A cruising control apparatus as set forth in claim 1, wherein said apparatus is further provided with;
- a shift-down demand signal generating means for comparing the vehicle speed signal generated from said speed sensor with the speed signal stored in said memory means and for supplying a shift-down demand signal to a transmission controller at the time when a difference between the vehicle speed signal generated from the speed sensor and the speed signal stored in the memory means exceeds a predetermined value; and
- a prohibition time control means for maintaining said shift-down demand signal from said shift-down demand signal generating means at the time when the acceleration command signal is generated from said acceleration switch in a case where the difference between the vehicle speed signal and the speed signal stored in the memory means exceeds the predetermined value.

12. A cruising control apparatus as set forth in claim 11, wherein said prohibition time control means prohibits the comparison between the vehicle speed signal from the speed sensor and the speed signal stored in the memory means by the shift-down demand signal generating means for a time as long as a predetermined fifth prohibition period at the time when the cruise control is started and the acceleration command signal is not generated from said acceleration switch.

13. A cruising control apparatus as set forth in claim 12, wherein said prohibition time control means further prohibits the comparison between the vehicle speed signal from the speed sensor and the speed signal stored in the memory means by the shift-down demand signal generating means for a time as long as a predetermined sixth prohibition period at the time of generation of the acceleration command signal from said acceleration switch.

14. A cruising control apparatus as set forth in claim 13, wherein said sixth prohibition period is shorter than said fifth prohibition period.

15. A cruising control apparatus as set forth in claim 1, wherein said apparatus is further provided with;
- a tap-up control means for renewing the target cruising speed by storing a speed signal obtained by adding a predetermined signal corresponding to a tap-up speed to the speed signal stored in the memory means or the vehicle speed signal generated from the speed sensor at the time of the generation of the tap-up command signal in said memory means in response to the tap-up command signal from the acceleration switch, and for driving said actuator in the acceleration direction of the vehicle by outputting the tap-up initialize signal before the actual vehicle speed exceeds a speed obtained by adding a predetermined first threshold value to the renewed target cruising speed stored in said memory means, but for prohibiting said actuator to be driven without outputting said tap-up initialize signal after the actual vehicle speed exceeds the speed obtained by adding said first threshold value to the renewed target cruising speed; and
- a tap-down control means for renewing the target cruising speed by storing a speed signal obtained by subtracting a predetermined signal corresponding to a tap-down speed from the speed signal stored in the memory means or the vehicle speed signal generated from the speed sensor at the time of the generation of the tap-down command signal in said memory means in response to the tap-down command signal from the coast switch, and for driving said actuator in the deceleration direction of the vehicle by outputting the tap-down initialize signal before the actual vehicle speed falls below a speed obtained by subtracting a predetermined second threshold value from the renewed target cruising speed stored in said memory means, but for prohibiting said actuator to be driven without outputting said tap-down initialize signal after the actual vehicle speed falls below a speed obtained by subtracting said second threshold value from the renewed target cruising speed.

16. A cruising control apparatus as set forth in claim 15, wherein said first threshold value is equivalent to said second threshold value.

17. A cruising control apparatus as set forth in claim 1, wherein said apparatus is further provided with;
- a tap-up initialize calculation means for calculating output of a tap-up initialize signal in response to the tap-up command signal from the acceleration switch on basis of the vehicle speed signal from the speed sensor at the time of generation of the tap-up command signal;
- a tap-down initialize calculation means for calculating output of a tap-down initialize signal in response to the tap-down command signal from the coast switch on basis of the vehicle speed signal from the speed sensor at the time of generation of the tap-down command signal;
- a tap-up control means for storing a speed signal obtained by adding a predetermined signal corresponding to a tap-up speed to the speed signal stored in the memory means or the vehicle speed signal generated from the speed sensor at the time of the generation of the tap-up command signal in said memory means as a new target cruising speed and driving said actuator in the acceleration direction of the vehicle by outputting the tap-up initialize signal calculated in said tap-up initialize calculation means in a case where the tap-up command signal is generated from the acceleration switch in the first time, and for storing the speed signal obtained by adding the predetermined signal corresponding to the tap-up speed to the speed signal stored in the memory means or the vehicle speed signal generated from the speed sensor at the time of the generation of the tap-up command signal in said memory means as the new target cruising speed and driving said actuator in the acceleration direction of the vehicle by outputting a tap-up initialize signal of output power obtained by multiplying the output of the tap-up initialize signal calculated in said tap-up initialize calculation means with a predetermined coefficient less than 1 in a case where the tap-up command signal is generated again from said acceleration switch before the actual vehicle speed arrives in a renewed target speed range; and
- a tap-down control means for storing a speed signal obtained by subtracting a predetermined signal corresponding to a tap-down speed from the speed signal stored in the memory means or the vehicle speed signal generated from the speed sensor at the time of the generation of the tap-down command signal in said memory means as a new target cruising speed and driving said actuator in the deceleration direction of the vehicle by outputting the tap-down initialize signal calculated in said tap-down initialize calculation means in a case where the tap-down command signal is generated from the coast switch in the first time, and for storing the speed signal obtained by subtracting the predetermined signal corresponding to the tap-down speed from the speed signal stored in the memory means or the vehicle speed signal generated from the speed sensor at the time of the generation of the tap-down command signal in said memory means as the new target cruising speed and driving said actuator in the deceleration direction of the vehicle by outputting a tap-down initialize signal of output power obtained by multiplying the output of the tap-down initialize signal calculated in said tap-down initialize calculation means with a predetermined coefficient less than 1 in a case where the tap-down command signal is generated again from said deceleration switch before the actual vehicle speed arrives in a renewed target speed range.

18. A cruising control apparatus as set forth in claim 17, wherein said tap-up control device further stores the speed signal obtained by adding the predetermined signal corresponding to the tap-up speed to the speed signal stored in the memory means or the vehicle speed signal generated from the speed sensor at the time of the generation of the tap-up command signal in said memory means as the new target cruising speed and driving said actuator in the acceleration direction of the vehicle by outputting a tap-up initialize signal calculated in said tap-up initialize calculation means in a case where the tap-up command signal is generated from said acceleration switch after the actual vehicle speed arrives in the renewed target speed range; and said tap-down control device further stores the speed signal obtained by subtracting the predetermined signal corresponding to the tap-down speed to the speed signal stored in the memory means or the vehicle speed signal generated from the speed sensor at the time of the generation of the tap-down command signal in said memory means as the new target cruising speed and driving said actuator in the deceleration direction of the vehicle by outputting a tap-down initialize signal calculated in said tap-down initialize calculation means in a case where the tap-down command signal is generated from said coast switch after the actual vehicle speed arrives in the renewed target speed range.

19. A cruising control apparatus as set forth in claim 1, wherein said apparatus is further provided with;

a tap-up initialize calculation means for calculating output of a tap-up initialize signal in response to the tap-up command signal from the acceleration switch on basis of the vehicle speed signal from the speed sensor at the time of generation of the tap-up command signal;

a tap-down initialize calculation means for calculating output of a tap-down initialize signal in response to the tap-down command signal from the coast switch on basis of the vehicle speed signal from the speed sensor at the time of generation of the tap-down command signal;

a timer means for respectively counting duration time of the tap-up command signal and the tap-down signal in response to the tap-up command signal generated from said acceleration switch and the tap-down command signal generated from said coast switch, respectively;

a tap-up control means for storing a speed signal obtained by adding a predetermined signal corresponding to a tap-up speed to the vehicle speed signal generated from the speed sensor at the time of the generation of the tap-up command signal in said memory means as a new target cruising speed and driving said actuator in the acceleration direction of the vehicle by outputting the tap-up initialize signal calculated in said tap-up initialize calculation means, and for generating an actuator driving signal according to constant speed control until the tap-up command signal disappears in a case where the tap-up command signal is maintained even after the output of the tap-up initialize signal and until the duration time of the tap-up command signal obtained through said timer means;

attains a predetermined period in a case where the tap-up command signal is further maintained;

a tap-down control means for storing a speed signal obtained by subtracting a predetermined signal corresponding to a tap-down speed from the vehicle speed signal generated from the speed sensor at the time of the generation of the tap-down command signal in said memory means as a new target cruising speed and driving said actuator in the deceleration direction of the vehicle by outputting the tap-down initialize signal calculated in said tap-down initialize calculation means, and for generating an actuator driving signal according to constant speed control until the tap-down command signal disappears in a case where the tap-down command signal is maintained even after the output of the tap-down initialize signal and until the duration time of the tap-down command signal obtained through said timer means attains a predetermined period in a case where the tap-down command signal is further maintained.

20. A cruising control apparatus as set forth in claim 1, wherein said calculation means generates the actuator driving signal according to constant speed control in a case where the actual vehicle speed is within a difference range predetermined against the target cruising speed stored in the memory means and generates the actuator driving signal according to constant acceleration control in a case where the actual vehicle speed falls below the difference range predetermined against the target cruising speed, and said apparatus is further provided with;

a tap-up initialize calculation means for calculating output of a tap-up initialize signal in response to the tap-up command signal from the acceleration switch on basis of the vehicle speed signal from the speed sensor at the time of generation of the tap-up command signal;

a tap-up control means for storing a speed signal obtained by adding a predetermined signal corresponding to a tap-up speed to the speed signal stored in the memory means at the time of the generation of the tap-up command signal in said memory means as a new target cruising speed in response to the tap-up command signal, and for driving said actuator in the acceleration direction of the vehicle by outputting the tap-up initialize signal calculated in said tap-up initialize calculation means in the case where the actual vehicle speed is within said difference range predetermined against the target cruising speed stored in said memory means but prohibiting said output of the tap-up initialize signal in the case where the actual vehicle speed falls below said difference range predetermined against the target cruising speed.

21. A cruising control apparatus as set forth in claim 1, wherein said calculation means generates the actuator driving signal according to constant speed control in a case where the actual vehicle speed is within a difference range predetermined against the target cruising speed stored in the memory means and generates the actuator driving signal according to constant acceleration control in a case where the actual vehicle speed falls below the difference range predetermined against the target cruising speed, and said apparatus is further provided with;

an acceleration-off calculation means for calculating output of an acceleration-off signal in response to the acceleration command signal from the acceleration switch on basis of the vehicle speed signal generated from the speed sensor at the time of the generation of the acceleration command signal;

a tap-down initialize calculation means for calculating output of a tap-down initialize signal in response to the tap-down command signal from the coast switch on basis of the vehicle speed signal from the speed sensor at the time of generation of the tap-down command signal;

an acceleration control means for driving said actuator in the acceleration direction of the vehicle by outputting the actuator driving signal according to the constant acceleration control in response to the acceleration command signal generated from said acceleration switch, and for storing the vehicle speed signal generated from the speed sensor at the time of disappearance of the acceleration command signal in the memory means as a new target cruising speed and driving the actuator in the deceleration direction of the vehicle by outputting the acceleration-off signal calculated in said acceleration-off calculation means in response to the disappearance of the acceleration command signal; and a tap-down control means for storing a speed signal obtained by subtracting a predetermined signal corresponding to a tap-down speed from the vehicle speed signal generated from the speed sensor at the time of the generation of the tap-down command signal in said memory means as a new target cruising speed and driving said actuator in the deceleration direction of the vehicle by outputting the tap-down initialize signal calculated in said tap-down initialize calculation means when the tap-down command signal is generated from said coast switch during the constant speed control, and for storing the speed signal obtained by subtracting the predetermined signal corresponding to the tap-down speed from the vehicle speed signal generated from the speed sensor at the time of the generation of the tap-down command signal in said memory means as a new target cruising speed and driving the actuator in the deceleration direction of the vehicle by outputting the signal obtained by adding the tap-down initialize signal and the acceleration-off signal calculated on basis of the vehicle speed signal generated from the speed sensor at the time of the generation of the tap-down command signal in the tap-down initialize calculation means and the acceleration-off calculation means if the tap-down command signal is generated from said coast switch during the constant acceleration control.

22. A cruising control apparatus as set forth in claim 1, wherein said apparatus is further provided with;

a set initialize calculation means for calculating output of a set initialize signal in response to the cruise command signal from the set switch on basis of the vehicle speed signal from the speed sensor at the time of disappearance of the cruise command signal;

a timer means for counting duration time of the coast command signal in response to the coast command signal generated from said coast switch;

a regulative initialize calculation means for calculating output of a regulative initialize signal increasing in proportional to a period obtained by subtracting a predetermined period from the duration time of the coast command signal counted by said timer means; and a coast control means for driving said actuator in the deceleration direction of the vehicle by outputting an actuator driving signal in response to the coast command signal generated from said coast switch, for storing the vehicle speed signal generated from the speed sensor at the time of disappearance of the coast command signal in the memory means as a new target cruising speed in response to the disappearance of the coast command signal and driving said actuator in the acceleration direction of the vehicle by outputting the regulative initialize signal calculated by said regulative initialize calculation means as a coast initialize signal when the output of said regulative initialize signal is less than the output of the set initialize signal calculated by said set initialize calculation means on basis of the vehicle speed signal from the speed sensor at the time of the disappearance of the coast command signal and by outputting said set initialize signal as the coast initialize signal when the output of said regulative initialize signal is not less than the output of said set initialize signal in a case where the duration time of the coast command signal obtained by said timer means is longer than a predetermined period of time.

23. A cruising control apparatus as set forth in claim 22, wherein said coast control means prohibits the output of the coast initialize signal in a case where the duration time of the coast command signal obtained by said timer means is not longer than said predetermined period of time.

* * * * *